(12) United States Patent
Broda

(10) Patent No.: US 10,888,962 B2
(45) Date of Patent: Jan. 12, 2021

(54) METHODS FOR ADDITIVE MANUFACTURING

(71) Applicant: The Boeing Company, Chicago, IL (US)

(72) Inventor: Adam R. Broda, Bothell, WA (US)

(73) Assignee: The Boeing Company, Chicago, IL (US)

(*) Notice: Subject to any disclaimer, the term of this patent is extended or adjusted under 35 U.S.C. 154(b) by 316 days.

(21) Appl. No.: 16/006,203

(22) Filed: Jun. 12, 2018

(65) Prior Publication Data
US 2018/0290247 A1    Oct. 11, 2018

Related U.S. Application Data

(62) Division of application No. 14/540,057, filed on Nov. 13, 2014, now Pat. No. 10,016,852.

(51) Int. Cl.
*B23K 37/047* (2006.01)
*B22F 3/00* (2006.01)
(Continued)

(52) U.S. Cl.
CPC .......... *B23K 37/047* (2013.01); *B22F 3/008* (2013.01); *B22F 3/1055* (2013.01); *B22F 3/24* (2013.01);
(Continued)

(58) Field of Classification Search
CPC ........ B22F 2003/1056; B22F 2003/245; B22F 2003/247; B22F 3/008; B22F 3/1055;
(Continued)

(56) References Cited

U.S. PATENT DOCUMENTS

| 8,647,548 B1 | 2/2014 | Humfeld |
| 2009/0033003 A1 | 2/2009 | Sievers et al. |
| 2015/0290741 A1* | 10/2015 | Abe ............... B29C 64/268 419/28 |

FOREIGN PATENT DOCUMENTS

| CN | 102029389 | 4/2011 |
| CN | 203186886 | 9/2013 |

(Continued)

OTHER PUBLICATIONS

Brazil Patent Office, Office Action, App. No. BR102015024361-8 (dated Aug. 1, 2019).
(Continued)

*Primary Examiner* — Dana Ross
*Assistant Examiner* — Joseph W Iskra
(74) *Attorney, Agent, or Firm* — Walters & Wasylyna LLC

(57) ABSTRACT

A method for additively manufacturing an object from a metal powder is disclosed. The method includes distributing a first stratum of the metal powder in a powder-bed volume at least partially delimited by a build platform. The method further includes melting a first selected portion of the first stratum of the metal powder in a powder-bed volume by exposing the first selected portion of the first stratum of the metal powder to electromagnetic energy from an electromagnetic energy source while moving the electromagnetic energy source along a first predetermined path in a polar coordinate system to form at least a portion of a first layer of the object. The electromagnetic energy source is movable in a linear travel path along a linear rail and the linear rail is one of rotatable or revolvable in a horizontal plane about a vertical axis A.

20 Claims, 35 Drawing Sheets

(51) Int. Cl.
*B23K 15/00* (2006.01)
*B22F 3/105* (2006.01)
*B22F 3/24* (2006.01)
*B33Y 10/00* (2015.01)
*B33Y 30/00* (2015.01)

(52) U.S. Cl.
CPC .. *B23K 15/0086* (2013.01); *B22F 2003/1056* (2013.01); *B22F 2003/245* (2013.01); *B22F 2003/247* (2013.01); *B33Y 10/00* (2014.12); *B33Y 30/00* (2014.12); *Y02P 10/25* (2015.11)

(58) Field of Classification Search
CPC ..... B22F 3/24; B23K 15/0086; B23K 37/047; B33Y 10/00; B33Y 30/00; Y02P 10/295
USPC ...................................................... 219/76.1
See application file for complete search history.

(56) References Cited

FOREIGN PATENT DOCUMENTS

| CN | 103990798 | | 8/2014 |
|---|---|---|---|
| EP | 2 910 323 | | 8/2015 |
| JP | H01-237123 | | 9/1989 |
| JP | H01237123 | * | 9/1989 |
| JP | 2004-122489 | | 4/2004 |
| JP | 2007-146216 | | 6/2007 |
| JP | 2009-108348 | | 5/2009 |
| JP | 5612735 | | 10/2014 |
| RU | 2487779 | | 7/2013 |
| WO | WO 2014137890 | * | 9/2014 |

OTHER PUBLICATIONS

China National Intellectual Property Administration, Office Action, with English translation, App. No. 201510568435.0 (dated Oct. 8, 2019).

China National Intellectual Property Administration, "2$^{nd}$ Notification of Office Action," with English translation, App. No. 201510568435.0 (dated Apr. 29, 2019).

Japanese Patent Office, Office Action, with English translation, App. No. 2015-214298 (dated Nov. 6, 2018).

China National Intellectual Property Administration, Office Action, with English translation, App. No. 201510568435.0 (dated Nov. 1, 2018).

European Patent Office, "Extended European Search Report," App. No. 18189693.7 (dated Dec. 20, 2018).

Federal Service for Intellectual Property, Office Action, with English translation, App. No. 2015132213/02(049589) (dated Jan. 18, 2019).

Japan Patent Office, Office Action, with English translation, App. No. 2019-074585 (dated Jun. 30, 2020).

* cited by examiner

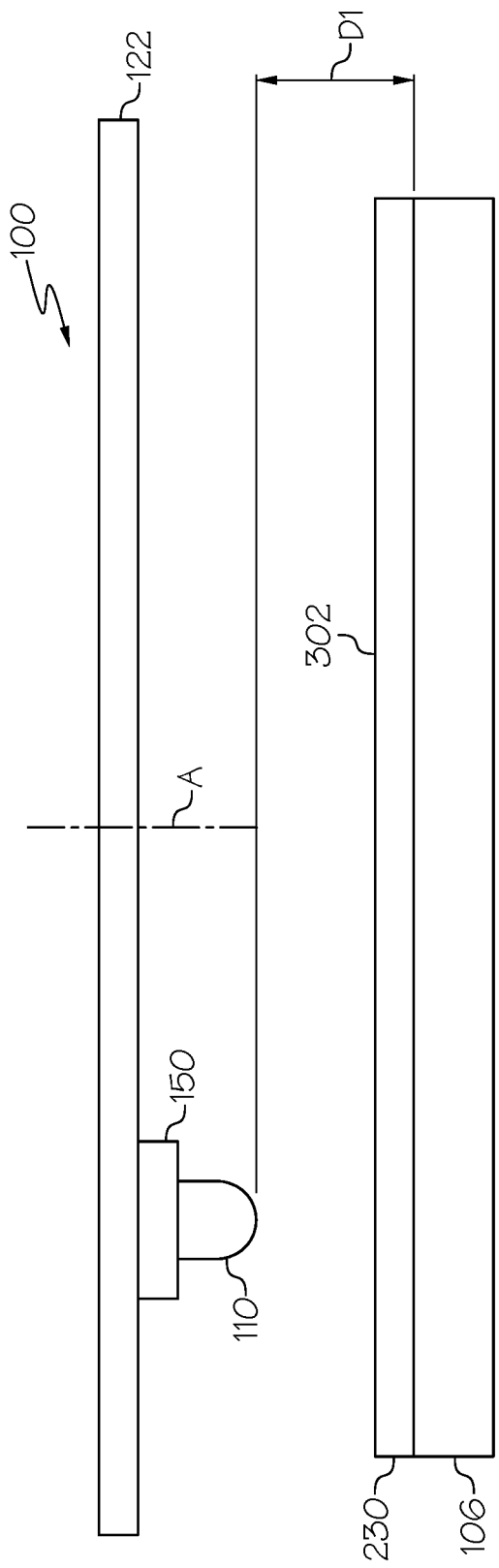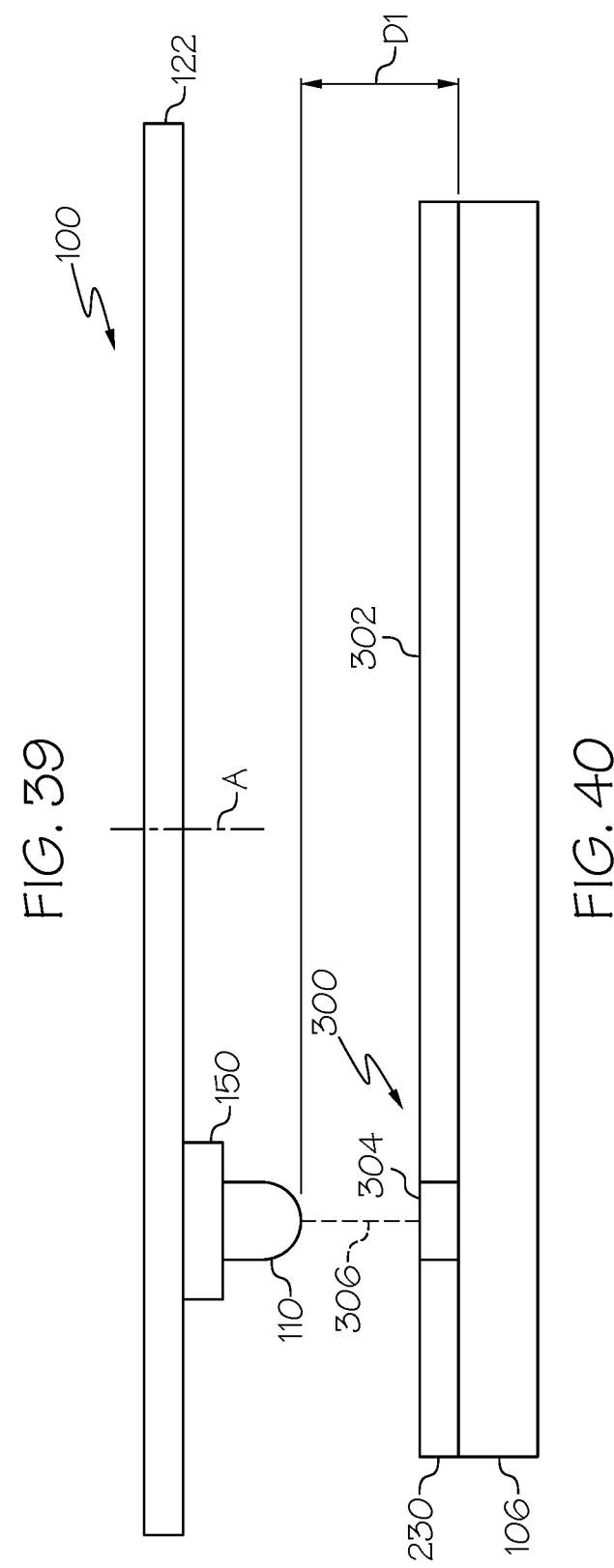

METHODS FOR ADDITIVE MANUFACTURING

PRIORITY

This application is a divisional of U.S. Ser. No. 14/540,057 filed on Nov. 13, 2014.

BACKGROUND

Conventional techniques for manufacturing large-scale assemblies, such as aircraft fuselages, wings, etc., generally require interconnection of various parts to form the final structure. To accommodate such interconnection, multiple post-processing operations and large numbers of fasteners and associated hardware (e.g., seal caps, shims, fillers, etc.) are utilized. For example, multiplicities of holes are drilled to accommodate the installation of the fasteners. Moreover, various features often have to be post-formed in the component parts and/or in the final structure. Accordingly, existing manufacturing techniques for large-scale structures are labor intensive and increase manufacturing cycle time and cost. In addition, design freedom is often limited by the requirements imposed by conventional manufacturing methodologies.

SUMMARY

Accordingly, apparatuses and methods, intended to address the above-identified concerns, would find utility.

The following is a non-exhaustive list of examples, which may or may not be claimed, of the subject matter according the present disclosure.

One example of the present disclosure relates to an additive manufacturing apparatus comprising a linear rail having a length L1. The linear rail is one of rotatable or revolvable in a horizontal plane about a vertical axis A. The additive manufacturing apparatus further comprises an electromagnetic energy source movably coupled to the linear rail and movable in a polar coordinate system having a radius R.

Another example of the present disclosure relates to an additive manufacturing apparatus comprising linear rails each having a length L1. The linear rails are one of rotatable or revolvable in a horizontal plane about a vertical axis A. The additive manufacturing apparatus further comprises electromagnetic energy sources movably coupled to the linear rails and movable in a polar coordinate system having a radius R.

Yet another example of the present disclosure relates to a method for additively manufacturing an object from a metal powder. The method comprises distributing a first stratum of the metal powder in a powder-bed volume at least partially delimited by a build platform. The method further comprises melting a first selected portion of the first stratum of the metal powder in a powder-bed volume by exposing the first selected portion of the first stratum of the metal powder to electromagnetic energy from an electromagnetic energy source while moving an electromagnetic radiation source along a first predetermined path in a polar coordinate system to form at least a portion of a first layer of the object. The electromagnetic radiation source is movable in a linear travel path along a linear rail and the linear rail is one of rotatable or revolvable in a horizontal plane about a vertical axis A.

BRIEF DESCRIPTION OF THE DRAWINGS

Figure 1A:
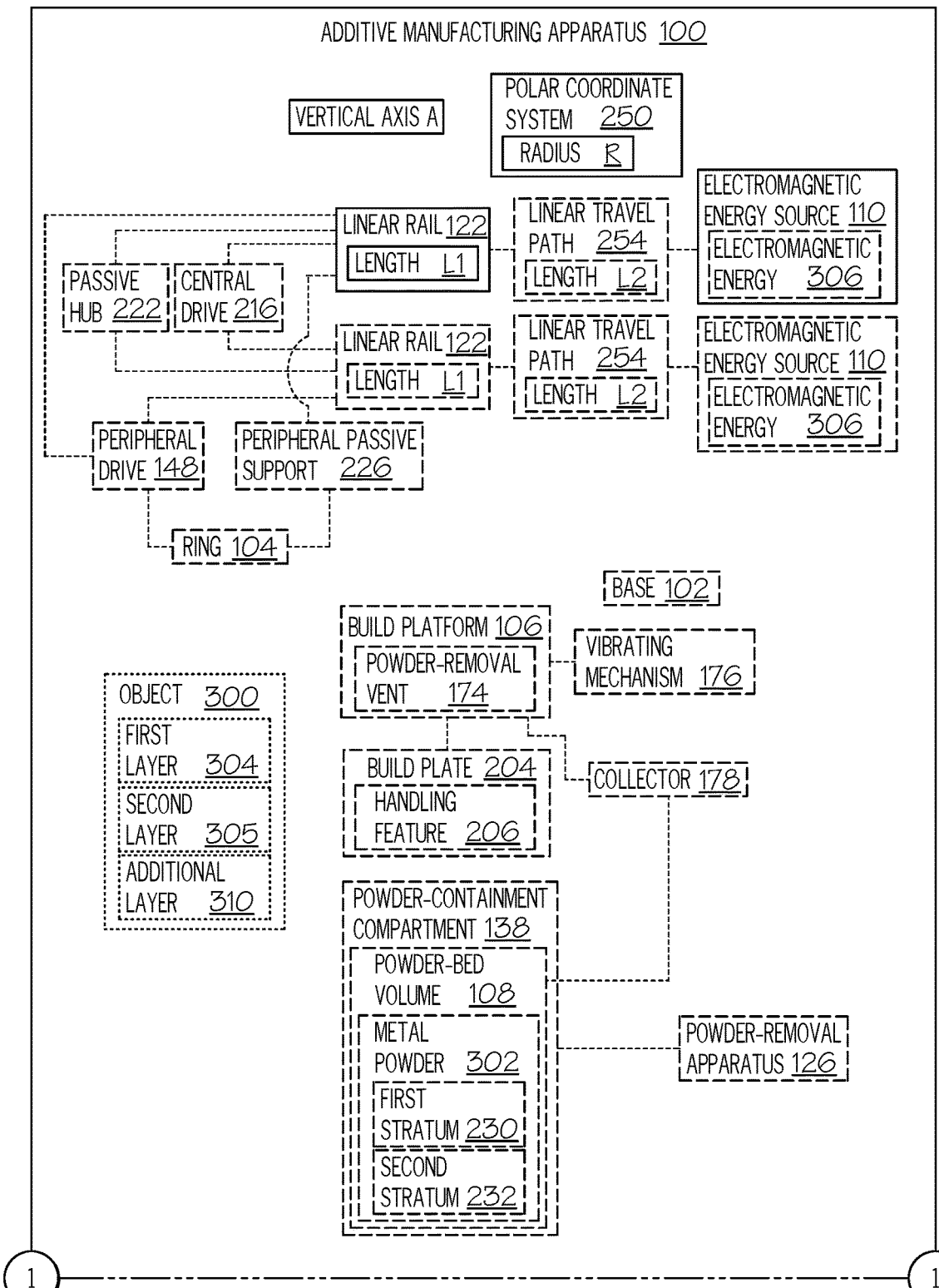
Figure 1B:
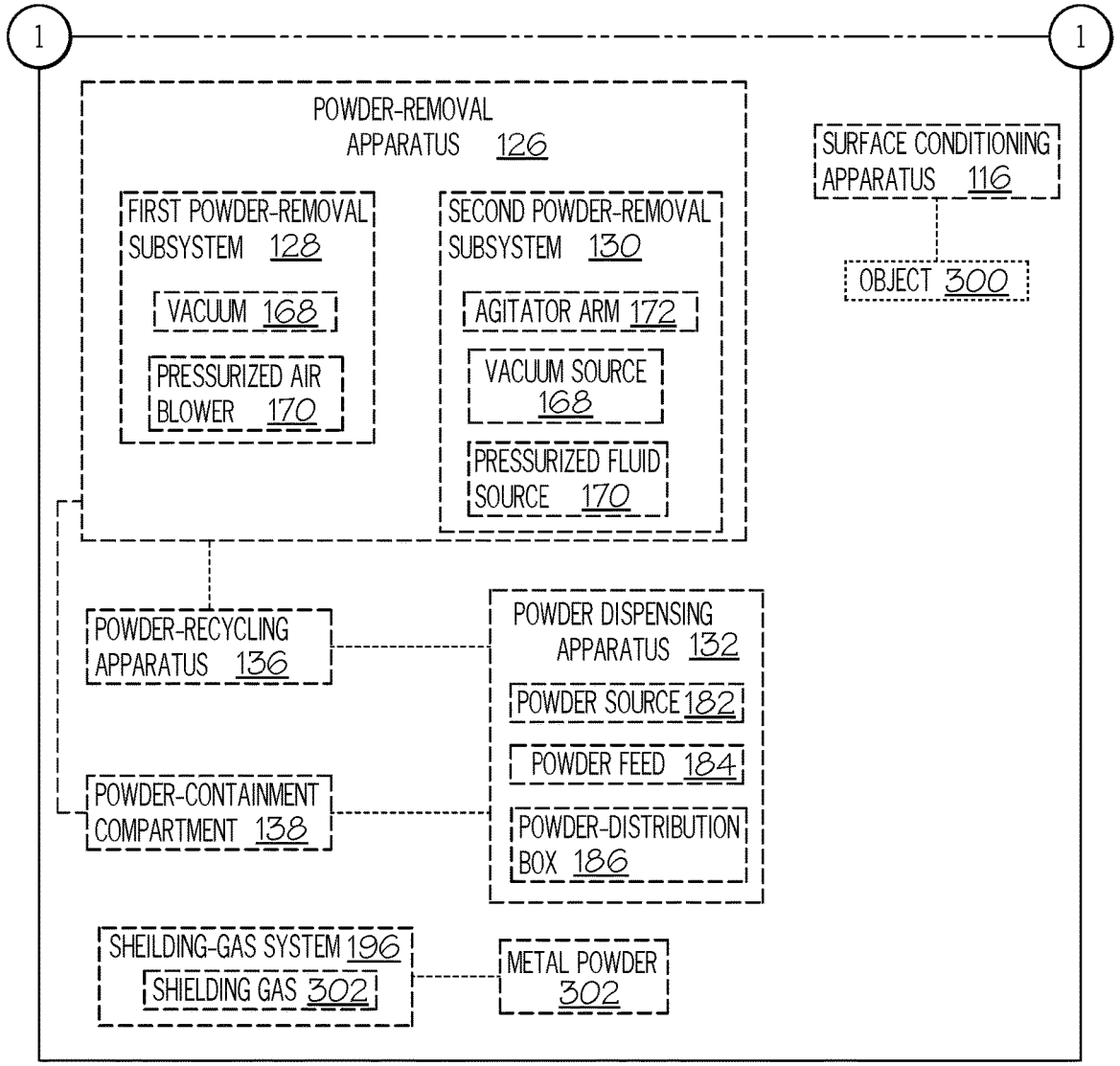
Figure 2:
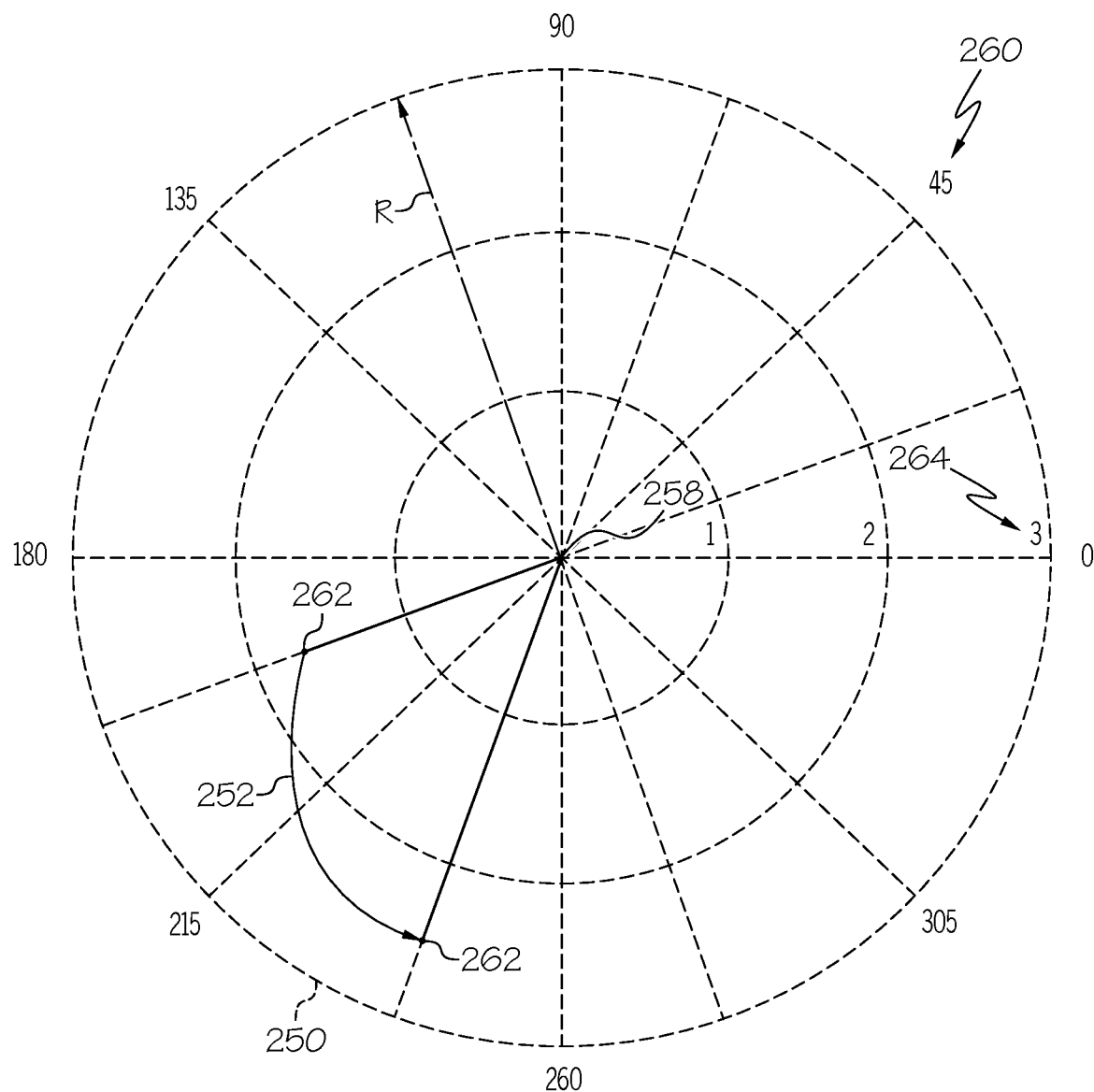
Figure 3:
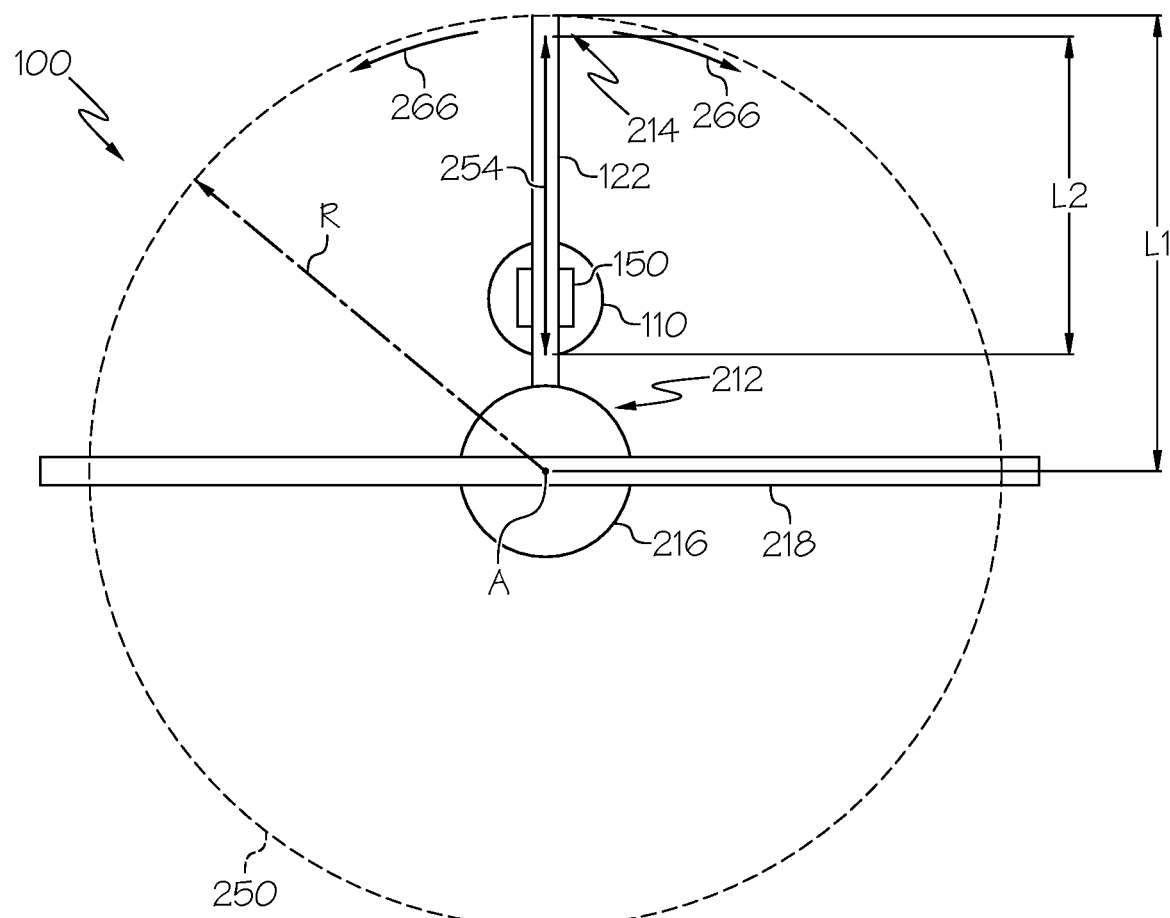
Figure 4:
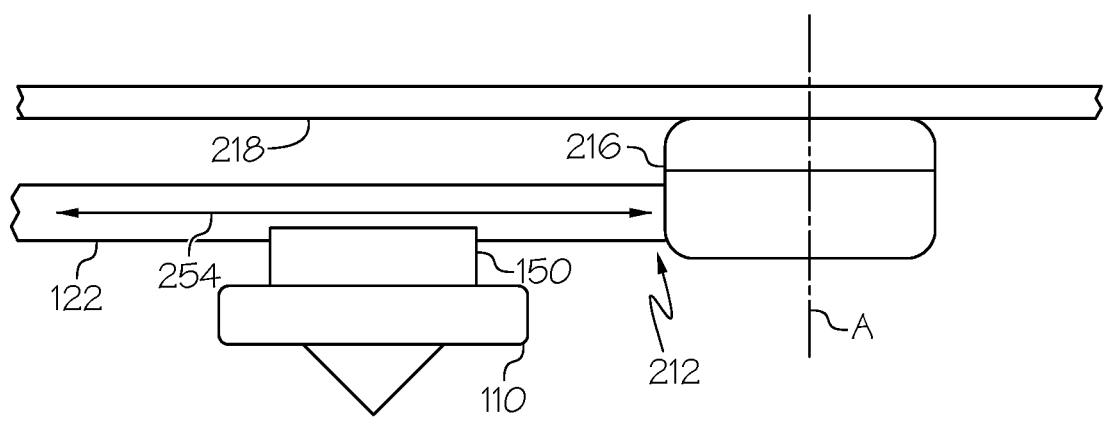
Figure 5:
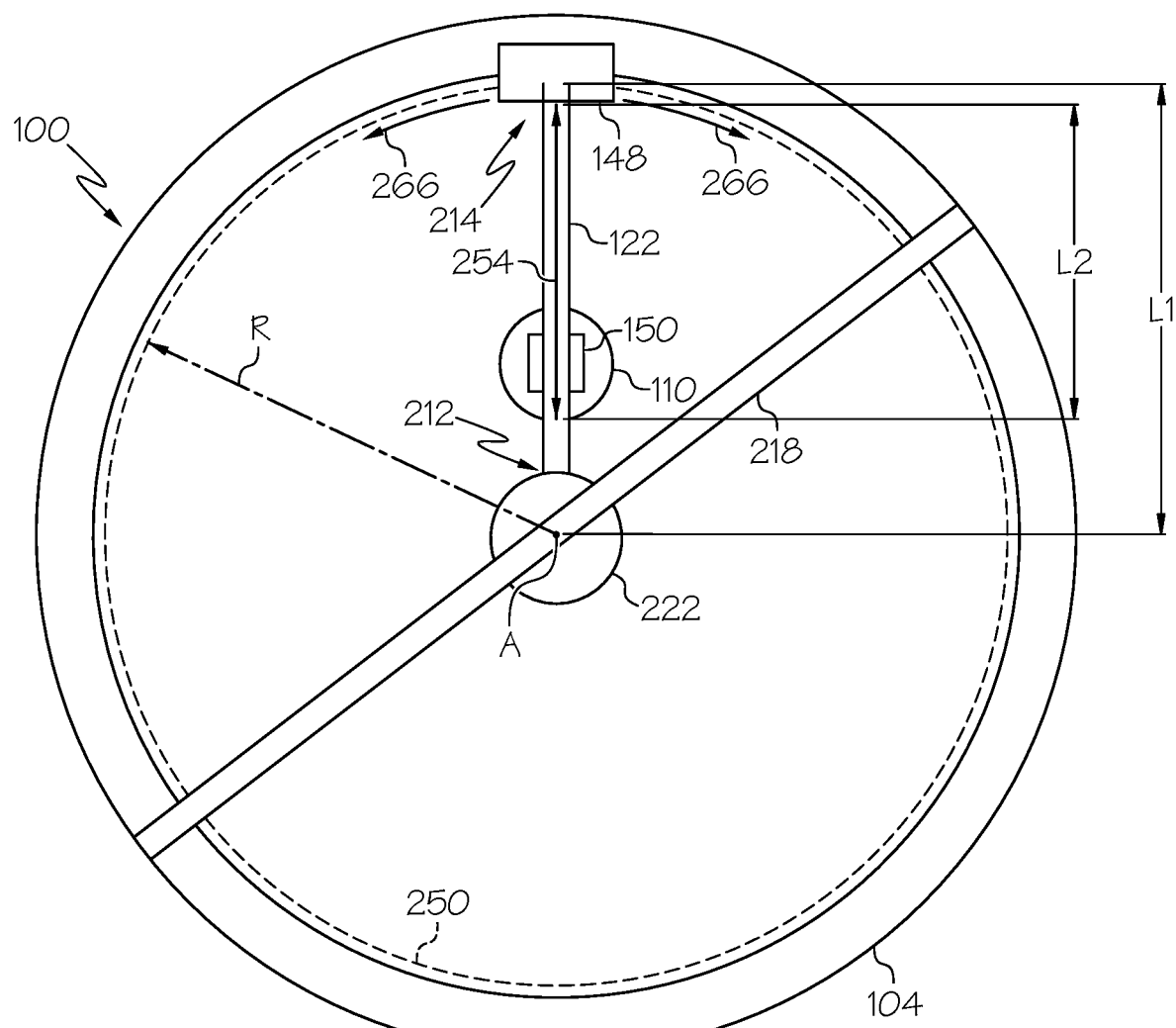
Figure 6:
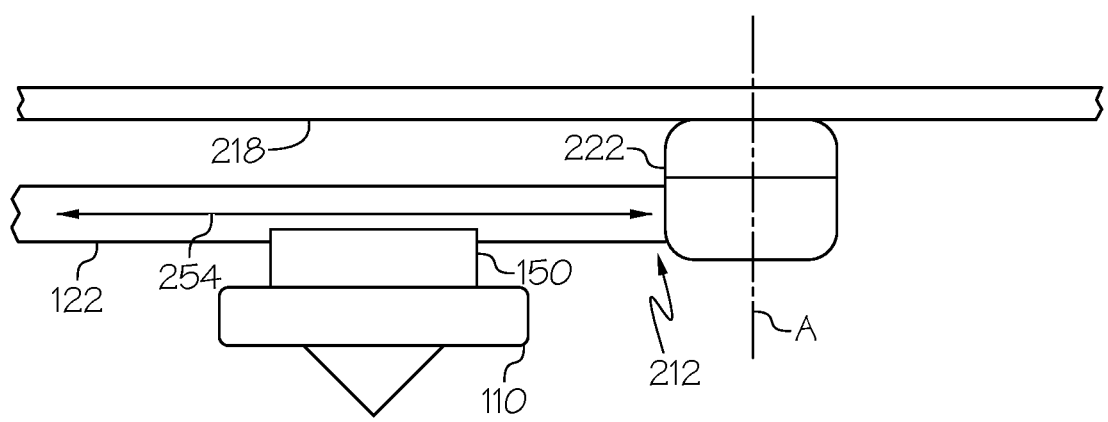
Figure 7:
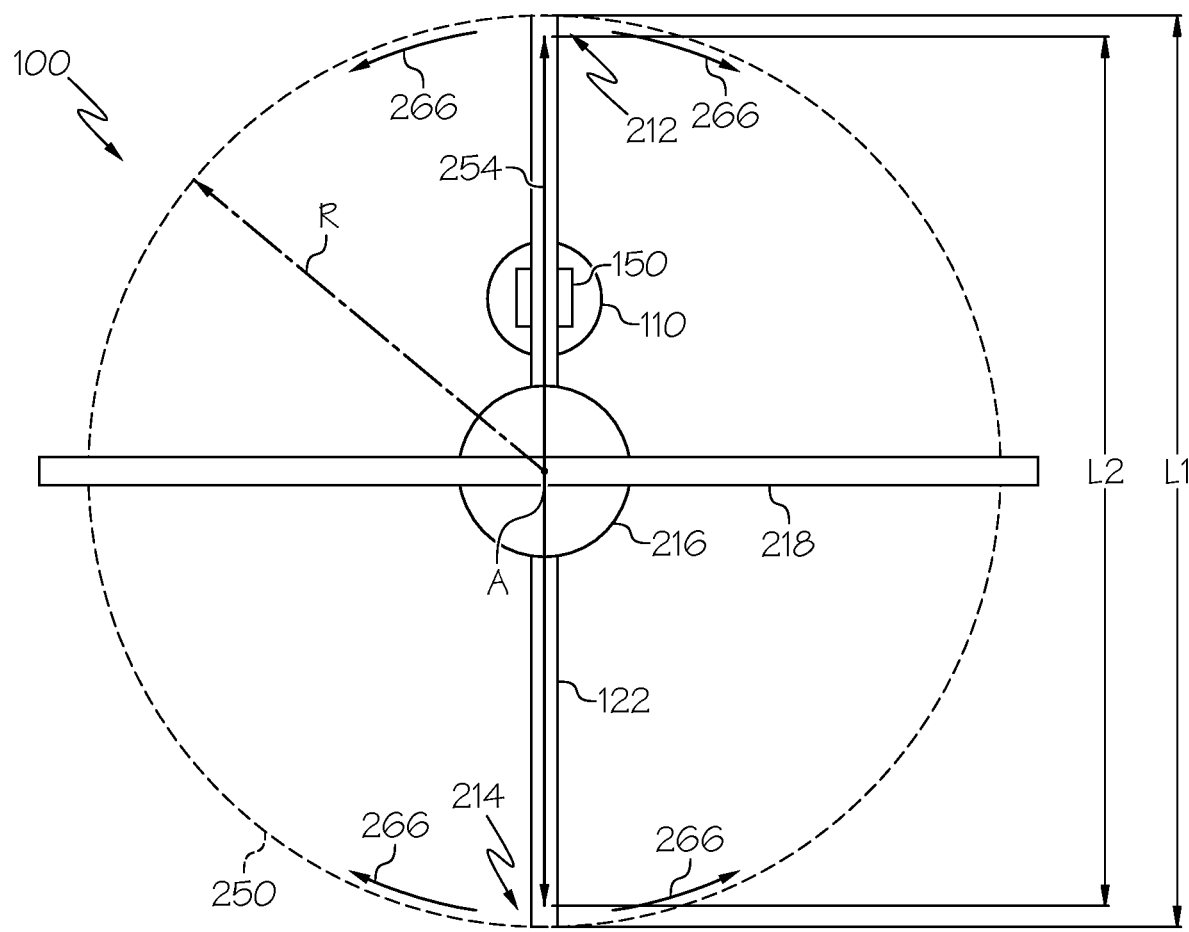
Figure 8:
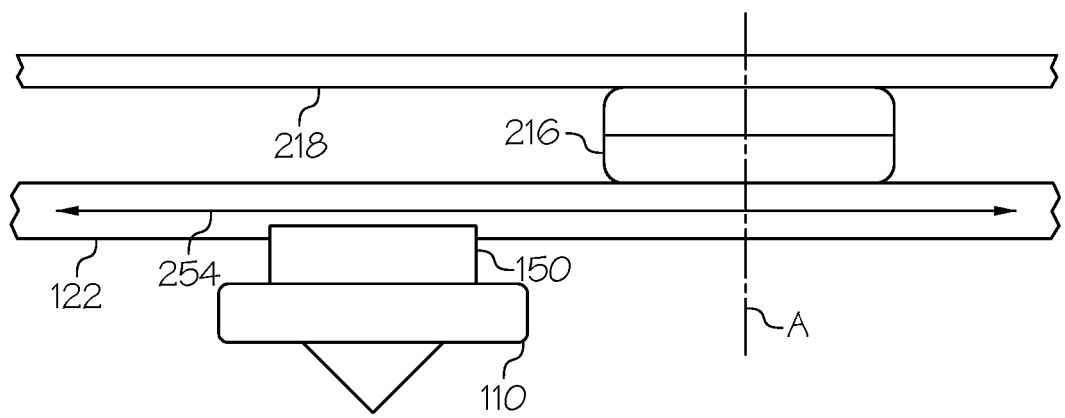
Figure 9:
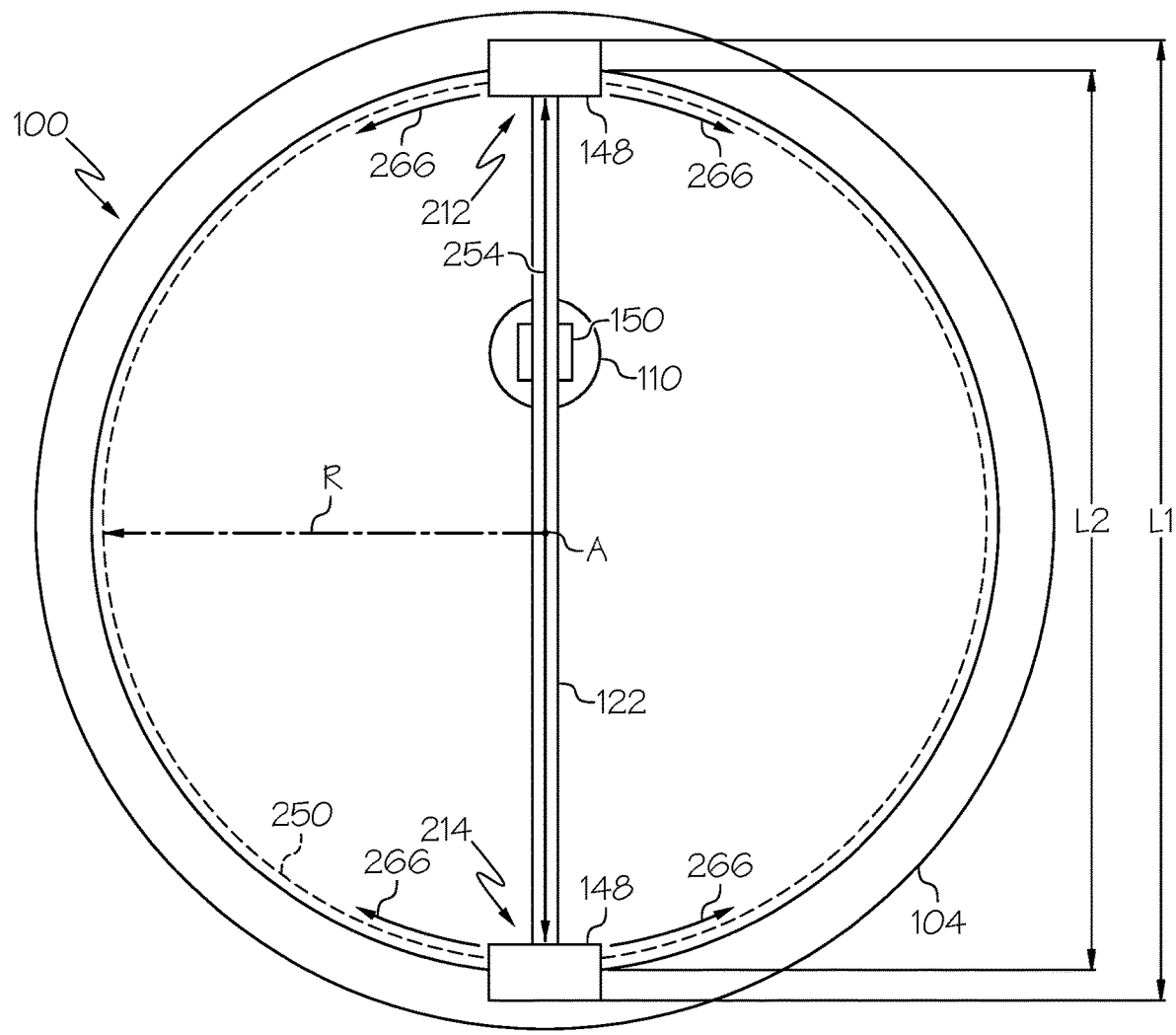
Figure 10:
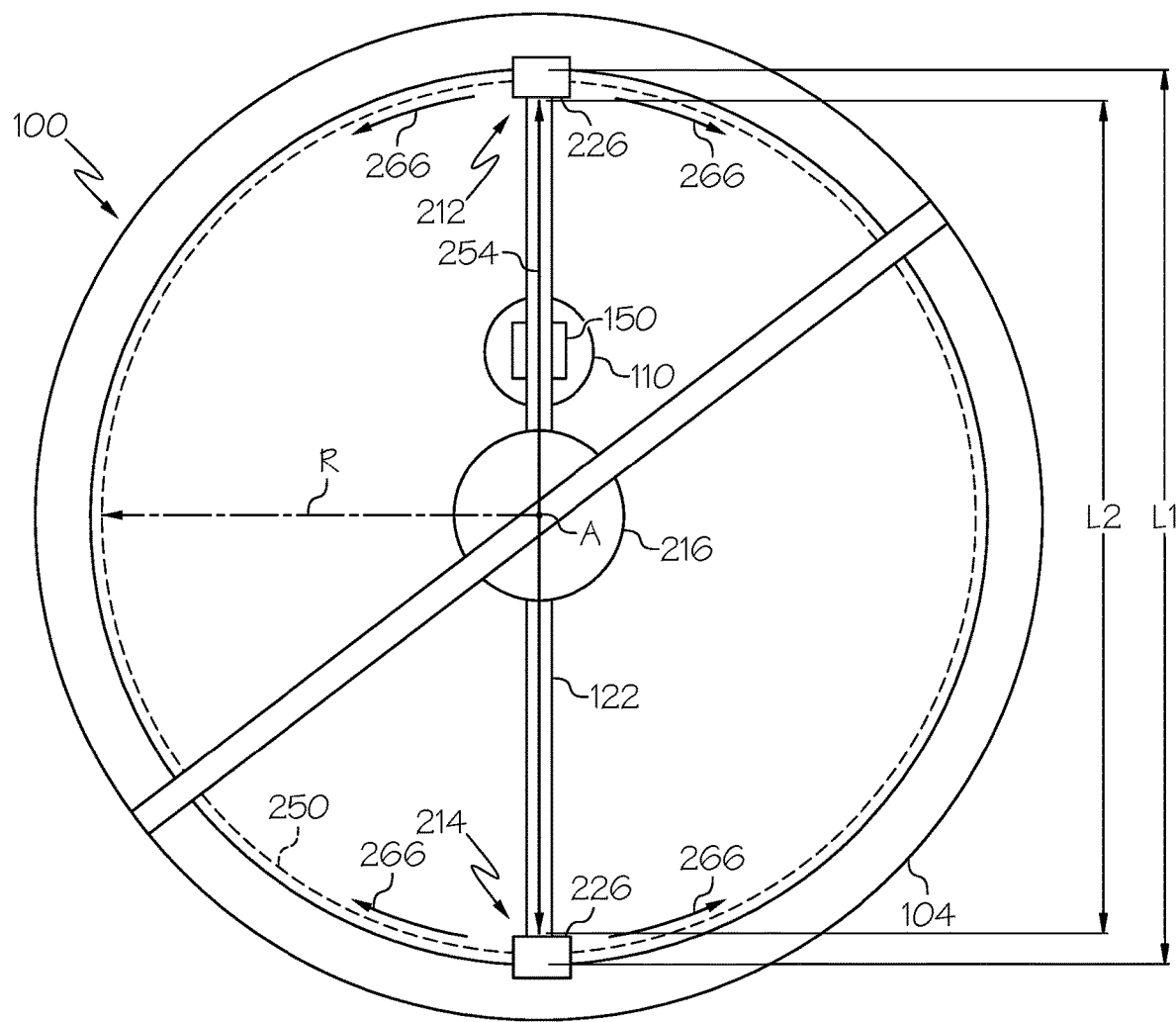
Figure 11:
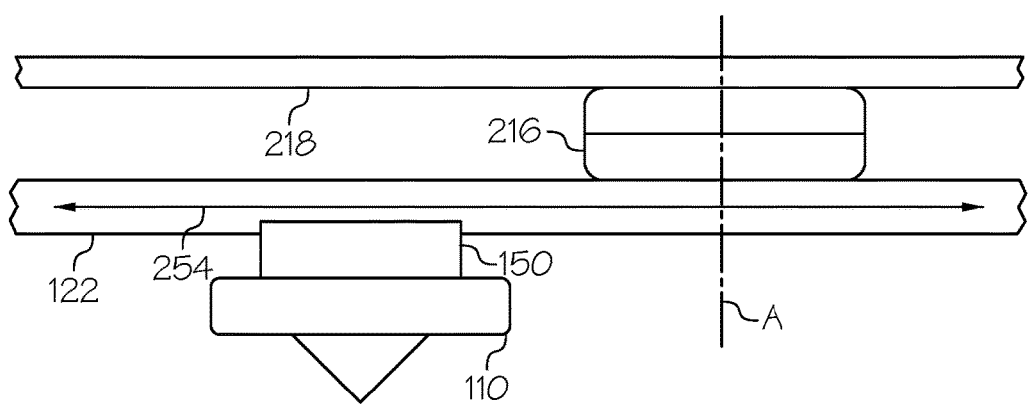
Figure 12:
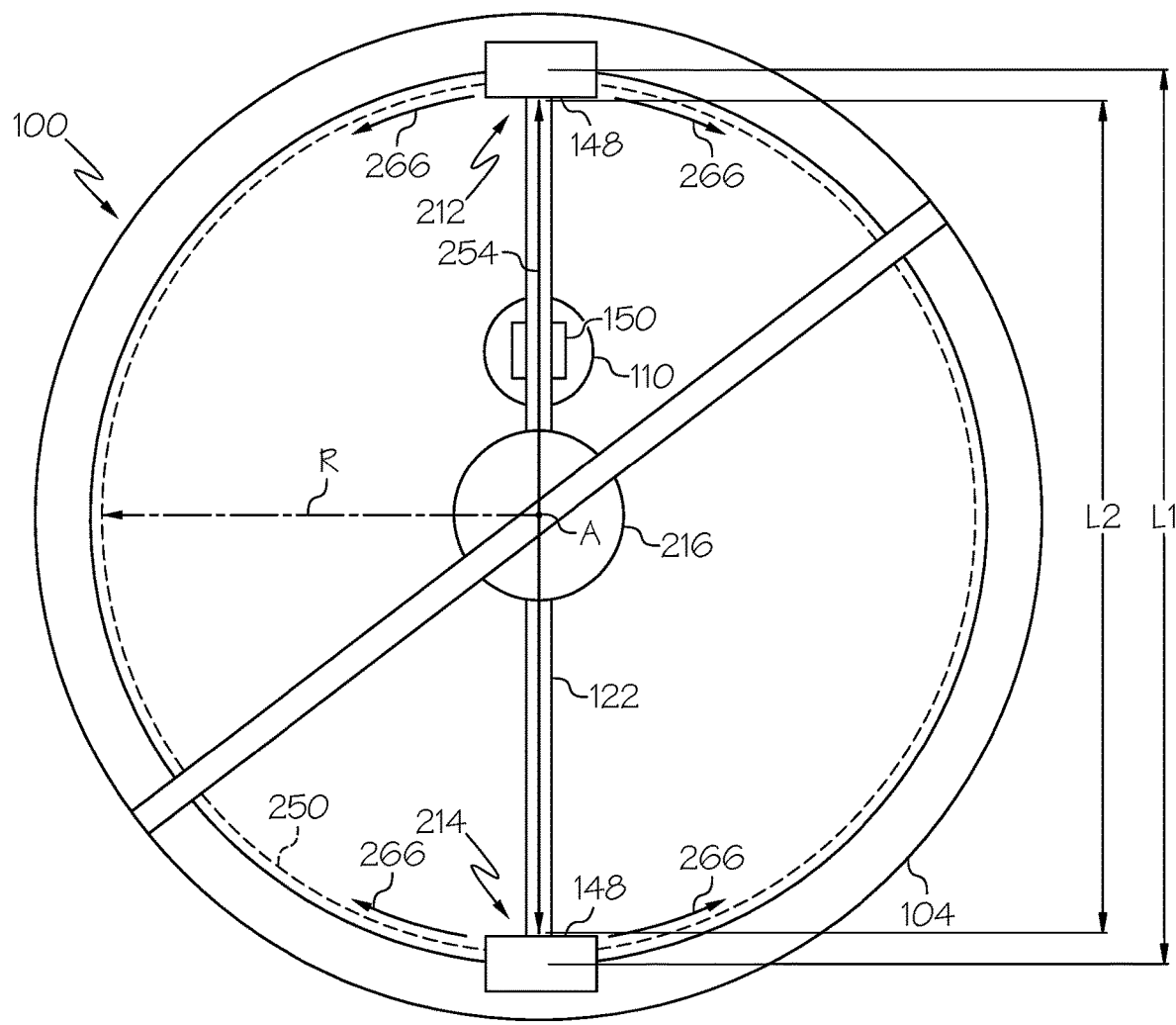
Figure 13:
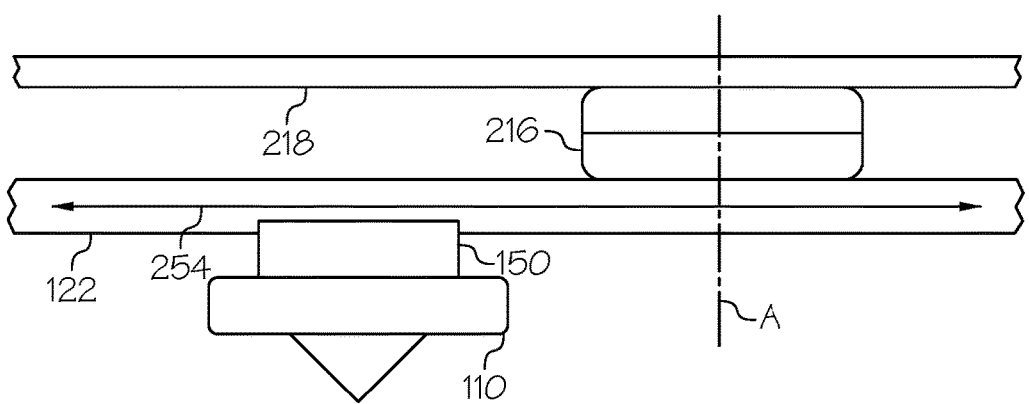
Figure 14:
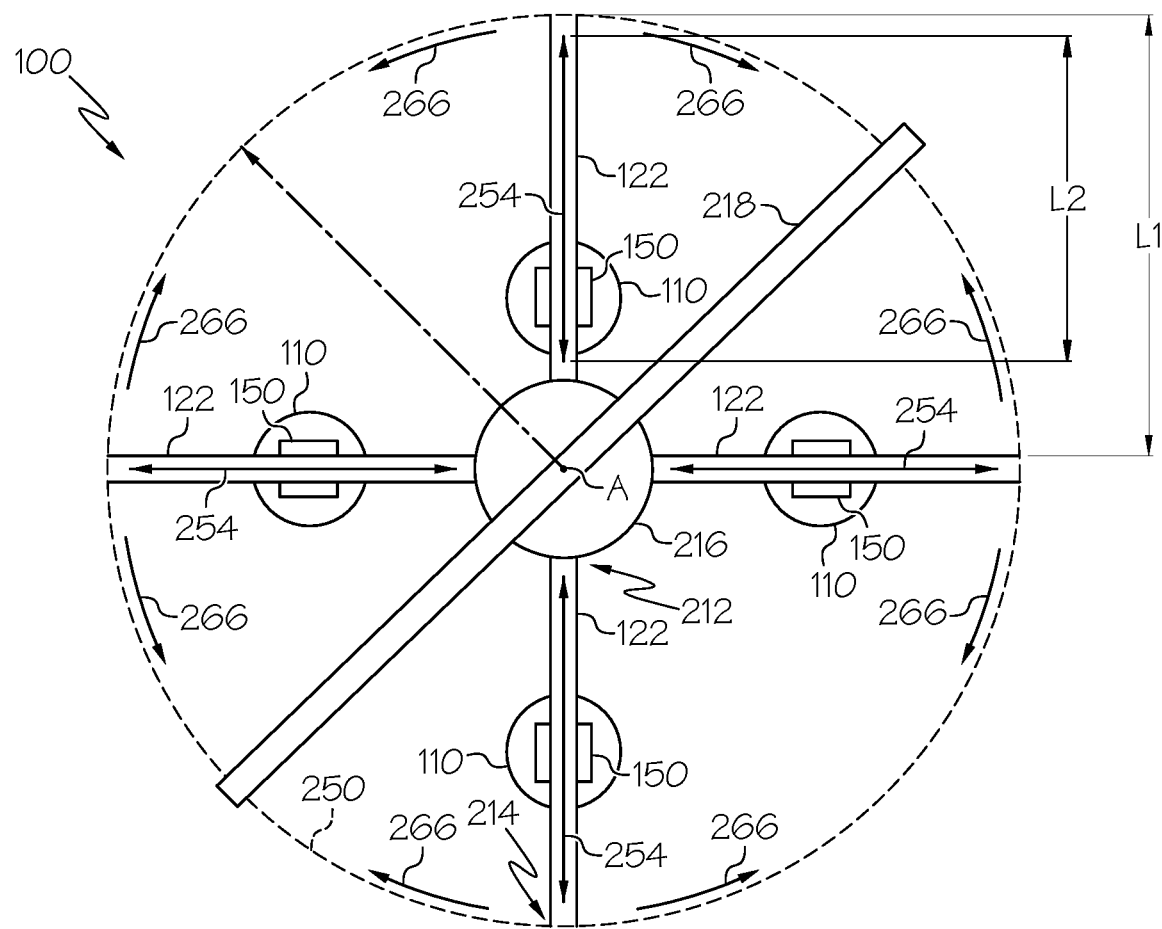
Figure 15:
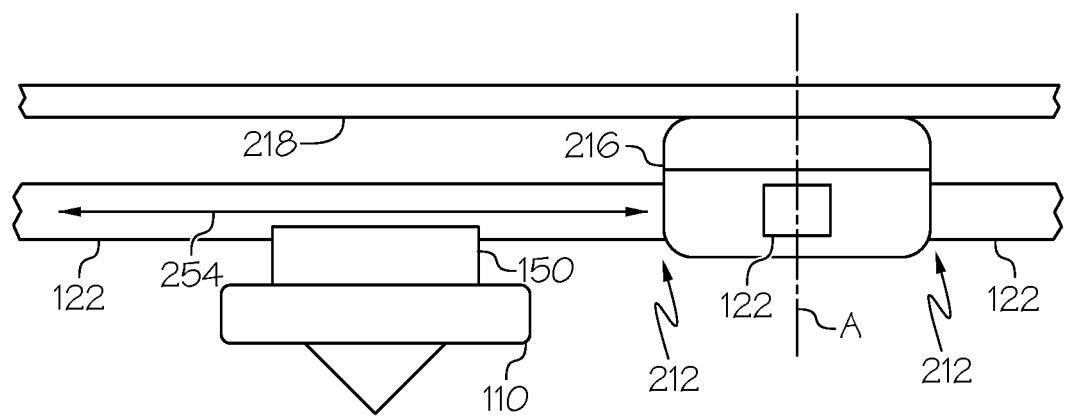
Figure 16:
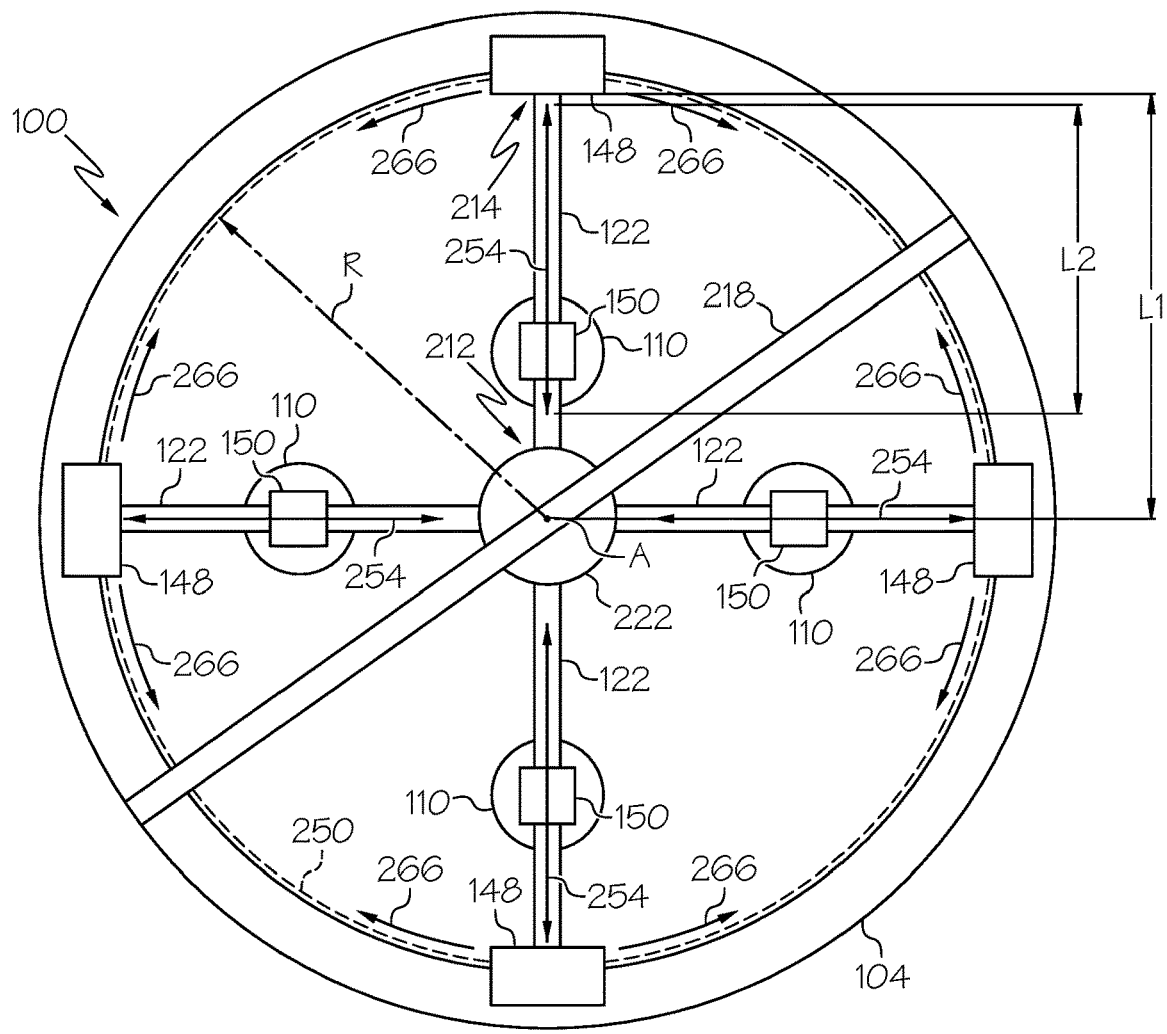
Figure 17:
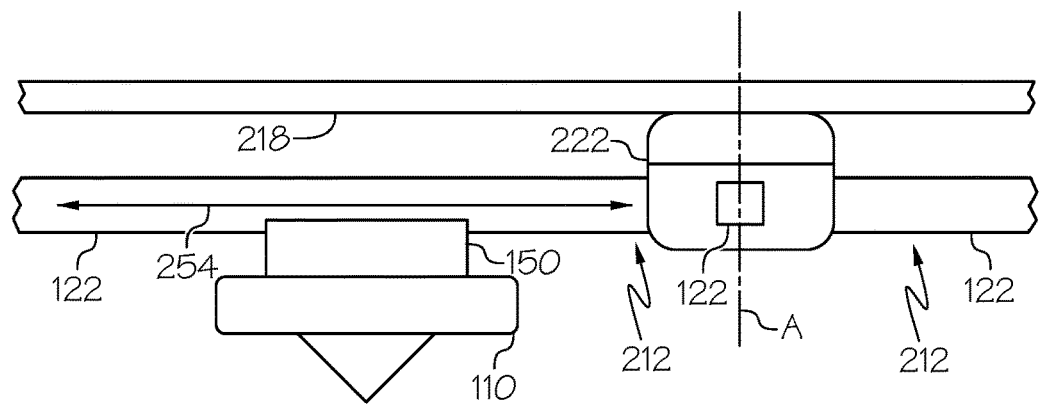
Figure 18:
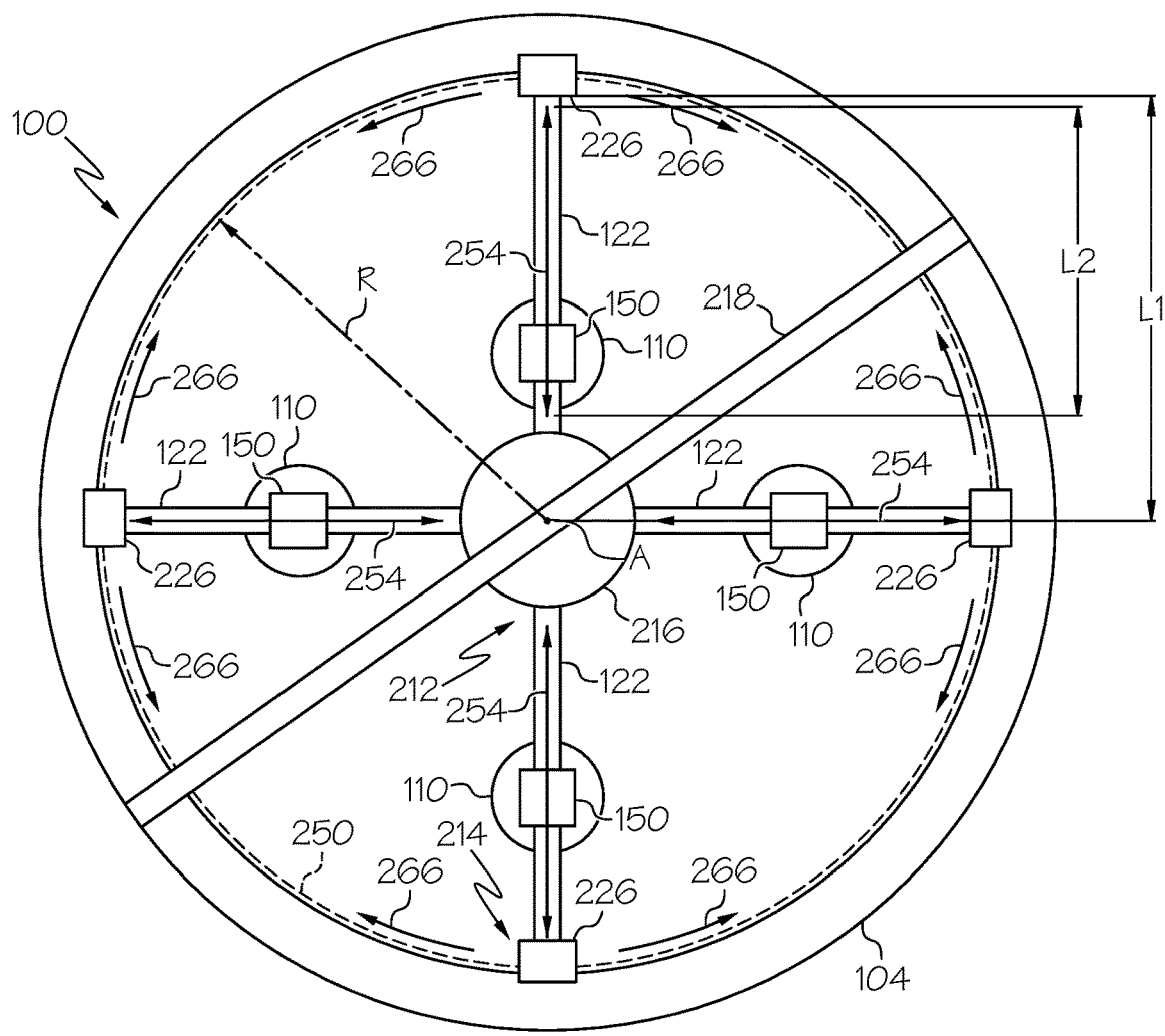
Figure 19:
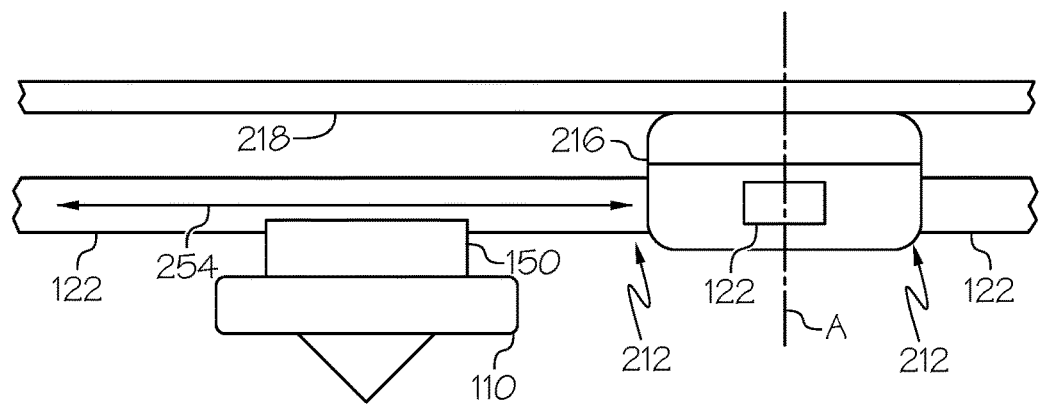
Figure 20:
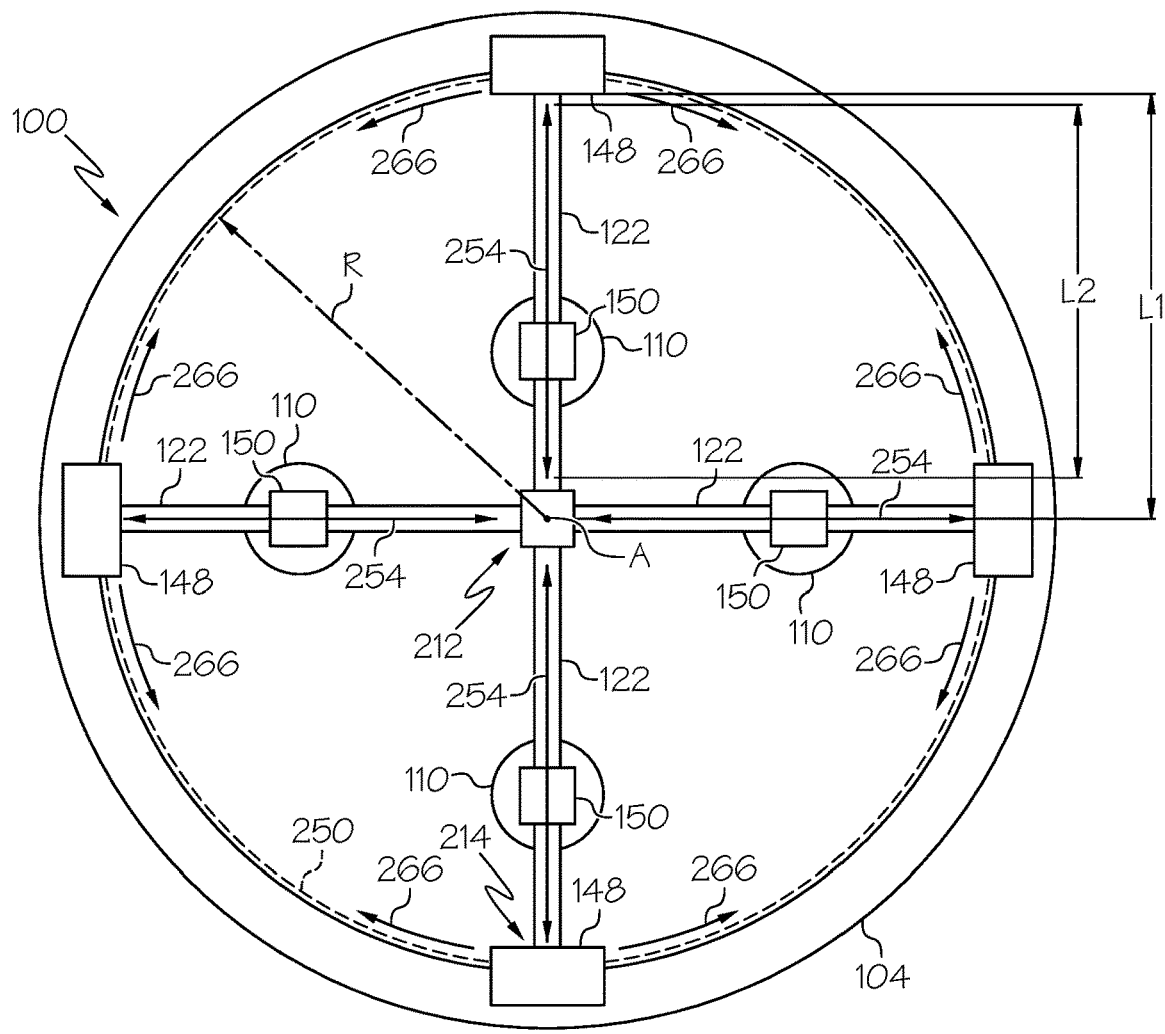
Figure 21:
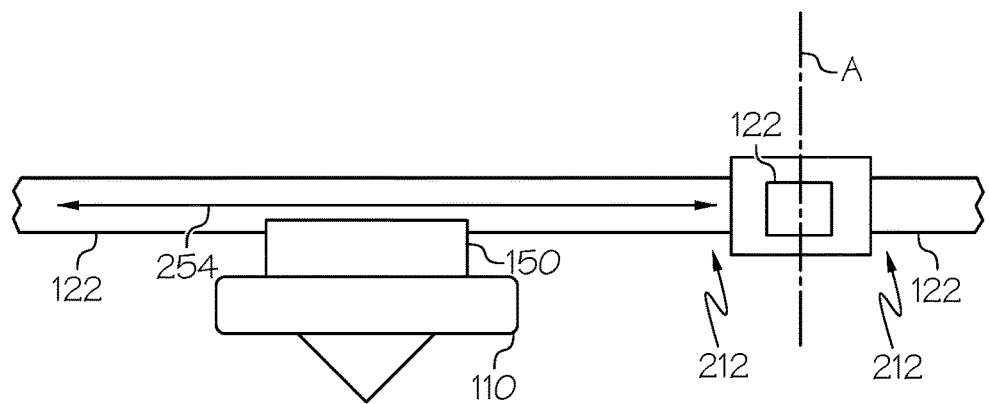
Figure 22:
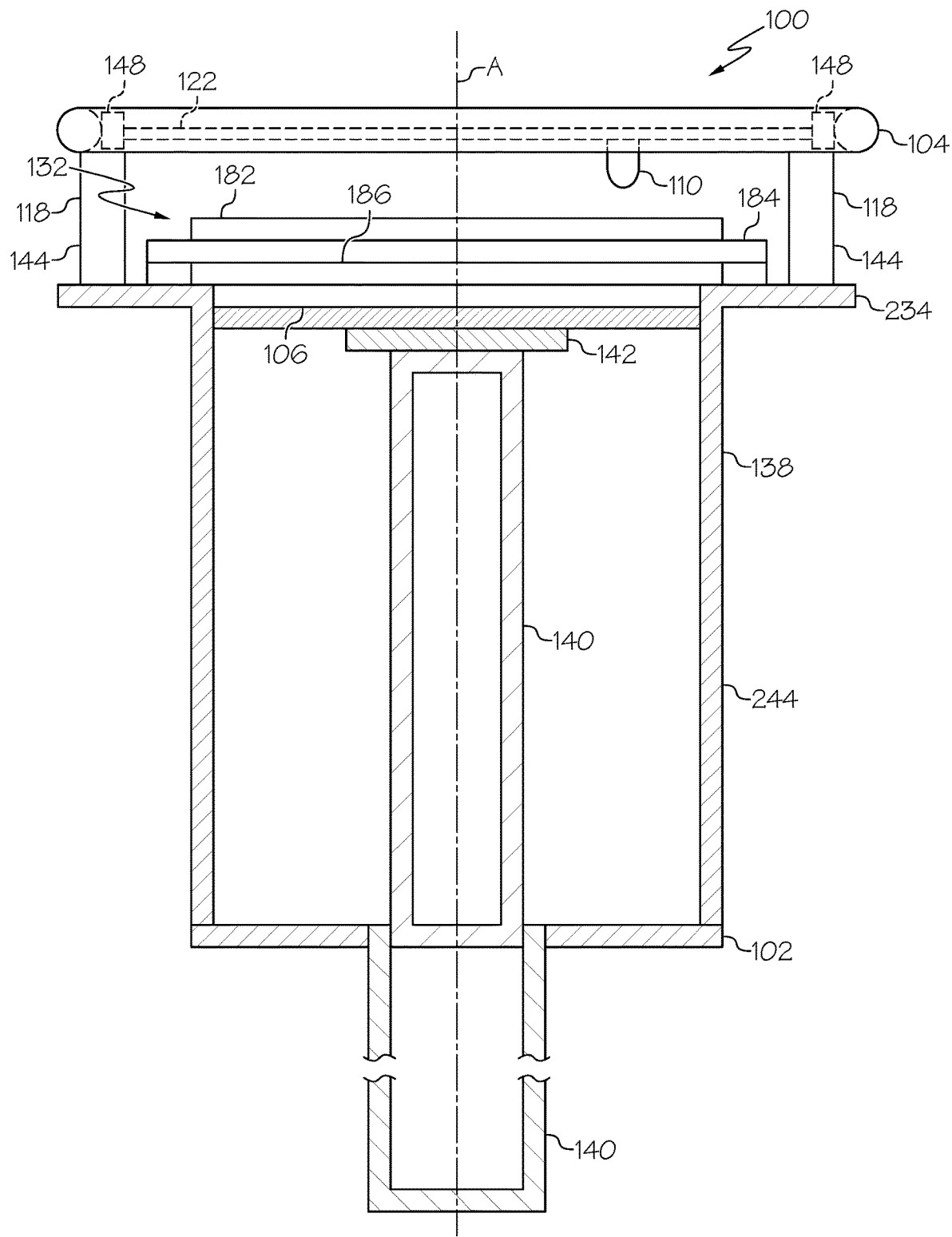
Figure 23:
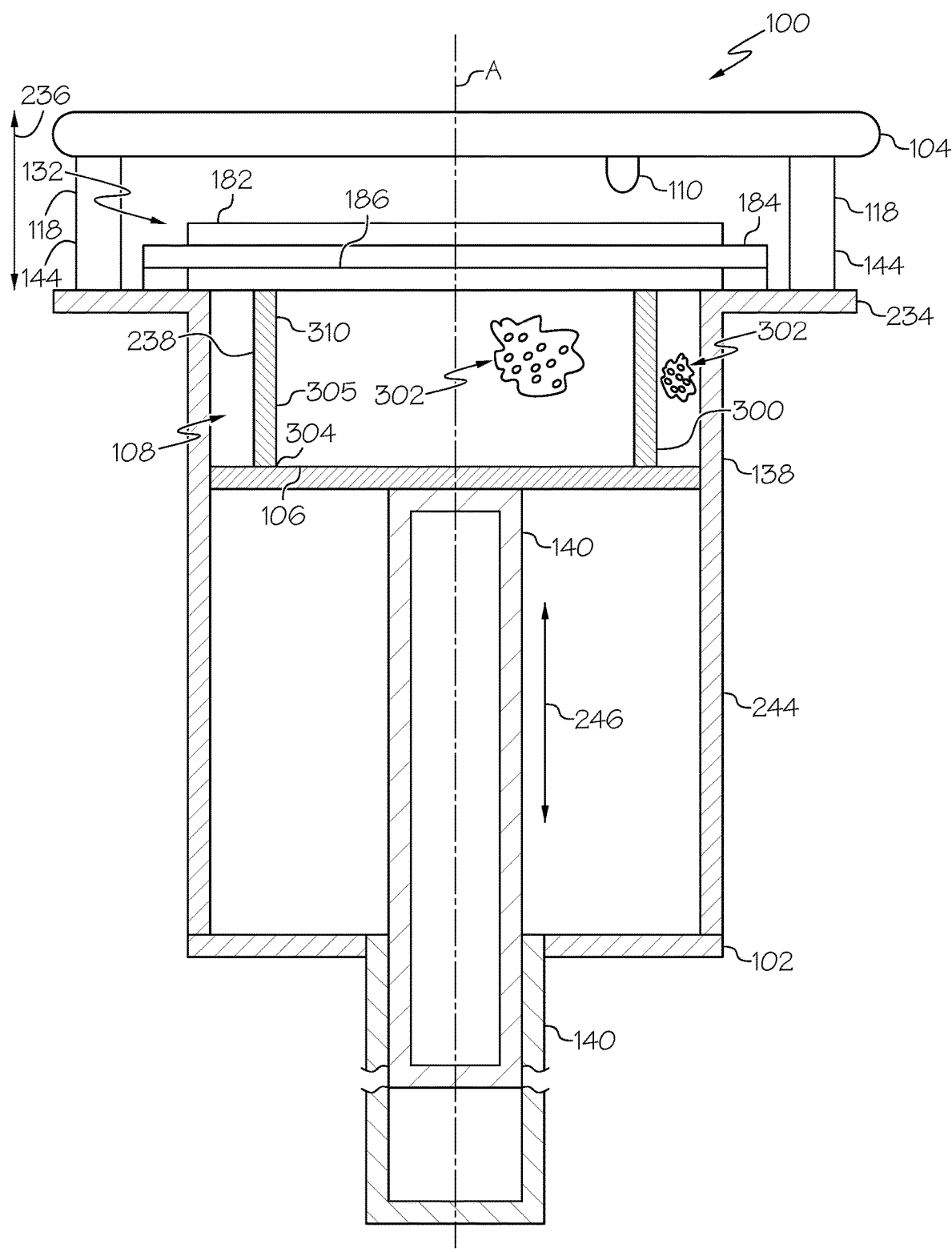
Figure 24:
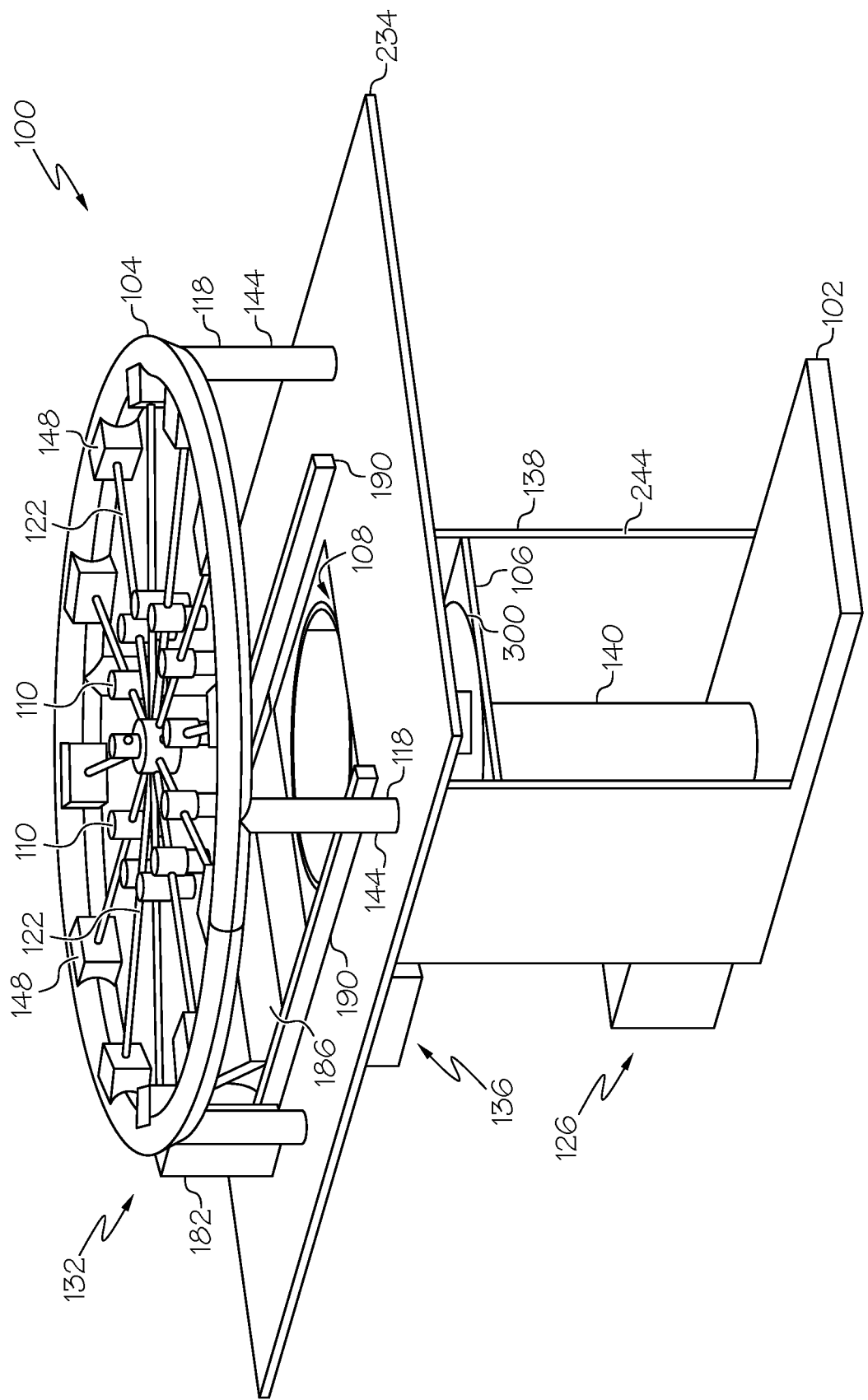
Figure 25:
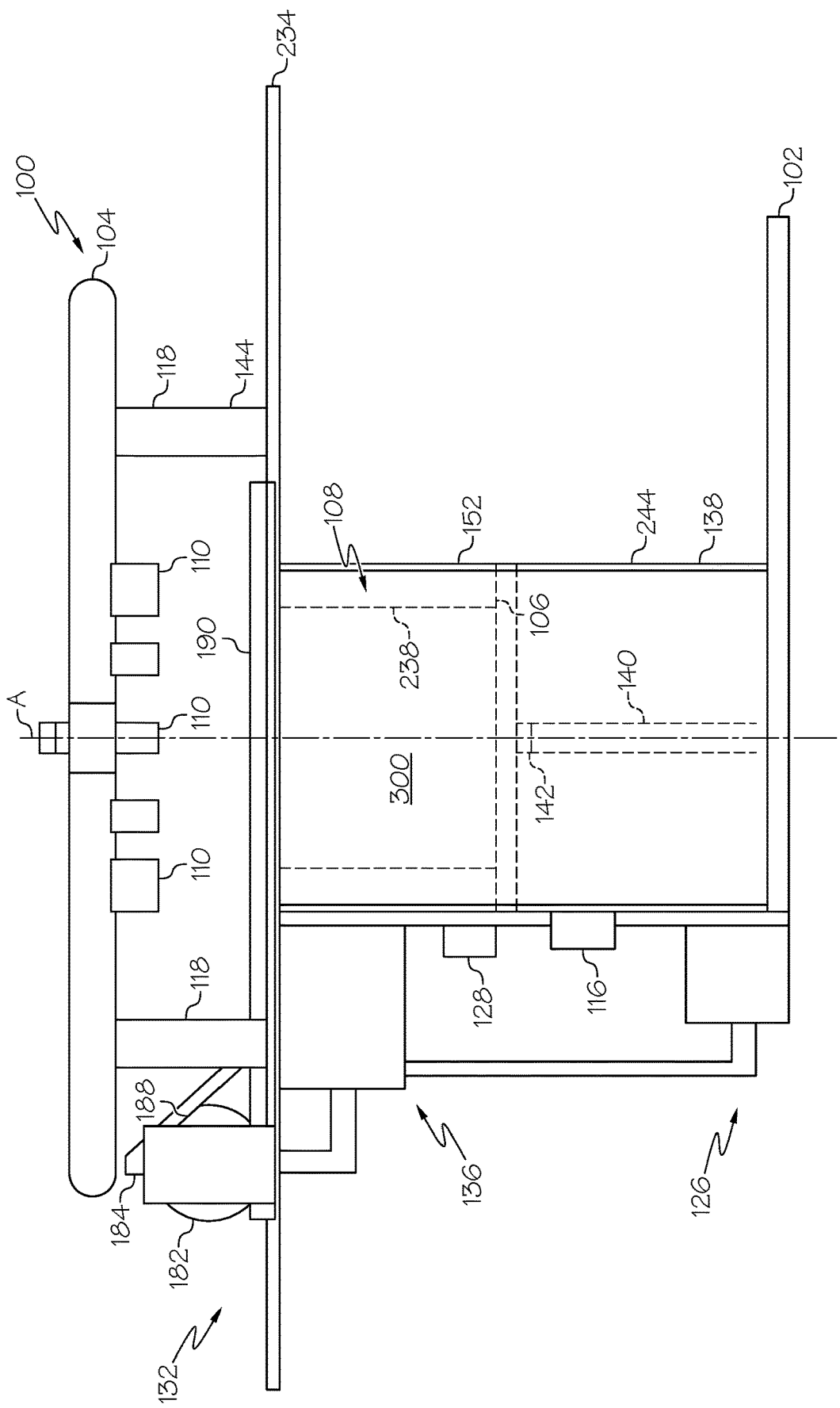
Figure 26:
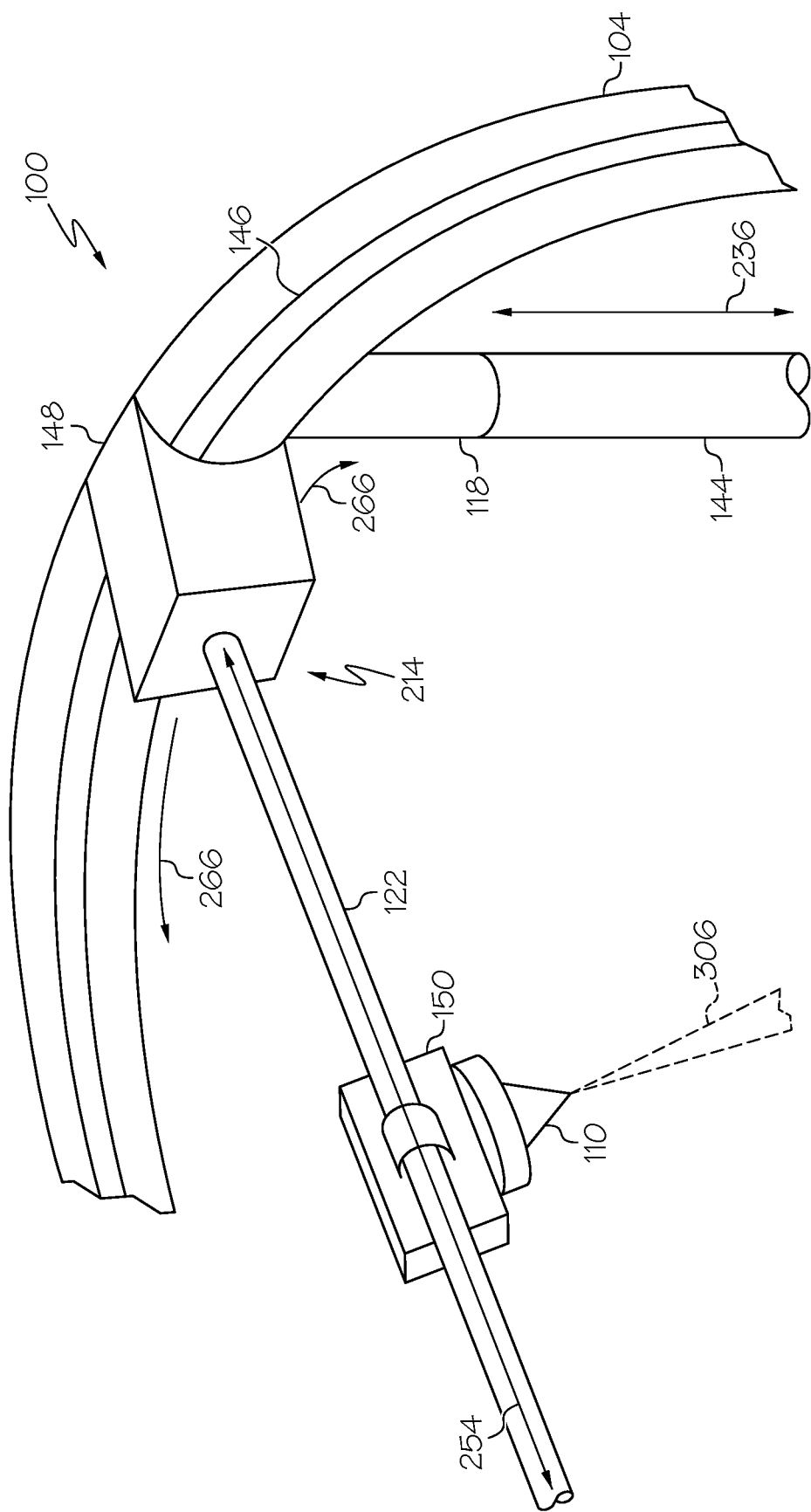
Figure 27:
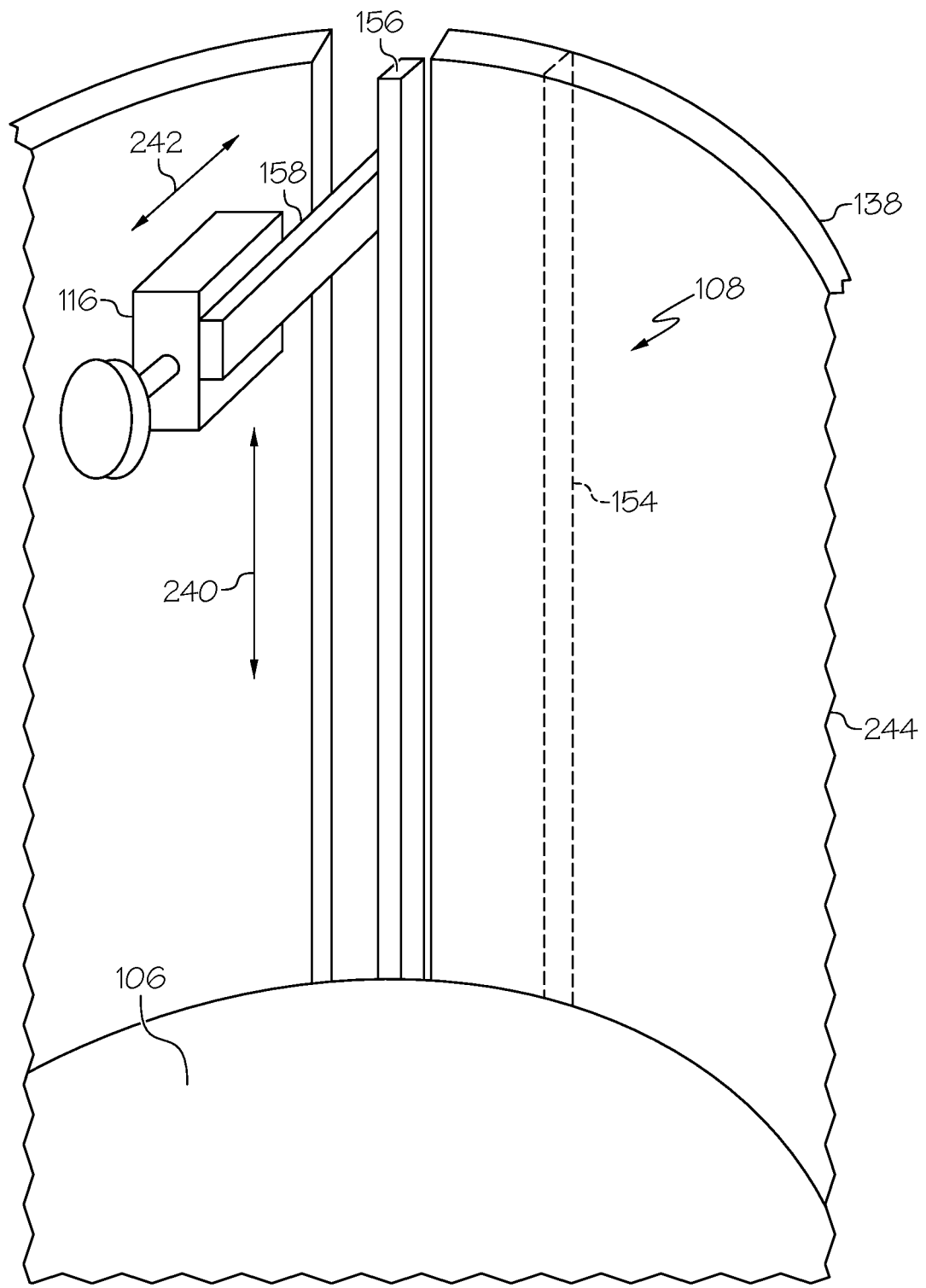
Figure 28:
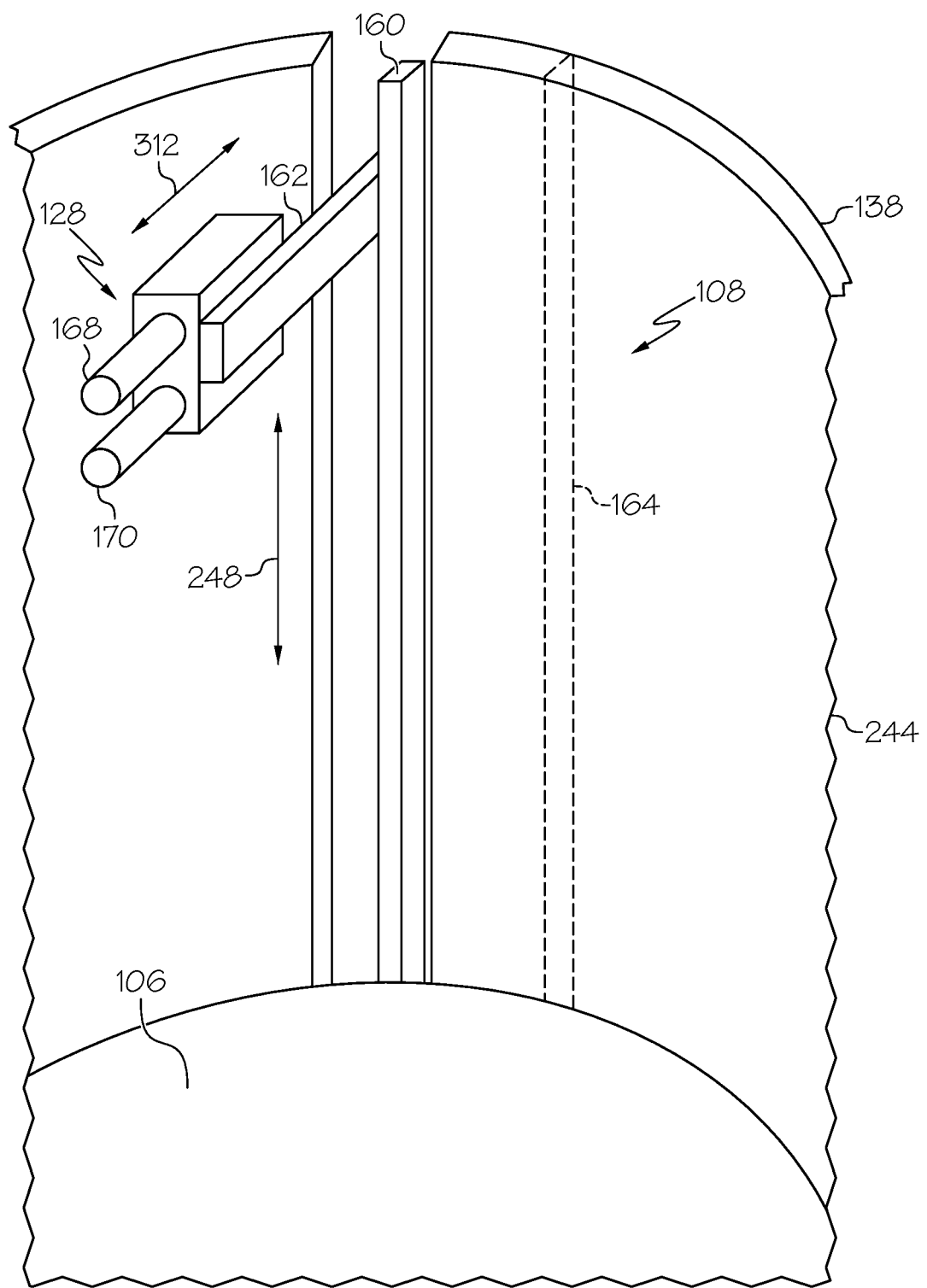
Figure 29:
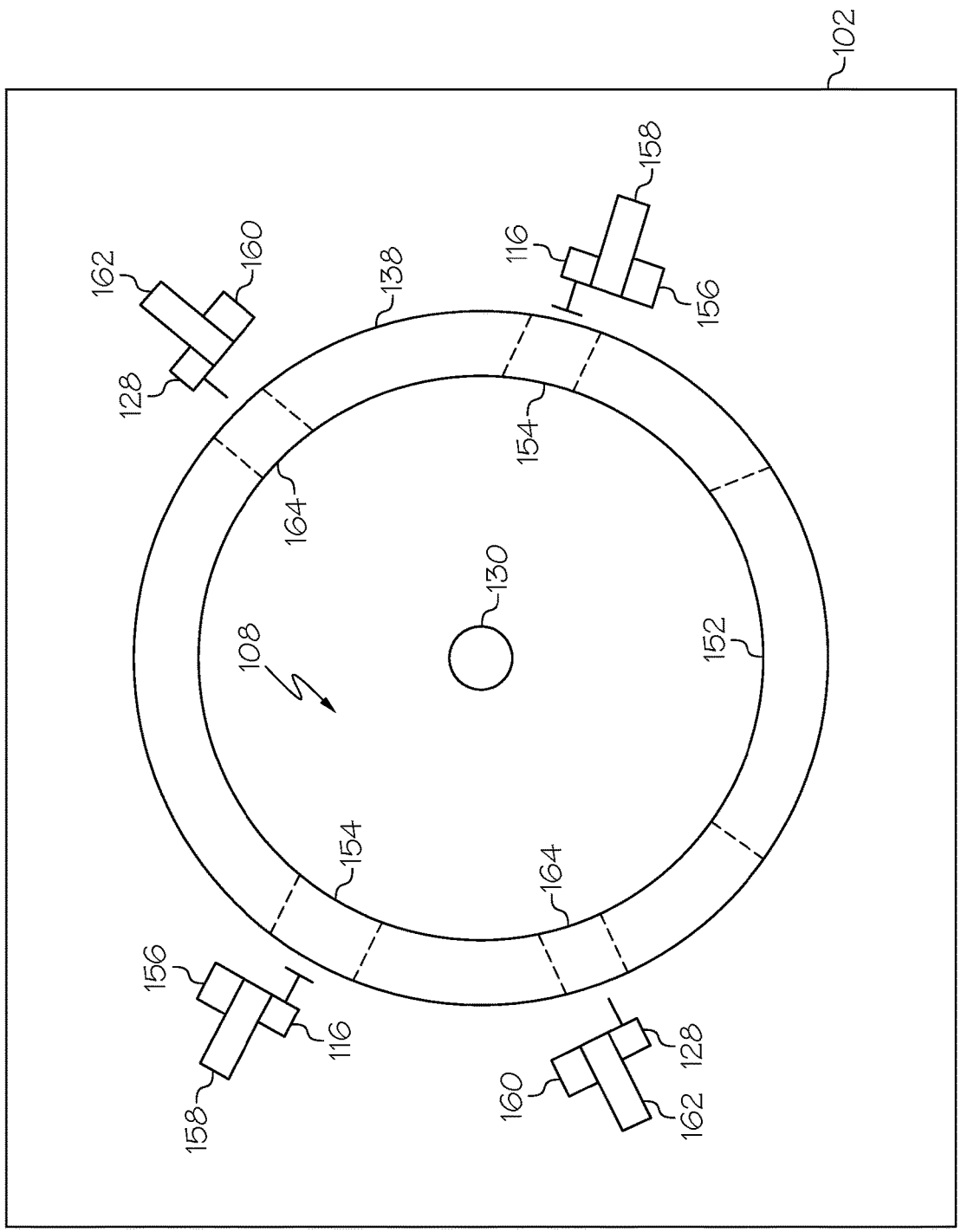
Figure 30:
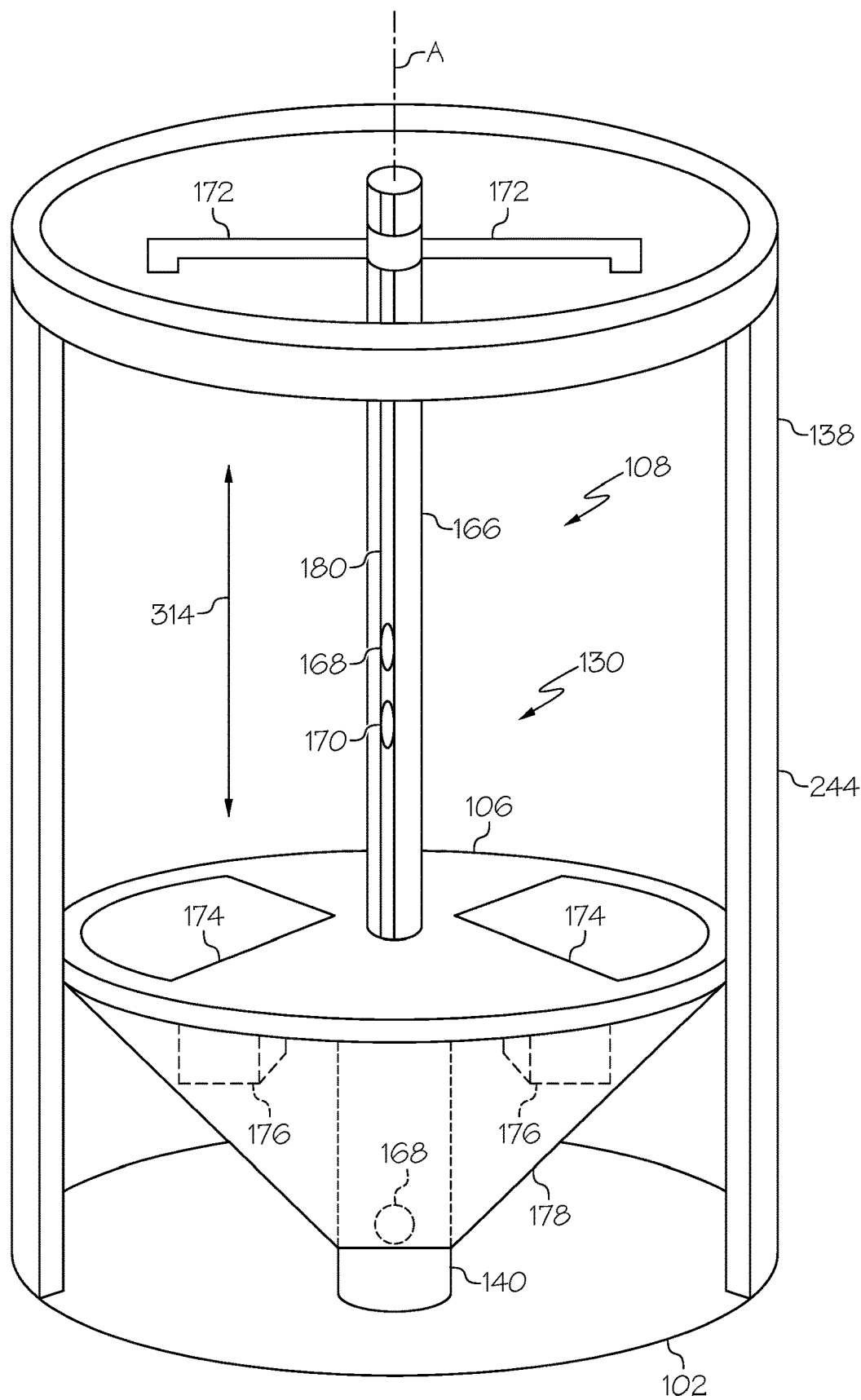
Figure 31:
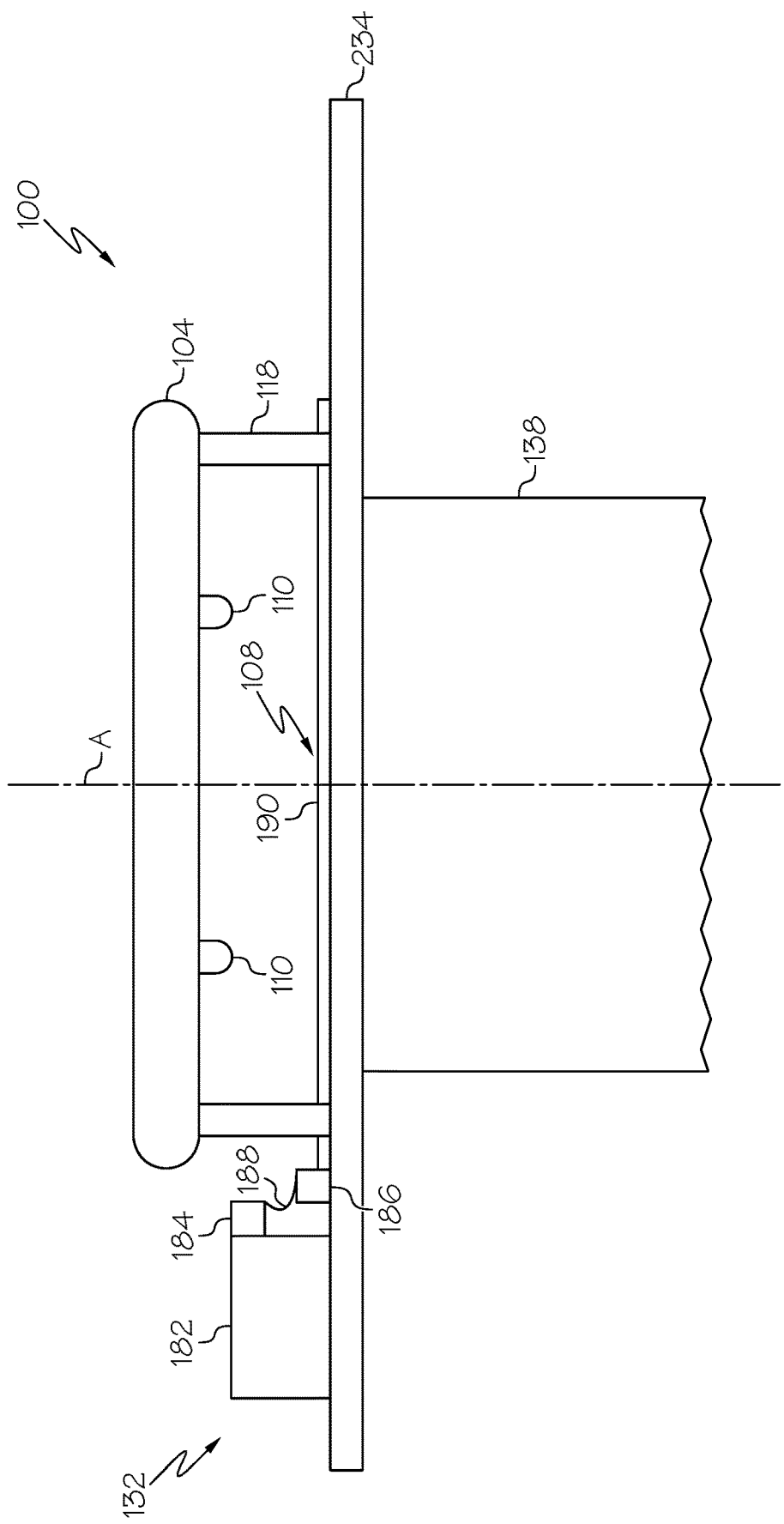
Figure 32:
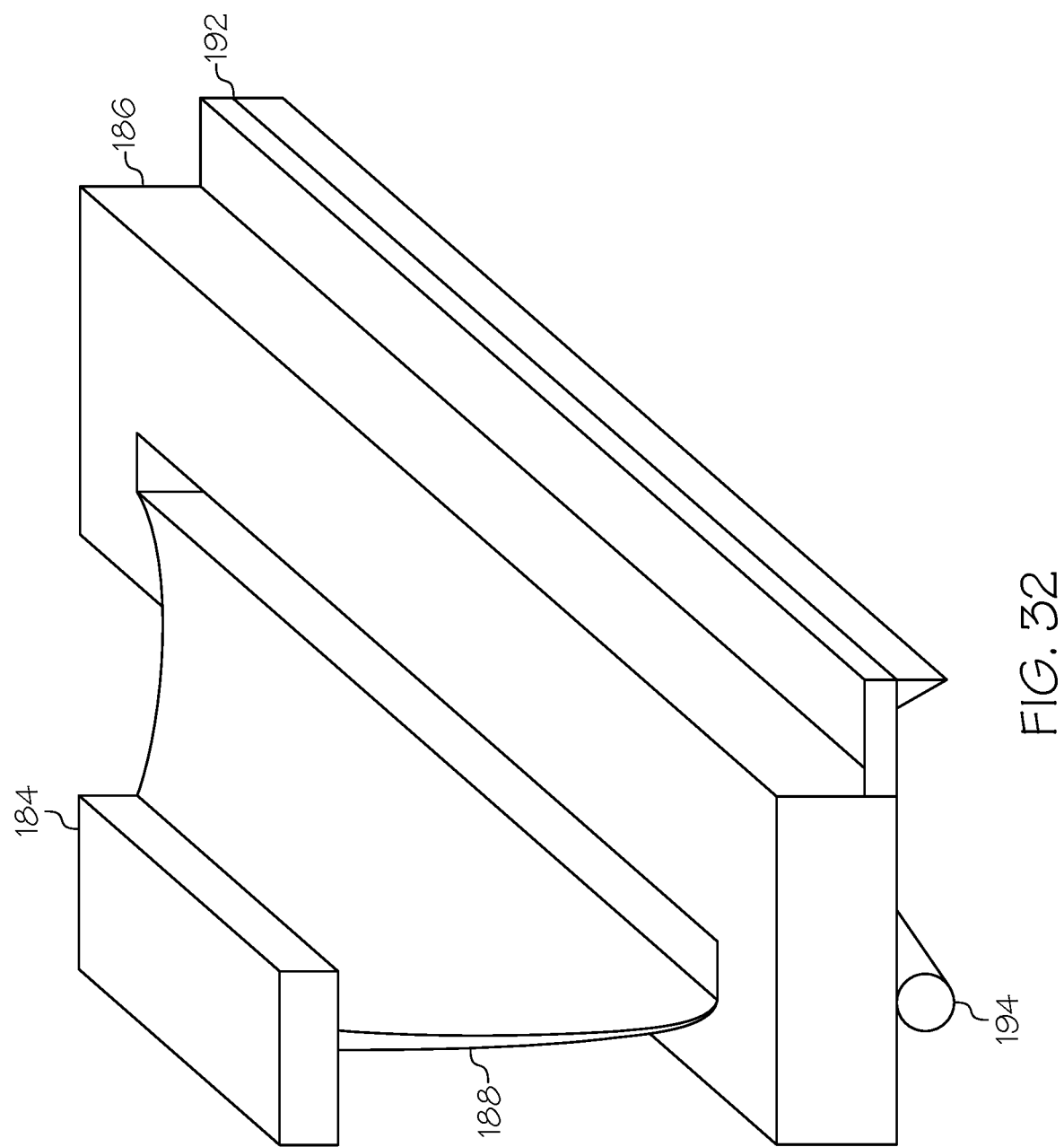
Figure 33:
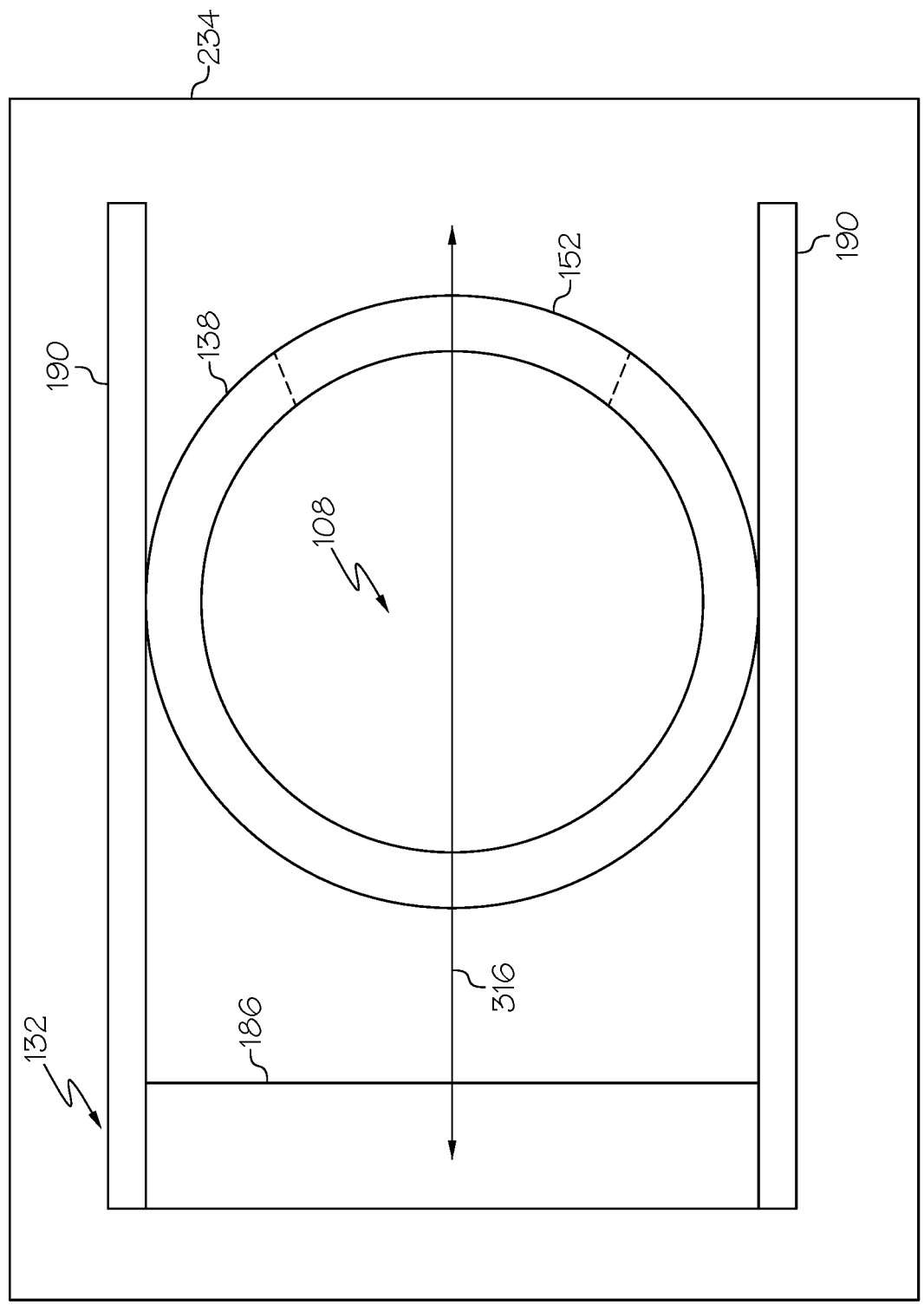
Figure 34:
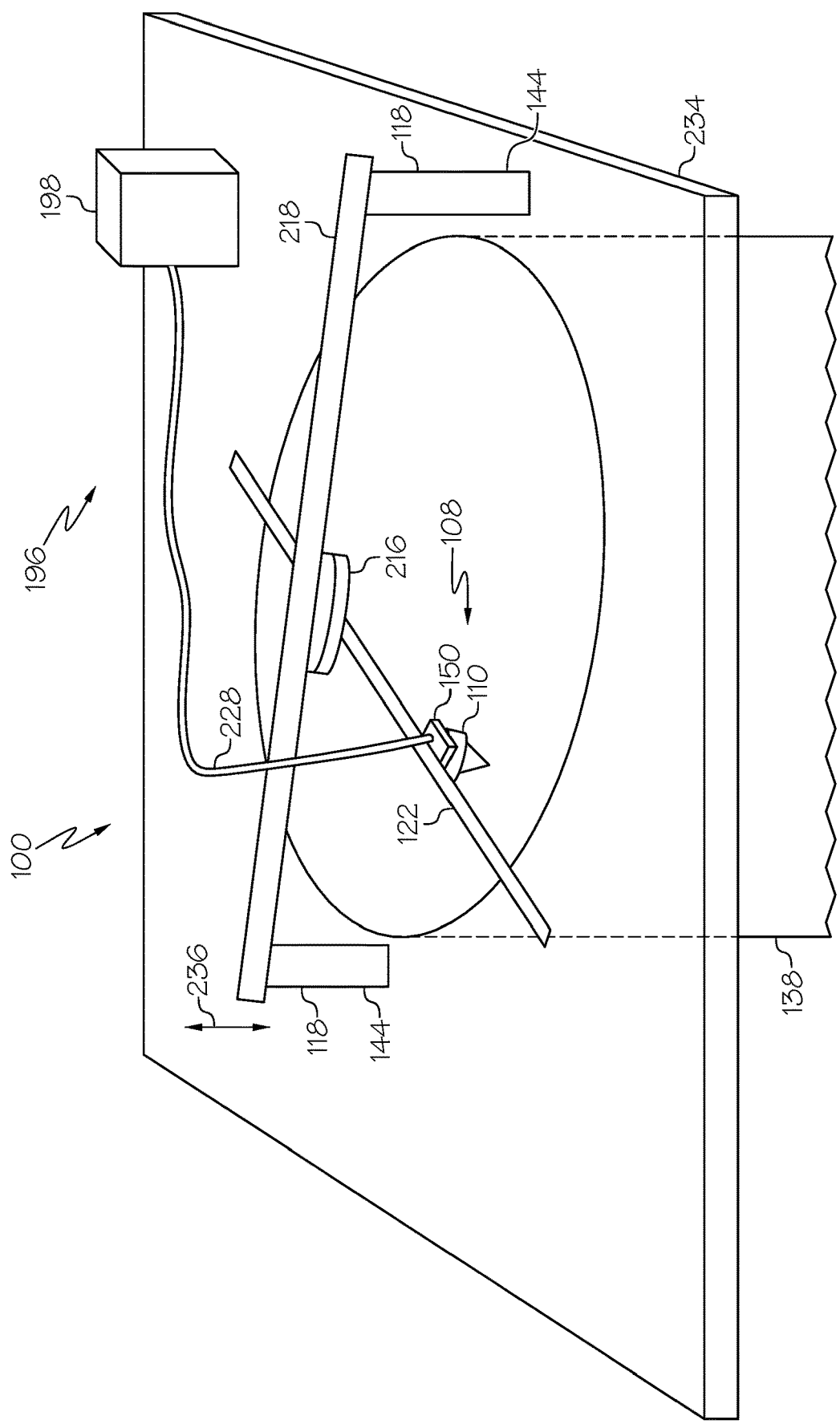
Figure 35:
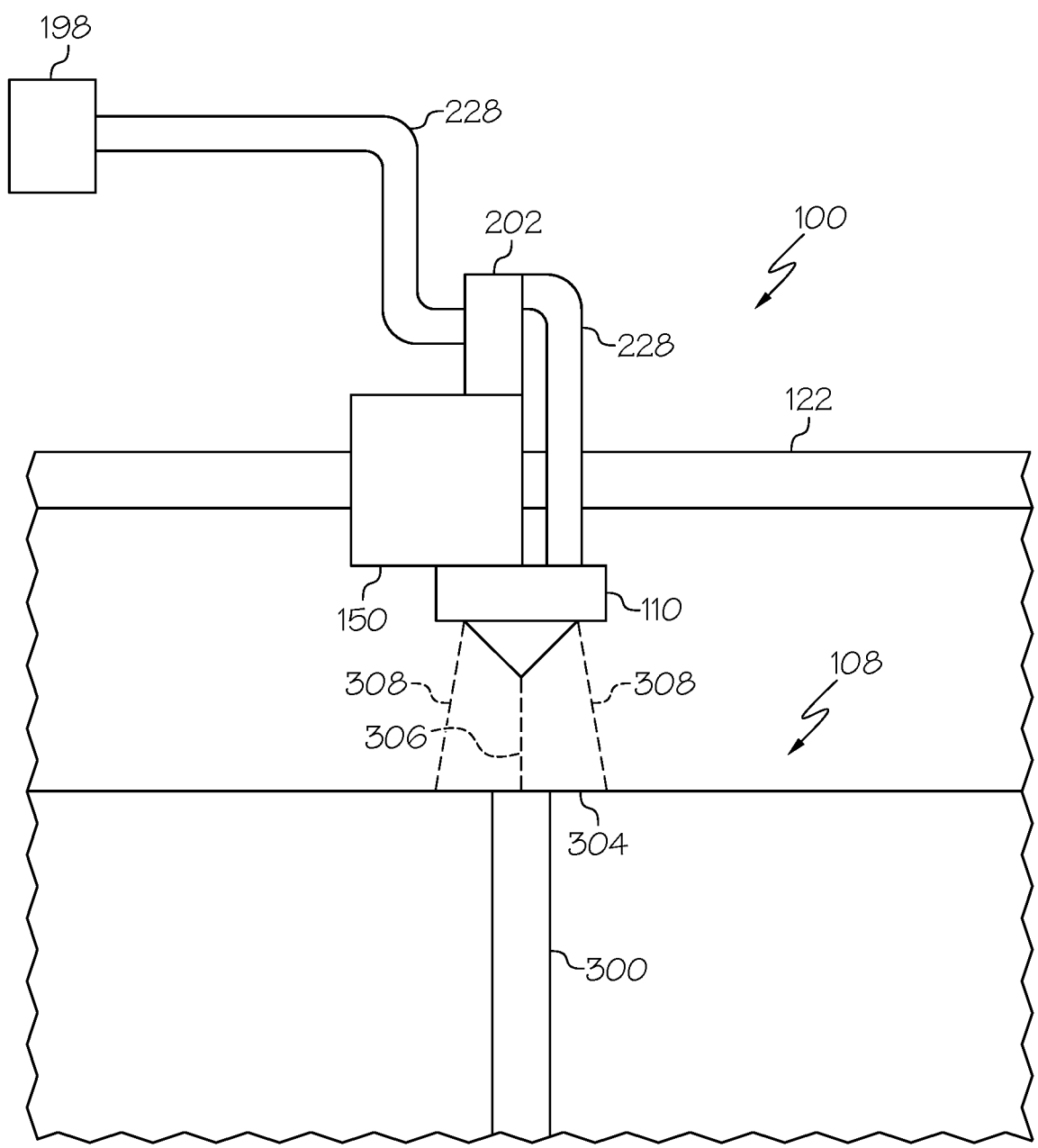
Figure 36:
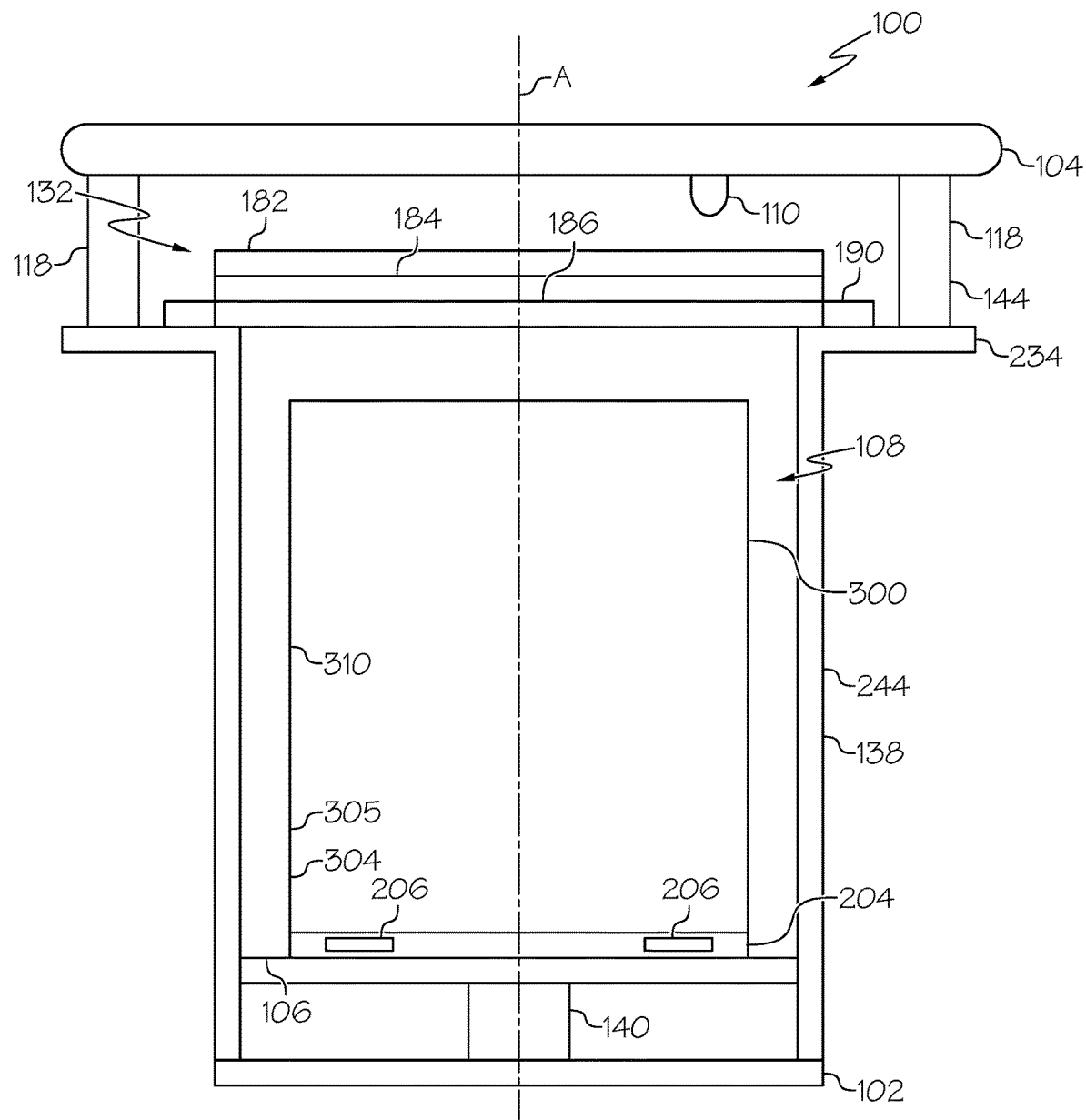
Figure 37:
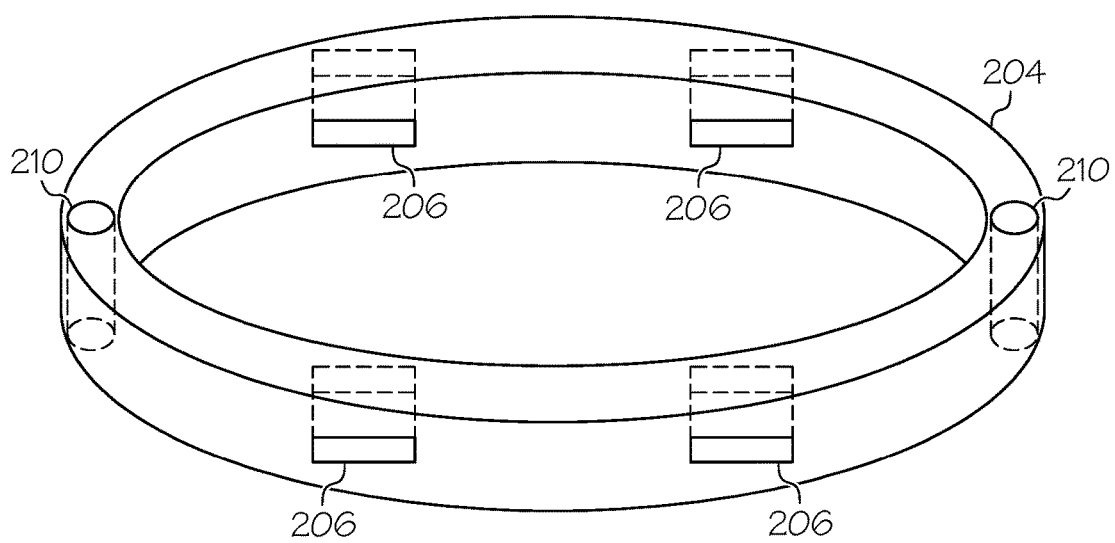
Figure 38:
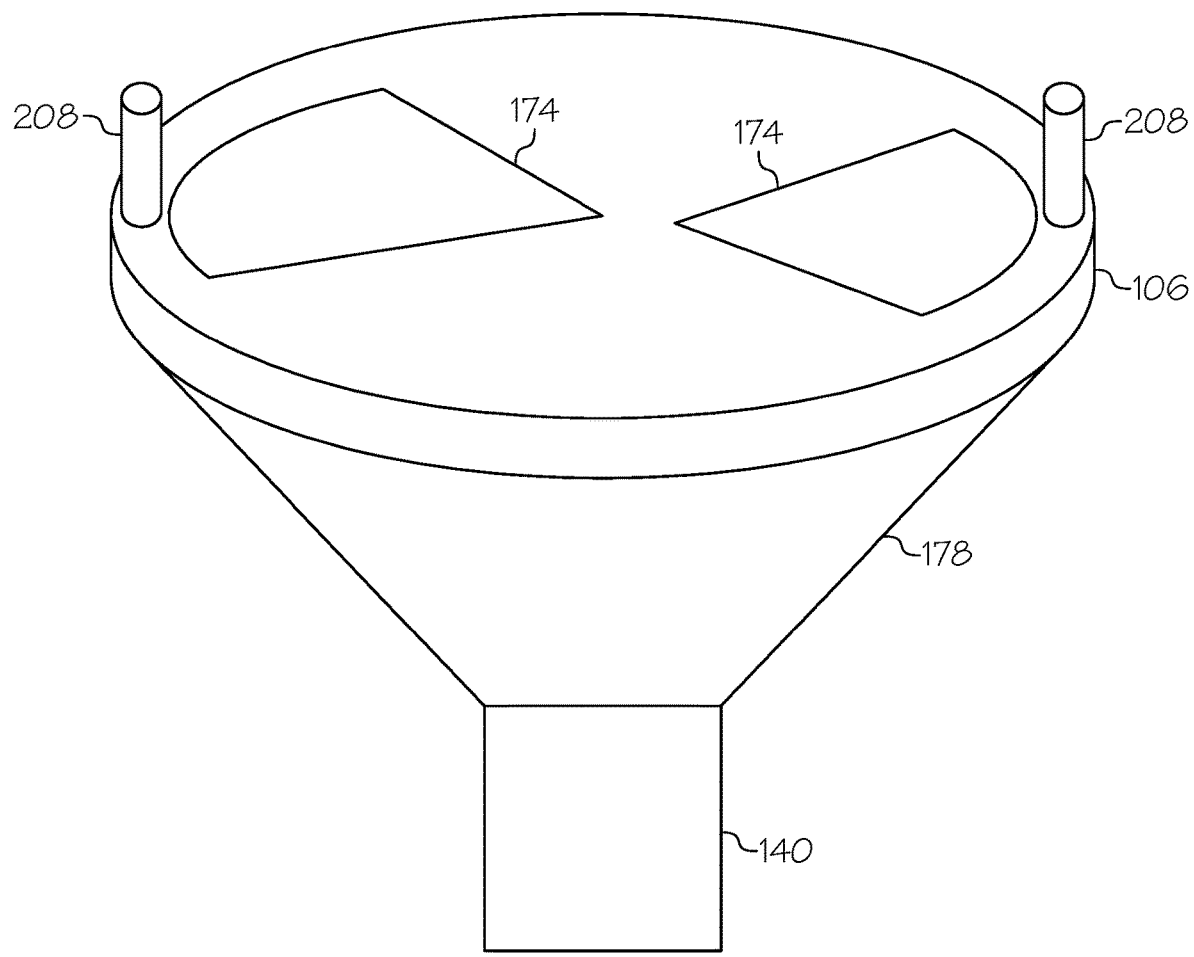
Figure 41:
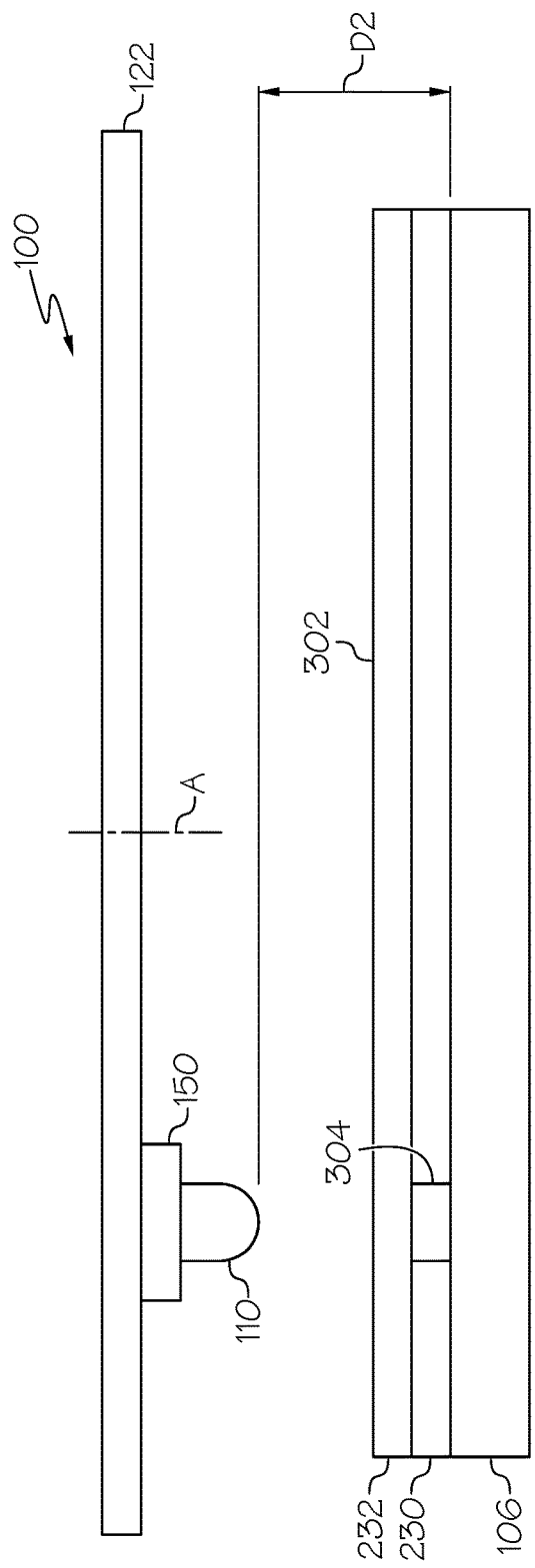
Figure 42:
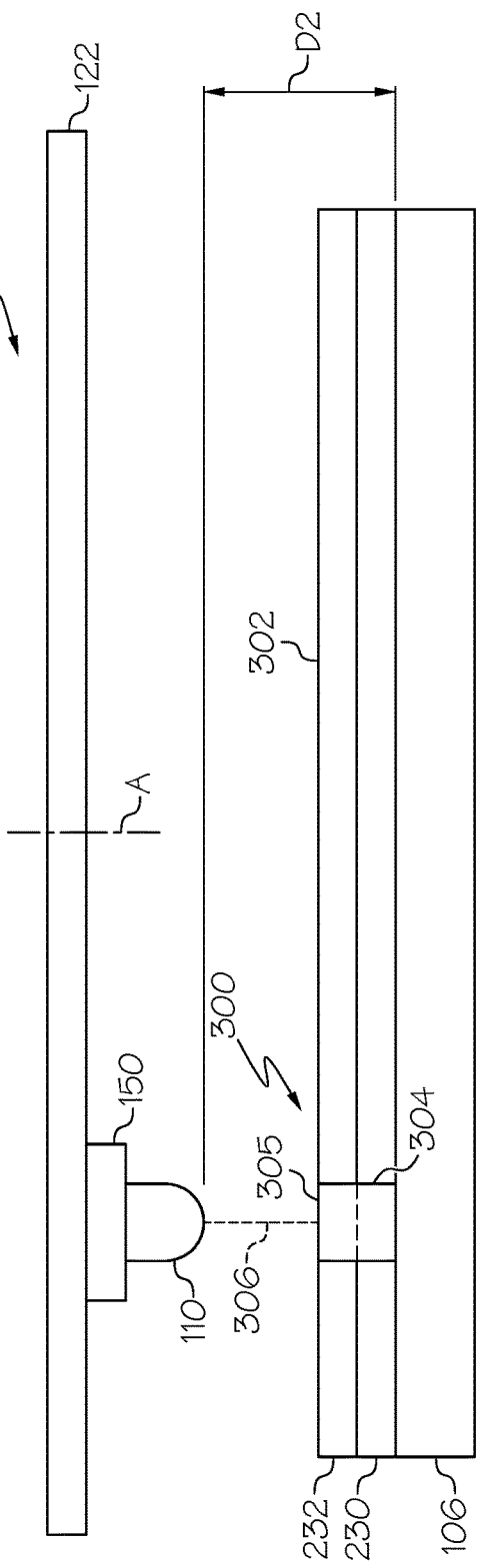
Figure 43A:
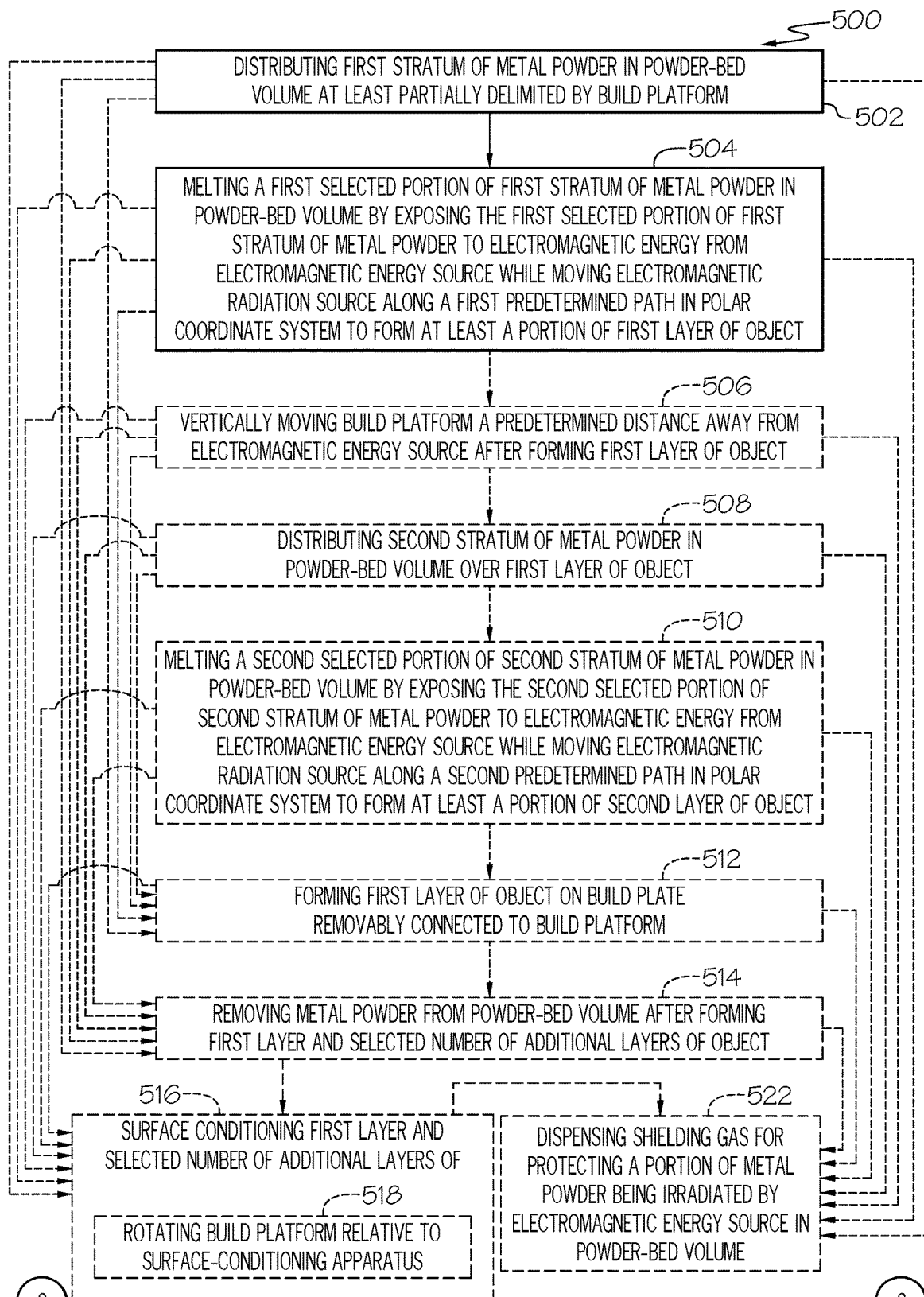
Figure 43B:
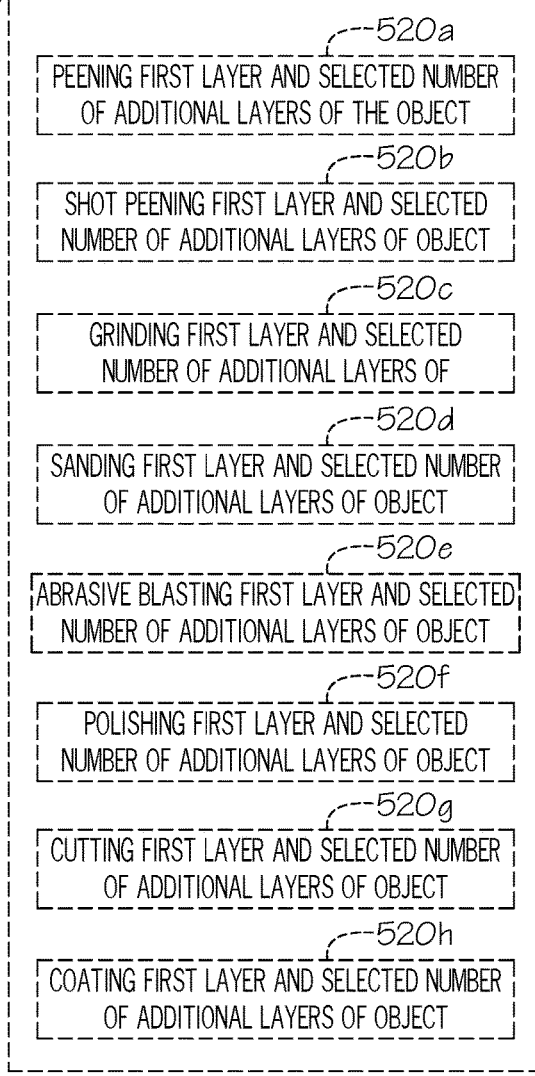
Figure 44:
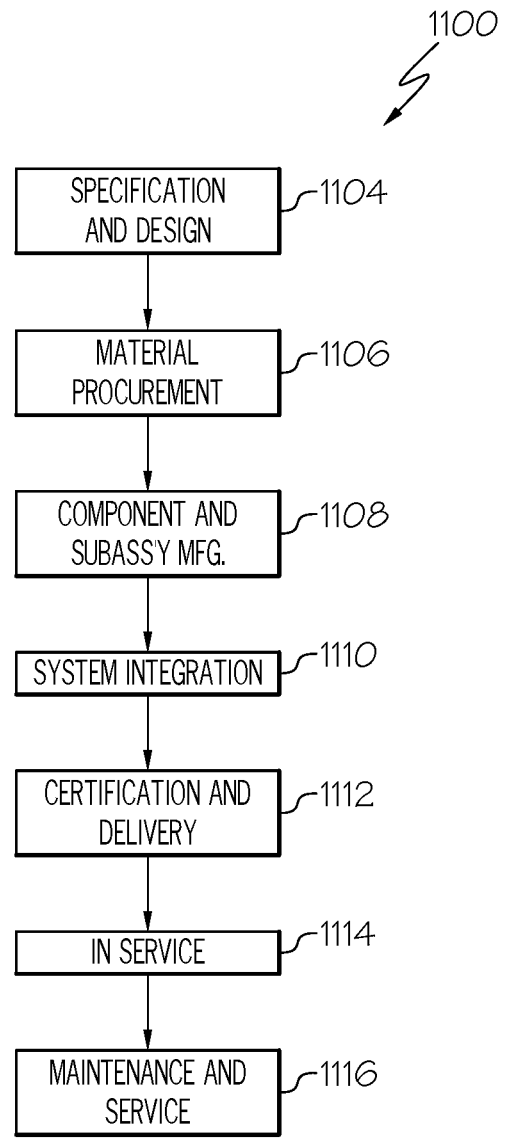

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a first portion of a block diagram of an additive manufacturing apparatus, according to one or more examples of the present disclosure;

FIG. 1B is a second portion of the block diagram of the additive manufacturing apparatus, according to one or more examples of the present disclosure;

FIG. 2 is a schematic illustration of a polar coordinate system of the additive manufacturing apparatus of FIGS. 1A and 1B, according to one or more examples of the present disclosure;

FIG. 3 is a schematic top plan view of the additive manufacturing apparatus of FIGS. 1A and 1B, according to one or more examples of the present disclosure;

FIG. 4 is a schematic partial side elevation view of the additive manufacturing apparatus of FIG. 3, according to one or more examples of the present disclosure;

FIG. 5 is a schematic top plan view of the additive manufacturing apparatus of FIGS. 1A and 1B, according to one or more examples of the present disclosure;

FIG. 6 is a schematic partial side elevation view of the additive manufacturing apparatus of FIG. 5, according to one or more examples of the present disclosure;

FIG. 7 is a schematic top plan view of the additive manufacturing apparatus of FIGS. 1A and 1B, according to one or more examples of the present disclosure;

FIG. 8 is a schematic partial side elevation view of the additive manufacturing apparatus of FIG. 7, according to one or more examples of the present disclosure;

FIG. 9 is a schematic top plan view of the additive manufacturing apparatus of FIGS. 1A and 1B, according to one or more examples of the present disclosure;

FIG. 10 is a schematic top plan view of the additive manufacturing apparatus of FIGS. 1A and 1B, according to one or more examples of the present disclosure;

FIG. 11 is a schematic partial side elevation view of the additive manufacturing apparatus of FIG. 10, according to one or more examples of the present disclosure;

FIG. 12 is a schematic top plan view of the additive manufacturing apparatus of FIGS. 1A and 1B, according to one or more examples of the present disclosure;

FIG. 13 is a schematic partial side elevation view of the additive manufacturing apparatus of FIG. 12, according to one or more examples of the present disclosure;

FIG. 14 is a schematic top plan view of the additive manufacturing apparatus of FIGS. 1A and 1B, according to one or more examples of the present disclosure;

FIG. 15 is a schematic partial side elevation view of the additive manufacturing apparatus of FIG. 14, according to one or more examples of the present disclosure;

FIG. 16 is a schematic top plan view of the additive manufacturing apparatus of FIGS. 1A and 1B, according to one or more examples of the present disclosure;

FIG. 17 is a schematic partial side elevation view of the additive manufacturing apparatus of FIG. 16, according to one or more examples of the present disclosure;

FIG. 18 is a schematic top plan view of the additive manufacturing apparatus of FIGS. 1A and 1B, according to one or more examples of the present disclosure;

FIG. 19 is a schematic partial side elevation view of the additive manufacturing apparatus of FIG. 18, according to one or more examples of the present disclosure;

FIG. 20 is a schematic top plan view of the additive manufacturing apparatus of FIGS. 1A and 1B, according to one or more examples of the present disclosure;

FIG. 21 is a schematic partial side elevation view of the additive manufacturing apparatus of FIG. 20, according to one or more examples of the present disclosure;

FIG. 22 is a schematic side elevation view, in partial section, of the additive manufacturing apparatus of FIGS. 1A and 1B, according to one or more examples of the present disclosure;

FIG. 23 is a schematic side elevation view, in partial section, of the additive manufacturing apparatus of FIGS. 1A and 1B, according to one or more examples of the present disclosure;

FIG. 24 is a schematic perspective view, in partial section, of the additive manufacturing apparatus of FIGS. 1A and 1B, according to one or more examples of the present disclosure;

FIG. 25 is a schematic side elevation view of the additive manufacturing apparatus of FIGS. 1A and 1B, according to one or more examples of the present disclosure;

FIG. 26 is a schematic partial perspective view of the additive manufacturing apparatus of FIGS. 1A and 1B, according to one or more examples of the present disclosure;

FIG. 27 is a schematic partial perspective view of a surface-conditioning apparatus of the additive manufacturing apparatus of FIGS. 1A and 1B, according to one or more examples of the present disclosure;

FIG. 28 is a schematic partial perspective view of a first powder-removal subsystem of the additive manufacturing apparatus of FIGS. 1A and 1B, according to one or more examples of the present disclosure;

FIG. 29 is a schematic top plan view of the powder-containment compartment, the surface-conditioning apparatus, the first powder-removal subsystem, and a second powder-removal subsystem of the additive manufacturing apparatus of FIGS. 1A and 1B, according to one or more examples of the present disclosure;

FIG. 30 is a schematic perspective view of the second powder-removal subsystem of the additive manufacturing apparatus of FIGS. 1A and 1B, according to one or more examples of the present disclosure;

FIG. 31 is a schematic side elevation view of a powder-dispensing apparatus of the additive manufacturing apparatus of FIGS. 1A and 1B, according to one or more examples of the present disclosure;

FIG. 32 is a schematic perspective view of a powder-distribution box of the additive manufacturing apparatus of FIGS. 1A and 1B, according to one or more examples of the present disclosure;

FIG. 33 is a schematic top plan view of the powder-dispensing apparatus of the additive manufacturing apparatus of FIGS. 1A and 1B, according to one or more examples of the present disclosure;

FIG. 34 is a schematic perspective view of a shielding-gas system of the additive manufacturing apparatus of FIGS. 1A and 1B, according to one or more examples of the present disclosure;

FIG. 35 is a schematic partial side elevation view of the shielding-gas system of the additive manufacturing apparatus of FIGS. 1A and 1B, according to one or more examples of the present disclosure;

FIG. 36 is a schematic side elevation view of the additive manufacturing apparatus of FIGS. 1A and 1B, according to one or more examples of the present disclosure;

FIG. 37 is a schematic perspective view of a build plate of the additive manufacturing apparatus of FIGS. 1A and 1B, according to one or more examples of the present disclosure;

FIG. 38 is a schematic perspective view of the build platform of the additive manufacturing apparatus of FIGS. 1A and 1B, according to one or more examples of the present disclosure;

FIG. 39 is a schematic side elevation view of an electromagnetic energy source and a build platform of the additive manufacturing apparatus of FIGS. 1A and 1B, according to one or more examples of the present disclosure;

FIG. 40 is a schematic side elevation view of an electromagnetic energy source and a build platform of the additive manufacturing apparatus of FIGS. 1A and 1B, according to one or more examples of the present disclosure;

FIG. 41 is a schematic side elevation view of an electromagnetic energy source and a build platform of the additive manufacturing apparatus of FIGS. 1A and 1B, according to one or more examples of the present disclosure;

FIG. 42 is a schematic side elevation view of an electromagnetic energy source and a build platform of the additive manufacturing apparatus of FIGS. 1A and 1B, according to one or more examples of the present disclosure;

FIG. 43A is a first portion of a block diagram of a method for additively manufacturing an object from a metal powder, according to one or more examples of the present disclosure;

FIG. 43B is a second portion of the block diagram of the method for additively manufacturing an object from a metal powder, according to one or more examples of the present disclosure;

FIG. 44 is a block diagram of aircraft production and service methodology; and

Figure 45:
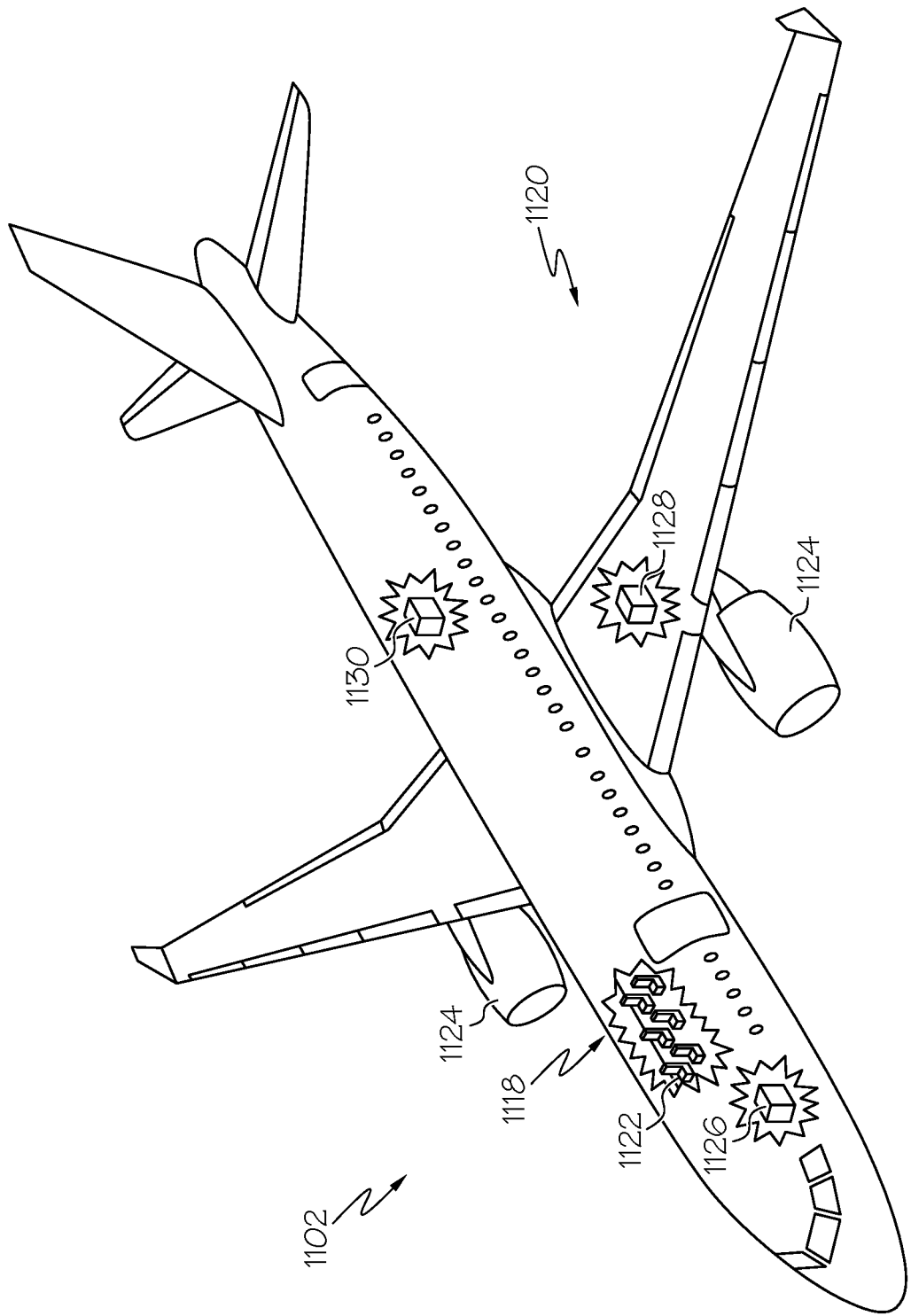

FIG. 45 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional examples of the present disclosure. Likewise, elements and/or components, if any, represented with dashed lines, indicate alternative or optional examples of the present disclosure. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 1A, 1B and 43-45, referred to above, the blocks may represent operations and/or portions thereof and lines connecting the various blocks do not imply any particular order or dependency of the operations or portions thereof.

FIGS. 1A, 1B and 43-45 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring e.g., to FIGS. 1A, 1B and 2-42, additive manufacturing apparatus 100 (referred to generally as apparatus 100) comprises linear rail 122, having length L1. Linear rail 122 is one of rotatable or revolvable in a horizontal plane about vertical axis A (FIGS. 3-21). Apparatus 100 further comprises electromagnetic energy source 110 movably coupled to linear rail 122 and movable in polar coordinate system 250 having radius R (FIG. 2). The preceding subject matter of the instant paragraph is in accordance with example 1 of the present disclosure.

Additive manufacturing apparatus 100 facilitates movement of electromagnetic energy source 110 and, thus, electromagnetic energy 306 generated by electromagnetic energy source 110, along curvilinear travel path 252 (FIG. 2) to any location defined by polar coordinate system 250 when manufacturing object 300 (FIG. 1A) on a large scale.

Additive manufacturing apparatus 100 is used to manufacture object 300. During additive manufacturing of object 300 (FIG. 1A), moving electromagnetic energy source 110 in polar coordinate system 250 produces object 300 (e.g., large-scale object) having any manufactured shape, such as a generally cylindrical shape (e.g., an aircraft fuselage). As one specific, non-limiting example, during an additive manufacturing process, electromagnetic energy source 110 moves along curvilinear travel path 252 (FIG. 2) in polar coordinate system 250 to manufacture object 300 having at least a partially curvilinear shape.

Those skilled in the art will appreciate that linear rail 122 may be one or more (e.g., a plurality of) linear rails 122. Each linear rail 122 has electromagnetic energy source 110 associated therewith and moveably coupled thereto.

Additive manufacturing includes any process for manufacturing object 300 that is three-dimensional and in which successive layers of material are laid down, for example, under computer control. Object 300 may be of almost any designed shape or geometry and/or almost any manufactured shape or geometry. As one example, object 300 may be produced from a three-dimensional computer model or some other electronic data source.

Electromagnetic energy source 110 generates and/or emits electromagnetic energy 306 capable of irradiating a base material to form a solid homogeneous mass of material (e.g., object 300). As one example, additive manufacturing apparatus 100 is used to manufacture object 300 made of metal. Additive manufacturing apparatus 100 utilizes electromagnetic energy source 110, for example, under computer control, to form object 300 from metal by melting metal powder 302 layer-by-layer with electromagnetic energy 306 into a solid homogeneous metal mass.

Metal powder 302 may include any metal or metal alloy in powder form. As one example, metal powder 302 includes the same material as object 300. For example, metal powder 302 may be pure material having no additional filler materials. As one example, metal powder 302 includes additional materials different than the material of object 300. For example, metal powder 302 may include additional filler materials.

Object 300 manufactured by the additive manufacturing process may significantly reduce the number of steps required in an assembly operation. Further, the additive manufacturing process may produce object 300 having a complex structure and/or shape. As one example, the additive manufacturing process utilizing additive manufacturing apparatus 100 may produce object 300 including various object specific features (e.g., fastening holes, internal lattice structures, openings, etc.), which may substantially reduce or even eliminate the assembly steps of machining and/or installing such features in object 300.

Referring generally to FIGS. 1A and 1B and particularly to e.g., FIG. 2, as used herein, "polar coordinate system" is a two-dimensional coordinate system in which a distance 264 (e.g., a linear distance) from fixed point 258 and angle 260 from a fixed direction (e.g., at zero degrees) determine each point 262 on a plane (e.g., the horizontal plane). Distance 264 from fixed point 258 defines a radial coordinate. Angle 260 defines an angular coordinate.

In the examples described herein, fixed point 258 (also known as the pole) is a point defined by an intersection of vertical axis A (FIGS. 3-21) and the horizontal plane. Radius R of polar coordinate system 250 is maximum distance 264 from fixed point 258 of polar coordinate system 250.

Those skilled in the art will recognize that while movement (e.g., along curvilinear travel path 252) of electromagnetic energy source 110 is defined relative to polar coordinate system 250, additive manufacturing apparatus 100 may locate position of electromagnetic energy source 110 relative to polar coordinate system 250, Cartesian coordinate system (e.g., using two numerical coordinates that are at distances from a fixed point on two fixed perpendicular directed lines to uniquely determine the position of a point on a plane), or any other suitable position determining system. As one example, additive manufacturing apparatus 100 may be operated by computer programmable commands to control position and/or movement of electromagnetic energy source 110.

Referring generally to FIGS. 1A and 1B and particularly to e.g., FIGS. 3-21, electromagnetic energy source 110 comprises one of an electron beam generator or a laser beam generator. The preceding subject matter of the instant paragraph is in accordance with example 2 of the present disclosure, and example 2 includes the subject matter of example 1, above.

Electron beam generator and/or laser beam generator used in the additive manufacturing process produce (e.g., generate and/or emit) a sufficient amount of energy (e.g., an electron beam or a laser beam, respectively) to promote melting of metal powder 302.

Object 300 produced by additive manufacturing operations (e.g., melting techniques) utilizing the electron beam generator or the laser beam generator is fully dense, void-free, and extremely strong.

The electron beam generator generates and/or emits an electron beam capable of melting metal powder 302 into object 300 made of metal. As one generic, non-limiting example, the electron beam generator may be a (e.g., 3000 W) single crystalline cathode, multi-beam system. As one specific, non-limiting example, the electron beam generator may be an electron beam melting generator commercially available from Arcam AB, Krokslatts Fabriker 27A, SE-431 37 Mölndal, Sweden. As another specific, non-limiting example, the electron beam generator may be an electron beam melting generator commercially available from Steigerwald Strahltechnik GmbH, Emmy-Noether-Str. 2, 82216 Maisach, Germany.

As one example, the additive manufacturing operation may be an electron beam melting ("EBM") process that uses the electron beam as its energy source. The EBM process manufactures object 300 by melting metal powder 302 layer-by-layer with the electron beam, for example under computer control. The EBM process fully melts metal powder 302 into a solid homogeneous metal mass.

The laser beam generator generates and/or emits a laser beam capable of melting metal powder 302 into object 300 made of metal. As one general, non-limiting example, the laser beam generator may be a (e.g., 400 W or 1000 W) diode-pumped single-mode CW Ytterbium fiber laser system. As one specific, non-limiting example, the laser beam generator may be a laser beam melting generator commercially available from SLM Solutions GmbH, Roggenhorster Strasse 9c, 23556 Lubeck, Germany.

As one example, the additive manufacturing operation may be a selective laser melting ("SLM") process that uses a high-power laser beam as its energy source. The SLM process manufactures object 300 by melting metal powder 302 layer-by-layer with the laser beam, for example, under computer control. The SLM process fully melts metal powder 302 into a solid homogeneous metal mass.

Referring generally to FIGS. 1A and 1B and particularly to e.g., FIGS. 7-13 and 26, electromagnetic energy source 110 is configured to translate along linear rail 122 in linear travel path 254. Linear travel path 254, along linear rail 122, has maximum length L2 equal to or greater than radius R of polar coordinate system 250. The preceding subject matter of the instant paragraph is in accordance with example 3 of the present disclosure, and example 3 includes the subject matter of any of examples 1 and 2, above.

Maximum length L2 of linear travel path 254 being equal to or greater than radius R of polar coordinate system 250 defines a maximum reach (e.g., facilitates greater coverage) of electromagnetic energy source 110 to travel linearly across entire polar coordinate system 250.

As one example, linear translation (e.g., along linear travel path 254) of electromagnetic-energy source 110 along linear rail 122 while linear rail 122 one of rotates or revolves in the horizontal plane about vertical axis A enables movement of electromagnetic-energy source 110 in polar coordinate system 250.

As one example, linear travel path 254 may pass through vertical axis A. Maximum length L2 of linear travel path 254 being equal to or greater than radius R of polar coordinate system 250 enables electromagnetic energy source 110 to translate along the entirety of linear rail 122 through vertical axis A and a distance equal to or greater than radius R. As best illustrated in e.g., FIGS. 7, 9, 10 and 12, maximum length L2 of linear travel path 254 is approximately two times radius R of polar coordinate system 250.

Referring to e.g., FIGS. 3-21 and 26, as one example, additive manufacturing apparatus 100 may include electromagnetic energy source drive 150 configured to linearly translate electromagnetic energy source 110 along linear rail 122 in linear travel path 254. As one example, electromagnetic energy source 110 may be fixed to electromagnetic energy source drive 150. Electromagnetic energy source drive 150 may be operatively coupled to linear rail 122. Linear rail 122 may include first end 212 and second end 214 opposite first end 212. Electromagnetic energy source drive 150 may linearly translate along linear rail 122 between proximate (e.g., at or near) first end 212 and proximate second end 214.

Electromagnetic energy source drive 150 may include any suitable drive mechanism configured to drive linear motion of electromagnetic energy source drive 150 and, thus, electromagnetic energy source 110, relative to linear rail 122.

Referring generally to FIGS. 1A and 1B and particularly to e.g., FIGS. 3-6, 14-21 and 26, electromagnetic energy source 110 is configured to translate along linear rail 122 in linear travel path 254. Linear travel path 254, along linear rail 122, has maximum length L2 equal to or less than radius R of polar coordinate system 250. The preceding subject matter of the instant paragraph is in accordance with example 4 of the present disclosure, and example 4 includes the subject matter of any of examples 1 and 2, above.

Maximum length L2 of linear travel path 254 being equal to or less than radius R of polar coordinate system 250 defines maximum reach of electromagnetic energy source 110 to travel linearly across approximately half of polar coordinate system 250.

As one example, linear translation (e.g., along linear travel path 254) of electromagnetic energy source 110 along linear rail 122 while linear rail 122 revolves in the horizontal plane about vertical axis A enables movement of electromagnetic energy source 110 in polar coordinate system 250.

As one example, linear travel path 254 may not pass through vertical axis A. Maximum length L2 of linear travel path 254 being equal to or less than radius R of polar coordinate system 250 enables electromagnetic energy source 110 to translate along linear rail 122 a distance equal to or less than radius R. As best illustrated in e.g., FIGS. 3, 5, 14, 16, 18 and 20, maximum length L2 of linear travel path 254 is approximately equal to (or slightly less than) radius R of polar coordinate system 250.

Referring generally to FIGS. 1A and 1B and particularly to e.g., FIGS. 7, 9, 10, and 12, length L1 of linear rail 122 is equal to or greater than radius R of polar coordinate system 250. The preceding subject matter of the instant paragraph is in accordance with example 5 of the present disclosure, and example 5 includes the subject matter of any of examples 1-4, above.

Length L1 of linear rail 122 being equal to or greater than radius R of polar coordinate system 250 facilitates maximum length L2 of linear travel path 254 to be equal to or greater than radius R of polar coordinate system 250.

As one example, linear travel path 254 may extend from proximate (e.g., at or near) first end 212 to proximate second end 214. In the examples illustrated in FIGS. 7, 9, 10 and 12, vertical axis A is located substantially at a center of linear rail 122 between first end 212 and second end 214 of linear rail 122. As used herein, "substantially" means within manufacturing tolerances. As best illustrated in e.g., FIGS. 7, 9, 10 and 12, length L1 of linear rail 122 is at least approximately two times radius R of polar coordinate system 250.

Referring generally to FIGS. 1A and 1B and particularly to e.g., FIGS. 3, 5, 14, 16, 18, and 20, length L1 of linear rail 122 is equal to or less than radius R of polar coordinate system 250. The preceding subject matter of the instant paragraph is in accordance with example 6 of the present disclosure, and example 6 includes the subject matter of any of examples 1, 2, and 4, above.

Length L1 of linear rail 122 being equal to or less than radius R of polar coordinate system 250 facilitates maximum length L2 of linear travel path 254 to be equal to or less than radius R of polar coordinate system 250.

As one example, linear travel path 254 may extend from proximate first end 212 to proximate second end 214. In the examples illustrated in FIGS. 3, 5, 14, 16, 18 and 20, vertical axis A is located proximate first end 212 of linear rail 122. As best illustrated in e.g., FIGS. 3, 5, 14, 16, 18 and 20, length L1 of linear rail 122 is approximately equal to radius R of polar coordinate system 250. Those of ordinary skill in the art will recognize that length L1 of linear rail 122 may be slightly less than radius R depending on the structural design of additive manufacturing apparatus 100.

Referring generally to FIGS. 1A and 1B and particularly to e.g., FIGS. 5, 9, 12, 16, 20, and 26, apparatus 100 further comprises ring 104 and peripheral drive 148. Peripheral drive 148 is operatively coupled to ring 104, is movable along ring 104, and is configured to one of rotate or revolve linear rail 122 about vertical axis A. The preceding subject matter of the instant paragraph is in accordance with example 7 of the present disclosure, and example 7 includes the subject matter of any of examples 1-6, above.

Ring 104 provides structural support to linear rail 122. Peripheral drive 148 operatively interconnects linear rail 122 and ring 104 to drive movement of linear rail 122 along ring 104 in order to one of rotate or revolve linear rail 122 about vertical axis A.

As one example, an internal radius of ring 104 may be at least equal to or greater than radius R of polar coordinate system 250. Ring 104 is substantially horizontal and defines the horizontal plane in which linear rail 122 one of rotates or revolves about vertical axis A. Vertical axis A is located substantially at a center of ring 104.

Referring to generally to FIGS. 5, 9, 12, 16, and 20 and particularly to e.g., FIG. 26, peripheral drive 148 may include any suitable drive mechanism configured to drive motion of linear rail 122 relative to ring 104. As one example, peripheral drive 148 may operatively engage at least a portion of ring 104 and travel along ring 104 (e.g., in the direction of arrows 266). As one example, peripheral drive 148 may travel along an inner circumference of ring 104. As one specific, non-limiting example, and as best illustrated in e.g., FIG. 26, ring 104 may include track 146 to guide peripheral drive 148 and peripheral drive 148 may travel along track 146. Other methods of operatively coupling peripheral drive 148 and ring 104 to drive one of rotatable or revolvable motion of linear rail 122 about vertical axis A are also contemplated, without limitation.

Referring to e.g., FIGS. 9 and 12, as one example, length L1 of linear rail 122 may be approximately equal to an internal diameter of ring 104. Peripheral drive 148 may be connected proximate first end 212 of linear rail 122 and operatively coupled to ring 104. Peripheral drive 148 may be connected proximate second end 214 of linear rail 122 and operatively coupled to ring 104. Peripheral drive 148 may rotate linear rail 122 about vertical axis A.

Referring to e.g., FIGS. 5, 18 and 20, as one example, length L1 of linear rail 122 may be approximately equal to the internal radius of ring 104. Peripheral drive 148 may be connected proximate second end 214 of linear rail 122 and operatively coupled to ring 104. Peripheral drive 148 may revolve linear rail 122 about vertical axis A.

Referring generally to FIGS. 1A and 1B and particularly to e.g., FIGS. 5, 6, 16, and 17, apparatus 100 further comprises passive hub 222 rotatable about vertical axis A. Linear rail 122 is attached to passive hub 222. The preceding subject matter of the instant paragraph is in accordance with example 8 of the present disclosure, and example 8 includes the subject matter of example 7, above.

Passive hub 222 provides structural support to linear rail 122 and allows linear rail 122 to one of freely rotate or freely revolve about vertical axis A in response to movement driven by peripheral drive 148.

As one example, and as best illustrated in e.g., FIGS. 5 and 16, passive hub 222 is located substantially at the center of ring 104. Vertical axis A passes through substantially a center of passive hub 222. Passive hub 222 may be connected to support 218. As one example, and as best illustrated in e.g., FIGS. 6 and 17, (e.g., when length L2 of linear rail 122 is equal to or less than radius R of polar coordinate system 250) first end 212 of linear rail 122 is connected to passive hub 222. As one example (not shown), (e.g., when length L2 of linear rail 122 is equal to of greater than radius R of polar coordinate system 250) linear rail 122 is connected to passive hub 222 substantially at the center of linear rail 122.

As one example, and as best illustrated in e.g., FIGS. 6 and 17, passive hub 222 may include fixed portion (e.g., upper portion of passive hub 222 in FIGS. 6 and 17) rigidly connected to and supported by support 218. Passive hub 222 may further include rotatable portion (e.g., lower portion of passive hub 222 in FIGS. 6 and 17) rotatably connected to fixed portion. Rotatable portion of passive hub 222 may be freely rotatably about vertical axis A relative to fixed portion of passive hub 222. Passive hub 222 may include any suitable connection to enable free rotational movement of rotatable portion relative to fixed portion in order to facilitate one of rotatable or revolvable motion of linear rail 122 about vertical axis A, for example in response to a driving force applied to linear rail 122 by peripheral drive 148.

As one example, linear rail 122 may be connected to rotatable portion of passive hub 222. As one example, and as best illustrated in e.g., FIGS. 6 and 17, (e.g., when length L2 of linear rail 122 is equal to or less than radius R of polar coordinate system 250) first end 212 of linear rail 122 is connected to rotatable portion of passive hub 222, for example, to a side surface of rotatable portion. As one example (not shown), (e.g., when length L2 of linear rail 122 is equal to of greater than radius R of polar coordinate system 250) linear rail 122 is connected to rotatable portion of passive hub 222 substantially at the center of linear rail 122, for example, to an underside surface of rotatable portion.

Referring generally to FIGS. 1A and 1B and particularly to e.g., FIGS. 3, 4, 7, 8, 10-15, 18, and 19, apparatus 100 further comprises central drive 216 configured to one of rotate or revolve linear rail 122 about vertical axis A. The preceding subject matter of the instant paragraph is in accordance with example 9 of the present disclosure, and example 9 includes the subject matter of any of examples 1-7, above.

Central drive 216 provides structural support to linear rail 122 and drives one of rotatable or revolvable motion of linear rail 122 about vertical axis A.

As one example, and as best illustrated in e.g., FIGS. 3, 7 and 14, central drive 216 is located substantially at a center of polar coordinate system 250. As one example, and as best illustrated in e.g., FIGS. 10, 12, and 18, central drive 216 is located substantially at the center of ring 104. Vertical axis A passes through substantially a center of central drive 216. Central drive 216 may be connected to support 218. As one example, and as best illustrated in e.g., FIGS. 3, 14 and 18, (e.g., when length L2 of linear rail 122 is equal to or less than radius R of polar coordinate system 250) first end 212 of linear rail 122 is connected to central drive 216. As one example, and as best illustrated in e.g., FIGS. 7, 10, and 12, (e.g., when length L2 of linear rail 122 is equal to of greater than radius R of polar coordinate system 250) linear rail 122 is connected to central drive 216 substantially at the center of linear rail 122.

As one example, and as best illustrated in e.g., FIGS. 4, 8, 11, 13, 15 and 19, central drive 216 may include fixed portion (e.g., upper portion of central drive 216 in FIGS. 4, 8, 11, 13, 15 and 19) rigidly connected to and supported by support 218. Central drive 216 may further include rotatable portion (e.g., lower portion of central drive in FIGS. 4, 8, 11, 13, 15 and 19) rotatably connected to fixed portion. Rotatable portion of central drive 216 may be rotatably driven about vertical axis A relative to fixed portion of central drive 216. Central drive 216 may include any suitable drive mechanism to enable driven rotational motion of rotatable portion relative to fixed portion in order to one of rotate or revolve linear rail 122 about vertical axis A.

As one example, linear rail 122 may be connected to rotatable portion of central drive 216. As one example, and as best illustrated in e.g., FIGS. 4, 15 and 19, (e.g., when length L2 of linear rail 122 is equal to or less than radius R of polar coordinate system 250) first end 212 of linear rail 122 is connected to rotatable portion of central drive 216, for example, to a side surface of rotatable portion. As one example, and as best illustrated in e.g., FIGS. 8, 11 and 13, (e.g., when length L2 of linear rail 122 is equal to of greater than radius R of polar coordinate system 250) linear rail 122 is connected to rotatable portion of central drive 216 substantially at the center of linear rail 122, for example, to an underside surface of rotatable portion.

As one example, and as best illustrated in e.g., FIGS. 3, 7, 14, central drive 216 supports linear rail 122 and facilitates one of rotatable or revolvable motion of linear rail 122 about vertical axis A. As one example, and as best illustrated in e.g., FIG. 12, central drive 216 and peripheral drive 148 operate in conjunction to support linear rail 122 and facilitate one of rotatable or revolvable motion of linear rail 122 about vertical axis A.

Referring generally to FIGS. 1A and 1B and particularly to e.g., FIGS. 10 and 18, apparatus 100 further comprises ring 104 and peripheral passive support 226. Peripheral passive support 226 is fixed to linear rail 122 and is movably coupled to ring 104. The preceding subject matter of the instant paragraph is in accordance with example 10 of the present disclosure, and example 10 includes the subject matter of any of examples 1-6, above.

Peripheral passive support 226 interconnects linear rail 122 and ring 104 and allows free movement of linear rail 122 along ring 104 during one of rotatable or revolvable motion of linear rail 122 about vertical axis A.

As one example, peripheral passive support 226 movably engages at least a portion of ring 104 and travels along ring 104 (e.g., in the direction of arrows 266). As one example, peripheral passive support 226 may freely travel along an inner circumference of ring 104. As one specific, non-limiting example, peripheral passive support 226 may be guided by and freely travel along track 146 of ring 104 (FIG. 26). Other methods of movably coupling peripheral passive support 226 and ring 104 in order to allow one of rotatable or revolvable motion of linear rail 122 about vertical axis A are also contemplated, without limitation.

Referring generally to FIGS. 1A and 1B and particularly to e.g. FIGS. 10, 11, 18, and 19, apparatus 100 further comprises central drive 216 configured to one of rotate or revolve linear rail 122 about vertical axis A. The preceding subject matter of the instant paragraph is in accordance with example 11 of the present disclosure, and example 11 includes the subject matter of example 10, above.

As one example, and as best illustrated in FIGS. 10 and 18, central drive 216 and peripheral passive support 226 operate in conjunction to support linear rail 122 and facilitate one of rotatable or revolvable motion of linear rail 122 about vertical axis A.

Referring generally to FIGS. 1A and 1B and particularly to e.g., FIGS. 22-25, 27, 28, 30, 36, and 38-42, apparatus 100 further comprises build platform 106 vertically movable relative to electromagnetic energy source 110. The preceding subject matter of the instant paragraph is in accordance with example 12 of the present disclosure, and example 12 includes the subject matter of any of examples 1-11, above.

Build platform 106 provides a build surface for supporting of metal powder 302 and object 300, additively manufactured therefrom. Vertical movement of build platform 106 (e.g., in the direction of arrow 246) (FIG. 23) relative to electromagnetic energy source 110 facilitates successive layering of metal powder 302 upon build platform 106.

Referring to e.g., FIGS. 39-42, as one example, during the additive manufacturing operation (e.g., method 500 of FIGS. 43A and 43B), build platform 106 may be positioned vertical distance D1 away from electromagnetic energy source 110. First stratum 230 of metal powder 302 may be distributed upon build platform 106. Electromagnetic energy 306 (FIG. 40) may melt a selected portion of metal powder 302 of first stratum 230 to form first layer 304 of object 300. Build platform 106 may vertically move away from electromagnetic energy source 110 to vertical distance D2. Second stratum 232 of metal powder 302 may be distributed upon build platform 106. Electromagnetic energy 306 (FIG. 42) may melt a selected portion of metal powder 302 of second stratum 232 to form second layer 305 of object 300.

Each successive layer (e.g., additional layer 310) of object 300 may be formed upon a preceding layer to form a solid homogeneous mass of metal in order to form object 300. Accordingly, those skilled in the art will recognize that the dashed line, separating first layer 304 and second layer 305 (e.g., additional layer 310) in FIG. 42, is solely for the purpose of illustrating the additive manufacturing operation and does not imply any separation between layers forming object 300.

The build platform 106 moves vertically away from electromagnetic energy source 110 and the difference between vertical distance D2 and vertical distance D1 defines a thickness of each stratum and, thus, a thickness of each layer.

Referring to e.g., FIGS. 22-25, 30, 36 and 38, as one example, additive manufacturing apparatus 100 may include build platform linear drive 140 configured to vertically move build platform 106 relative to electromagnetic energy source 110. Build platform linear drive 140 may be connected to build platform 106. As one example, build platform linear drive 140 may be connected to substantially a center of an underside surface of build platform 106. Vertical axis A may pass through substantially a center of build platform linear drive 140.

Build platform linear drive 140 may include any suitable linear drive mechanism or linear actuator configured to drive linear (e.g., vertical) motion of build platform 106 relative to electromagnetic energy source 110.

Referring generally to FIGS. 1A and 1B and particularly to e.g. FIGS. 22-25, 30, and 36, apparatus 100 further comprises base 102. Build platform 106 is vertically movable relative to base 102. The subject matter of the instant paragraph is in accordance with example 13 of the present disclosure, and example 13 includes the subject matter of example 12, above.

Base 102 provides structural support for build platform 106, linear rail 122, support 218 and/or ring 104. Vertical movement of build platform 106 relative to base 102 facilitates successive layering during additively manufacturing object 300.

Referring to e.g., FIGS. 22-25, 30, and 36, as one example, base 102 may support build platform 106. As one example, base 102 may support build platform linear drive 140. As one example, build platform linear drive 140 may be coupled to base 102. As one example, build platform linear drive 140 may extend through and retract within base 102.

Referring to e.g., FIGS. 22-25, 30, 33, 34, and 36, as one example, additive manufacturing apparatus 100 may include base platform 234. Base platform 234 may be vertically spaced away from base 102. Base platform 234 may support ring 104 and/or support 218.

As one example, and as best illustrated in FIGS. 22-26, additive manufacturing apparatus 100 may include support pylons 144 connected to base platform 234. As one example, and as best illustrated in FIGS. 22-26, ring 104 may be connected to and supported by support pylons 144. As one example, and as best illustrated in FIGS. 5, 10, 12, 16, 18, support 218 may be connected to and supported by ring 104. Support 218 may be connected to ring 104 in a suitable manner as not to interfere with movement of linear rail 122 relative to ring 104. As one example, and as best illustrated in FIG. 34, support 218 may be connected to and supported by support pylons 144.

Referring to e.g., FIGS. 23, 26 and 34, as one example, electromagnetic energy source 110 may be vertically movable relative to base 102, base platform 234, and/or build platform 106 (e.g., linearly in the direction of arrow 236). Electromagnetic energy source 110 may be vertically movable a sufficient distance to distribute metal powder 302 (FIG. 23) onto build platform 106.

As one example, additive manufacturing apparatus 100 may further include linear rail drive 118. Linear rail drive 118 may be configured to vertically move linear rail 122 and, thus, electromagnetic energy source 110 (e.g., linearly in the direction of arrow 236). As one example, and as best illustrated in FIGS. 22-26, linear rail drive 118 may be operatively coupled to ring 104 and vertically move ring 104 relative to base 102, base platform 234 and/or build platform 106. As one example, and as best illustrated in FIG. 34, linear rail drive 118 may be operatively coupled to support 218 and vertically move support 218 relative to base 102, base platform 234 and/or build platform 106.

As one example, linear rail drive 118 may include any suitable drive mechanism configured to drive vertical motion of ring 104 or support 218 and, thus, linear rail 122 and electromagnetic energy source 110, relative to base 102, base platform 234 and/or build platform 106. As one example, linear rail drive 118 may be coupled to one of the support pylons 144. As one example, linear rail drive 118 may be integral to one of the support pylons 144.

Referring generally to FIGS. 1A and 1B and particularly to e.g., FIGS. 25, 27, and 29, apparatus 100 further comprises surface-conditioning apparatus 116. Build platform 106 is rotatably movable relative to surface-conditioning apparatus 116. The preceding subject matter of the instant paragraph is in accordance with example 14 of the present disclosure, and example 14 includes the subject matter of example 13, above.

Surface-conditioning apparatus 116 performs one or more surface-conditioning operations (e.g., surface processing) on at least a portion of exterior surface 238 of object 300 (FIG. 25) following additive manufacturing and while object 300 is located on build platform 106. Rotatably moving build platform 106 rotates object 300 relative to surface-conditioning apparatus 116 to facilitate positioning different portions of exterior surface 238 proximate surface-conditioning apparatus 116 during the surface-conditioning operation.

As one example, surface-conditioning apparatus 116 may be located proximate exterior surface 238 of object 300. Following additive manufacturing of object 300 (e.g., forming first layer 304 and additional layers 310), surface-conditioning apparatus 116 may operatively engage a selected portion of exterior surface 238 of object 300. The selected portion of exterior surface 238 may be the portion of exterior surface 238 aligned with surface-conditioning apparatus 116 at a given rotational orientation of object 300. Thus, the selected portion of exterior surface 238 may change with rotation of object 300.

Referring generally to FIGS. 1A and 1B and particularly to e.g., FIGS. 25 and 29, surface-conditioning apparatus 116 is vertically fixed relative to base 102. The preceding subject matter of the instant paragraph is in accordance with example 15 of the present disclosure, and example 15 includes the subject matter of example 14, above.

Fixing surface-conditioning apparatus 116 relative to base 102 facilitates positioning different portions of exterior surface 238 of object 300 proximate surface-conditioning apparatus 116 by vertically moving build platform 106 relative to base 102.

Referring generally to FIGS. 1A and 1B and particularly to e.g., FIGS. 25, 27 and 29, surface-conditioning apparatus 116 is vertically movable relative to base 102. The preceding subject matter of the instant paragraph is in accordance with example 16 of the present disclosure, and example 16 includes the subject matter of example 14, above.

Vertically moving surface-conditioning apparatus 116 relative to base 102 facilitates positioning different portions of exterior surface 238 of object 300 proximate surface-conditioning apparatus 116 by at least one of vertically moving build platform 106 relative to base 102 and/or vertically moving surface-conditioning apparatus 116 relative to base 102.

Referring to e.g., FIGS. 25 and 27, as one example, additive manufacturing apparatus 100 may further include surface-conditioning-apparatus vertical drive 156. Surfaceconditioning-apparatus vertical drive 156 may be configured to vertically move surface-conditioning apparatus 116 (e.g., linearly in the direction of arrow 240). As one example, surface conditioning apparatus 116 may be operatively coupled to surface-conditioning-apparatus vertical drive 156.

As one example, surface-conditioning-apparatus vertical drive 156 may include any suitable drive mechanism to drive vertical motion of surface-conditioning apparatus 116 relative to base 102.

Referring generally to FIGS. 1A and 1B and particularly to e.g., FIGS. 25, 27, and 29, surface-conditioning apparatus 116 is horizontally movable relative to base 102. The preceding subject matter of the instant paragraph is in accordance with example 17 of the present disclosure, and example 17 includes the subject matter of any of examples 14-16, above.

Horizontally moving surface-conditioning apparatus 116 relative to base 102 facilitates positioning surface-conditioning apparatus 116 at different positions relative to exterior surface 238 of object 300.

Referring to e.g., FIGS. 25 and 27, as one example, additive manufacturing apparatus 100 may further include surface-conditioning-apparatus horizontal drive 158. Surface-conditioning-apparatus horizontal drive 158 may be configured to horizontally move surface-conditioning apparatus 116 (e.g., linearly in the direction of arrow 242). As one example, surface conditioning apparatus 116 may be operatively coupled to surface-conditioning-apparatus horizontal drive 158. As one example, surface-conditioning-apparatus horizontal drive 158 may be operatively coupled to surface-conditioning-apparatus vertical drive 156.

As one example, surface-conditioning apparatus 116 may be moved horizontally to a position proximate exterior surface 238 of object 300. As one example, surface-conditioning apparatus 116 may be moved horizontally to a position spaced away from exterior surface 238 of object 300. As one example, surface-conditioning apparatus 116 may be moved horizontally to a position in contact with exterior surface 238 of object 300.

As one example, surface-conditioning-apparatus horizontal drive 158 may include any suitable drive mechanism to drive horizontal motion of surface-conditioning apparatus 116 relative to base 102.

Referring generally to FIGS. 1A and 1B and particularly to e.g., FIGS. 25, 27, and 29, surface-conditioning apparatus 116 comprises a shot peening machine. The preceding subject matter of the instant paragraph is in accordance with example 18 of the present disclosure, and example 18 includes the subject matter of any of examples 14-17, above.

Shot peening results in enhancing fatigue strength of at least a portion of object 300 that is subjected to high alternating stresses. As one specific non-limiting example, the shot peening machine may be a large-scale shot peening system, for example, commercially available from Guyson Corporation of U.S.A., 13 Grande Boulevard, Saratoga Springs, N.Y. 12866. As another specific, non-limiting example, the shot peenig machine may be a small-scale shot peening system, for example, commercially available from Blast Pro Mfg. Inc., 6021 Melrose Lane, Oklahoma City, Okla. 73127.

As one example, shot peening of object 300 (e.g., exterior surface 238 of object 300) produces a compressive residual stress layer and/or modify mechanical properties of object 300. As one example, shot peening machine may impact exterior surface 238 of object with shot (e.g., round metallic, glass, or ceramic particles) with force sufficient to create plastic deformation.

Referring generally to FIGS. 1A and 1B and particularly to e.g., FIGS. 25, 27, and 29, surface-conditioning apparatus 116 comprises a grinding machine. The preceding subject matter of the instant paragraph is in accordance with example 19 of the present disclosure, and example 19 includes the subject matter of any of examples 14-18, above.

Grinding evens out at least a portion of exterior surface 238 over object 300 (e.g., after a shot peening process) to reduce drag when air flows over object 300. As one specific, non-limiting example, the grinding machine may be an automatic surface grinder, for example, commercially available from Willis Machinery and Tools, 4545 South Avenue, Toledo, Ohio 43615.

As one example, grinding object 300 (e.g., exterior surface 238 of object 300) may flatten and/or shape a portion of exterior surface 238 of object 300. As one example, grinding machine may include a powered (e.g., spinning) wheel covered in rough particles (e.g., a grinding wheel) capable of cutting or otherwise removing material from object 300, making exterior surface 238 flat.

Referring generally to FIGS. 1A and 1B and particularly to e.g., FIGS. 25, 27, and 29, surface-conditioning apparatus 116 comprises a sanding machine. The preceding subject matter of the instant paragraph is in accordance with example 20 of the present disclosure, and example 20 includes the subject matter of any of examples 14-19, above.

Sanding smooths at least a portion of exterior surface 238 of object 300 to produce a smooth metallic surface (e.g., after the shot peening and/or grinding processes and in preparation for painting). As one specific, non-limiting example, the sanding machine may be wide belt sanding machine, for example, commercially available from Houfek a.s., Obora 797, 582 82 Golcuv Jenikov, Czech Republic.

Sanding object 300 (e.g., exterior surface 238 of object 300) may smooth and/or finish a portion of exterior surface 238 of object 300. As one example, sanding machine may include a powered (e.g., rotating, vibrating, etc.) abrasive sander capable of scuffing, scratching, wearing down, marring, or rubbing away material of object 300, making exterior surface 238 smooth.

Referring generally to FIGS. 1A and 1B and particularly to e.g. FIGS. 25, 27, and 29, surface-conditioning apparatus 116 comprises a peening machine. The preceding subject matter of the instant paragraph is in accordance with example 21 of the present disclosure, and example 21 includes the subject matter of any of examples 14-20, above.

Peening results in enhancing fatigue strength of at least a portion of object 300 that is subjected to high alternating stresses. As one general, non-limiting example, peening machine may be a roto-peening system. As another general, non-limiting example, peening machine may be a laser peening system.

As one example, peening object 300 (e.g., exterior surface 238 of object 300) may work (e.g., cold work) exterior surface 238 of object 300 to improve material properties of object 300. As one example, peening machine may impact exterior surface 238 of object 300 with hammer blows, laser beams (e.g., laser peening) or the like to induce compressive stresses, relieve tensile stresses and/or encourage strain hardening of object 300.

Referring generally to FIGS. 1A and 1B and particularly to e.g., FIGS. 25, 27, and 29, surface-conditioning apparatus 116 comprises an abrasive blasting machine. The preceding subject matter of the instant paragraph is in accordance with example 22 of the present disclosure, and example 22 includes the subject matter of any of examples 14-21, above.

Abrasive blasting smooths and finishes at least a portion of exterior surface 238 of object 300 (e.g., after the shot peening and/or grinding processes and in preparation of painting). As one specific, non-limiting example, abrasive blasting machine may be a pressure blasting system, for example, commercially available from Empire Blasting Equipment, 2101 W. Cabot Boulevard, Langhorne, Pa. 19047.

As one example, abrasively blasting object 300 (e.g., exterior surface 238 of object 300) may smooth a portion of exterior surface 238, roughen (e.g., form a surface texture) a portion of exterior surface 238, shape a portion of exterior surface 238, and/or remove contaminants from exterior surface 238. As one example, abrasive blasting machine may forcibly propelling a stream of abrasive material (e.g., aluminum oxide or the like) against exterior surface 238 under high pressure (e.g., approximately between 15 PSI and 50 PSI) suitable to smooth exterior surface 238.

Referring generally to FIGS. 1A and 1B and particularly to e.g., FIGS. 25, 27, and 29, surface-conditioning apparatus 116 comprises a polishing machine. The preceding subject matter of the instant paragraph is in accordance with example 23 of the present disclosure, and example 23 includes the subject matter of any of examples 14-22, above.

Polishing smooths and finishes at least a portion of exterior surface 238 of object 300 (e.g., after the shot peening and/or grinding processes and in preparation of painting). As one specific, non-limiting example, the polishing machine may be an abrasive polishing system, for example, commercially available from Precision Surface International, Inc., 922 Ashland Street, Houston, Tex. 77008.

As one example, polishing object 300 (e.g., exterior surface 238 of object 300) may smooth and/or shine a portion of exterior surface 238 of object 300. As one example, polishing machine may include a powered polishing wheel, belt or cloth to rub, wear down and/or buff a portion of exterior surface 238 or a combination of chemical and mechanical forces (e.g., chemical etching).

Referring generally to FIGS. 1A and 1B and particularly to e.g. FIGS. 25, 27, and 29, surface-conditioning apparatus 116 comprises a cutting machine. The preceding subject matter of the instant paragraph is in accordance with example 24 of the present disclosure, and example 24 includes the subject matter of any of examples 14-23, above.

Cutting shapes object 300 (e.g., for final production and/or assembly to another object). As one general, non-limiting example, the cutting machine may be a laser cutting system. As one specific, non-limiting example, the cutting machine may be a $CO_2$ laser cutting system, a neodymium (Nd) laser cutting system, or a neodymium yttrium-aluminum-garnet (Nd-YAG) laser cutting system, for example, commercially available from System & Parts Engineering, Eunos Avenue 7, Block 1082, #01-174, Singapore.

As one example, cutting object 300 (e.g., exterior surface 238 of object 300) may cut and/or shape a portion of exterior surface 238 of object 300. As one example, cutting machine may include a powered cutter capable of cutting or otherwise removing material from object 300.

Referring generally to FIGS. 1A and 1B and particularly to e.g., FIGS. 25, 27, and 29, surface-conditioning apparatus 116 comprises a coating machine. The preceding subject matter of the instant paragraph is in accordance with example 25 of the present disclosure, and example 25 includes the subject matter of any of examples 14-24, above.

Coating applies one or more types of coatings to exterior surface 238 of object 300. As one specific, non-limiting example, the coating machine may be a powder coating system, for example, commercially available from Powder-X Coating Systems, 7404 Highway 43, Florence, Ala. 35634.

As one example, coating object 300 (e.g., exterior surface 238 of object 300) may apply a decorative coating, a functional coating, or both a coating that is both decorative and functional to exterior surface 238 of object 300. As one example, coating machine may include a material depositing apparatus (e.g., a sprayer, a roller, a brush, etc.) capable of depositing a decorative material (e.g., paint, lacquer, etc.) and/or a functional material (e.g., an adhesive material, a corrosion resistant material, a wear resistant material, a waterproof material, an anti-reflective material, an ultraviolet light absorbent material, etc.) to a portion of exterior surface 238 of object 300.

Referring generally to FIGS. 1A and 1B and particularly to e.g., FIGS. 22-25, 27, 28, 30, 31, 34, and 36, apparatus 100 further comprises powder-containment compartment 138 configured to contain metal powder 302 and having powder-bed volume 108. Build platform 106 at least partially delimits powder-bed volume 108. The preceding subject matter of the instant paragraph is in accordance with example 26 of the present disclosure, and example 26 includes the subject matter of any of examples 12-25, above.

Powder-containment compartment 138 defines at least a portion of powder-bed volume 108 (e.g., at least partially delimits powder-bed volume 108). Metal powder 302 is contained by powder-containment compartment 138 when deposited upon build platform 106.

As one example, powder-containment compartment 138 may include sidewall 244 extending from base 102 to base platform 234. Build platform 106 and build platform linear drive 140 may be located within powder-containment compartment 138.

Referring generally to FIGS. 1A and 1B and particularly to e.g., FIGS. 30 and 38, build platform 106 comprises powder-removal vent 174. The preceding subject matter of the instant paragraph is in accordance with example 27 of the present disclosure, and example 27 includes the subject matter of example 26, above.

Once additive manufacturing of object 300 is complete, removal of metal powder 302 from powder-bed volume 108 may be necessary in order to remove completed object 300. Powder-removal vent 174 facilitates removal of at least a portion of metal powder 302 contained within powder-bed volume 108 (e.g., defined by powder-containment compartment 138 and build platform 106).

As one example, powder-removal vent 174 defines a passage (e.g., an outlet opening) through build platform 106 for the discharge of metal powder 302 from powder-bed volume 108. Powder-removal vent 174 may be closed to maintain metal powder 302 on build platform 106 and within powder-containment compartment 138. Powder-removal vent 174 may be opened to allow metal powder 302 to be discharged from powder-bed volume 108.

As one example, powder-removal vent 174 may include any suitable closure mechanism (e.g., louvers, retractable door, etc.) movable between a closed configuration to seal powder-bed volume 108 and an open position for discharge of metal powder 302 from powder-bed volume 108.

Referring generally to FIGS. 1A and 1B and particularly to e.g., FIG. 30, apparatus 100 further comprises vibrating mechanism 176 operatively coupled to build platform 106. The preceding subject matter of the instant paragraph is in accordance with example 28 of the present disclosure, and example 28 includes the subject matter of example 27, above.

Vibrating mechanism 176 facilitates breaking up and/or dislodging packed or clumped metal powder 302 within powder-bed volume 108.

As one example, vibrating mechanism 176 may include any suitable mechanical device capable of generating vibrations. Vibrations produced by vibrating mechanism 176 may be transferred through build platform 106 and into metal powder 302 contained within powder-bed volume 108. Metal powder 302, particularly, metal powder 302 proximate build platform 106 may become tightly packed or clumped. Vibrations may facilitate breaking up of packed or clumped metal powder 302 and/or passage of metal powder 302 through powder-removal vent 174, for example, prior to or during removal of metal powder 302 from powder-bed volume 108 through powder-removal vent 174.

Referring generally to FIGS. 1A and 1B and particularly to e.g., FIGS. 30 and 38, apparatus 100 further comprises collector 178 extending downwardly from build platform 106. Collector 178 is in selective communication with powder-bed volume 108 via powder-removal vent 174. The preceding subject matter of the instant paragraph is in accordance with example 29 of the present disclosure, and example 29 includes the subject matter of any of examples 27-28, above.

Metal powder 302 discharged through powder-removal vent 174 accumulates within collector 178 for disposal or recycling.

As one example, collector 178 may be a funnel-like body or other conduit connected to build platform 106 and in selective communication with powder-removal vent 174 (e.g., when powder-removal vent 174 is opened) for conveying metal powder 302 from powder-bed volume 108.

Referring generally to FIGS. 1A and 1B and particularly to e.g., FIGS. 22-25, 30, and 36, build platform 106 is vertically movable within powder-containment compartment 138 and powder-bed volume 108 is variable. The preceding subject matter of the instant paragraph is in accordance with example 30 of the present disclosure, and example 30 includes the subject matter of any of examples 26-29, above.

Vertically moving build-platform 106 within powder-containment compartment 138 varies powder-bed volume 108.

As one example, and as best illustrated in FIG. 23, as build platform 106 vertically moves (e.g., in the direction of arrow 246) away from electromagnetic energy source 110 and/or toward base 102, powder-bed volume 108 may increase thereby facilitating distribution of additional metal powder 302 and formation of additional layer 310 of object 300.

Referring generally to FIGS. 1A and 1B and particularly to e.g., FIGS. 24 and 25, apparatus 100 further comprises powder-removal apparatus 126 configured to remove metal powder 302 from powder-containment compartment 138. The preceding subject matter of the instant paragraph is in accordance with example 31 of the present disclosure, and example 31 includes the subject matter of any of examples 26-30, above.

Powder-removal apparatus 126 facilitates removal of metal powder 302 from powder-containment compartment 138 for disposal or recycling.

As one example, powder-removal apparatus 126 may be in selective communication with powder-containment compartment 138 and/or collector 178.

Referring generally to FIGS. 1A and 1B and particularly to e.g., FIGS. 23,24,25, and 28-30, powder-removal apparatus 126 comprises first powder-removal subsystem 128 movable between a first location laterally outboard of powder-containment compartment 138 and a second location laterally inboard of powder-containment compartment 138. Powder-removal apparatus further comprises second powder-removal subsystem 130 located laterally inboard of powder-containment compartment 138. The preceding subject matter of the instant paragraph is in accordance with example 32 of the present disclosure, and example 32 includes the subject matter of example 31, above.

First powder-removal subsystem 128 facilitates removal of metal powder 302 (FIG. 23) accumulated within powder-containment compartment 138 between object 300 and sidewall 244. Second powder-removal subsystem 130 facilitates removal of metal powder 302 accumulated within powder-containment compartment within object 300.

As one example, and as best illustrated in FIGS. 28 and 29, powder-containment compartment 138 may include first-powder-removal-subsystem door 164. First-powder-removal-subsystem door 164 may open to allow first powder-removal subsystem 128 to enter powder-containment compartment 138 (e.g., to move to the second location laterally inboard of powder-containment compartment 138). As one example, first-powder-removal-subsystem door 164 may retract within sidewall 244 of powder-containment compartment 138.

Referring generally to FIGS. 1A and 1B and particularly to e.g., FIGS. 28 and 29, first powder-removal subsystem 128 is vertically movable relative to powder-containment compartment 138. The preceding subject matter of the instant paragraph is in accordance with example 33 of the present disclosure, and example 33 includes the subject matter of example 32, above.

Vertical movement of first powder-removal subsystem 128 relative to powder-containment compartment 138 facilitates removal of metal powder 302 from various vertical locations within powder-containment compartment 138.

Referring to e.g., FIGS. 28 and 29, as one example, additive manufacturing apparatus 100 may further include first powder-removal subsystem vertical drive 160. First powder-removal subsystem vertical drive 160 may be configured to vertically move first powder-removal subsystem 128 (e.g., linearly in the direction of arrow 248). As one example, first powder-removal subsystem 128 may be operatively coupled to first powder-removal subsystem vertical drive 160.

As one example, first powder-removal subsystem vertical drive 160 may include any suitable drive mechanism to drive vertical motion of first powder-removal subsystem 128 relative to powder-containment compartment 138.

Referring generally to FIGS. 1A and 1B and particularly to e.g. FIGS. 28 and 29, first powder-removal subsystem 128 is horizontally movable relative to powder-containment compartment 138. The preceding subject matter of the instant paragraph is in accordance with example 34 of the present disclosure, and example 34 includes the subject matter of any of examples 32-33, above.

Horizontal movement of first powder-removal subsystem 128 relative to powder-containment compartment 138 facilitates removal of metal powder 302 from various horizontal locations within powder-containment compartment 138.

Referring to e.g., FIGS. 28 and 29, as one example, additive manufacturing apparatus 100 may further include first powder-removal subsystem horizontal drive 162. First powder-removal subsystem horizontal drive 162 may be configured to horizontally move first powder-removal subsystem 128 (e.g., linearly in the direction of arrow 312). As one example, first powder-removal subsystem 128 may be operatively coupled to first powder-removal subsystem horizontal drive 162. As one example, first powder-removal subsystem horizontal drive 162 may be operatively coupled to first powder-removal subsystem vertical drive 160.

As one example, first powder-removal subsystem horizontal drive 162 may include any suitable drive mechanism to drive horizontal motion of first powder-removal subsystem 128 relative to powder-containment compartment 138.

Referring generally to FIGS. 1A and 1B and particularly to e.g., FIG. 28, first powder-removal subsystem 128 comprises vacuum source 168. The preceding subject matter of the instant paragraph is in accordance with example 35 of the present disclosure, and example 35 includes the subject matter of any of examples 32-34, above.

Vacuum source 168 generates suction capable of removing (e.g., sucking) metal powder 302 from powder-containment compartment 138, for example, metal powder 302 accumulated between object 300 and sidewall 244.

Referring generally to FIGS. 1A and 1B and particularly to e.g., FIG. 28, first powder-removal subsystem 128 comprises pressurized fluid source 170. The preceding subject matter of the instant paragraph is in accordance with example 36 of the present disclosure, and example 36 includes the subject matter of any of examples 32-35, above.

Pressurized fluid source 170 generates a pressurized fluid flow (e.g., pressurized air) capable of blowing and/or dislodging metal powder 302 within powder-containment compartment 138, for example, metal powder 302 accumulated between object 300 and sidewall 244.

Referring generally to FIGS. 1A and 1B and particularly to e.g., FIGS. 29 and 30, second powder-removal subsystem 130 is centrally located within powder-containment compartment 138. Build platform 106 is vertically movable relative to second powder-removal subsystem 130. The preceding subject matter of the instant paragraph is in accordance with example 37 of the present disclosure, and example 37 includes the subject matter of any of examples 32-36, above.

Vertical movement of build platform 106 relative to second powder-removal subsystem 130 facilitates removal of metal powder 302 from within powder-containment compartment 138 accumulated within an open area defined by object 300 by positioning accumulated metal powder 302 proximate second powder-removal subsystem 130.

As one example, and as best illustrated in FIG. 30, additive manufacturing apparatus 100 may further include tower structure 166. Second powder-removal subsystem 130 may be coupled to tower structure 166. Tower structure 166 may extend from base 102 to proximate an upper portion of powder-containment compartment 138. Tower structure 166 may extend through build platform 106 and build platform 106 may be vertically movable relative to tower structure 166. As object 300 is additive manufactured, tower structure 166 may be located within the open interior area of object 300.

Referring generally to FIGS. 1A and 1B and particularly to e.g., FIG. 30, second powder-removal subsystem 130 is rotatable relative to powder-containment compartment 138. The preceding subject matter of the instant paragraph is in accordance with example 38 of the present disclosure, and example 38 includes the subject matter of any of examples 32-37, above.

Rotating second powder-removal subsystem 130 relative to powder-containment compartment 138 facilitates removal of metal powder 302 from various locations within the powder-containment compartment 138, for example, metal powder 302 accumulated within the open area defined by object 300.

As one example, tower structure 166 may rotate relative to powder-containment compartment 138. As one example, tower structure 166 may rotate about vertical axis A. Rotation of tower structure 166 may position second powder-removal subsystem 130 at various rotational orientations.

Referring generally to FIGS. 1A and 1B and particularly to e.g., FIG. 30, second powder-removal subsystem 130 is vertically movable relative to powder-containment compartment 138. The preceding subject matter of the instant paragraph is in accordance with example 39 of the present disclosure, and example 39 includes the subject matter of any of examples 32-38, above.

Vertical movement of second powder-removal subsystem 130 relative to powder-containment compartment 138 facilitates removal of metal powder 302 from various vertical locations within powder-containment compartment 138, for example, metal powder 302 accumulated within the open area defined by object 300.

Referring to e.g., FIG. 30, as one example, additive manufacturing apparatus 100 may further include second powder-removal subsystem vertical drive 180. Second powder-removal subsystem vertical drive 180 may be configured to vertically move second powder-removal subsystem 130 (e.g., linearly in the direction of arrow 314). As one example, second powder-removal subsystem 130 may be operatively coupled to second powder-removal subsystem vertical drive 180.

As one example, second powder-removal subsystem vertical drive 180 may be coupled to tower structure 166. As one example, second powder-removal subsystem vertical drive 180 may be integral to tower structure 166.

As one example, second powder-removal subsystem vertical drive 180 may include any suitable drive mechanism to drive vertical motion of second powder-removal subsystem 130 relative to powder-containment compartment 138.

Referring generally to FIGS. 1A and 1B and particularly to e.g. FIG. 30, second powder-removal subsystem 130 comprises vacuum source 168. The preceding subject matter of the instant paragraph is in accordance with example 40 of the present disclosure, and example 40 includes the subject matter of any of examples 32-39, above.

Vacuum source 168 generates suction capable of removing (e.g., sucking) metal powder 302 from powder-containment compartment 138 for example, metal powder 302 accumulated within the open area defined by object 300.

Referring generally to FIGS. 1A and 1B and particularly to e.g. FIG. 30, second powder-removal subsystem 130 comprises pressurized fluid source 170. The preceding subject matter of the instant paragraph is in accordance with example 41 of the present disclosure, and example 41 includes the subject matter of any of examples 32-40, above.

Pressurized fluid source 170 generate a pressurized fluid flow (e.g., pressurized air) capable of blowing and/or dislodging metal powder 302 within powder-containment compartment 138, for example, metal powder 302 accumulated within the open area defined by object 300.

Referring generally to FIGS. 1A and 1B and particularly to e.g. FIG. 30, second powder-removal subsystem 130 comprises agitator arm 172. The preceding subject matter of the instant paragraph is in accordance with example 42 of the present disclosure, and example 42 includes the subject matter of any of examples 32-41, above.

Agitator arm 172 passes through metal powder 302 within powder-containment compartment, for example, metal powder 302 accumulated within the open area defined by object 300, to loosen and/or break up metal powder 302.

As one example, agitator arm 172 may extend from tower structure 166 radially outward toward sidewall 244 of powder-containment compartment 138.

Referring to e.g., FIGS. 27 and 29, as one example, powder-containment compartment 138 may further include surface-conditioning apparatus door 154. Surface-conditioning apparatus door 154 may open to allow surface-conditioning apparatus 116 to enter powder-containment compartment 138 (e.g., to move to a location laterally inboard of powder-containment compartment 138). As one example, surface-conditioning apparatus door 154 may retract within sidewall 244 of powder-containment compartment 138.

Referring generally to FIGS. 1A and 1B and particularly to e.g., FIGS. 24 and 25, apparatus 100 further comprises powder-recycling apparatus 136, operatively connected to powder-removal apparatus 126. Metal powder 302, removed from powder-containment compartment 138, is transferrable from powder-removal apparatus 126 to powder-recycling apparatus 136. The preceding subject matter of the instant paragraph is in accordance with example 43 of the present disclosure, and example 43 includes the subject matter of any of examples 31-42, above.

Powder-recycling apparatus 136 facilitates cleaning and/or conditioning of metal powder 302 removed from powder-containment compartment 138 for reuse in the additive manufacturing process.

As one example, metal powder 302 removed from powder-containment compartment 138 by powder-removal apparatus 126 may be transferred to powder-recycling apparatus 136. As one example, metal powder 302 removed from between object 300 and sidewall 244 by first powder-removal subsystem 128 (e.g., vacuum source 168) may be transferred to powder-recycling apparatus 136. As one example, metal powder 302 removed from within the open area of object 300 by second powder-removal subsystem 130 (e.g., vacuum source 168) may be transferred to powder-recycling apparatus 136. As one example, metal powder 302 discharged through powder-removal vent 174, collected by collector 178, and removed by vacuum source 168 (FIG. 30) located proximate a lower portion of collector may be transferred to powder-recycling apparatus 136.

Referring generally to FIGS. 1A and 1B and particularly to e.g., FIGS. 24, 25, 31, and 33, apparatus 100 further comprises powder-dispensing apparatus 132, configured to deposit metal powder 302 into powder-containment compartment 138. The preceding subject matter of the instant paragraph is in accordance with example 44 of the present disclosure, and example 44 includes the subject matter of any of examples 26-43, above.

Powder-dispensing apparatus 132 facilitates depositing metal powder 302 into powder-containment compartment 138 and onto build platform 106 in successive layers (e.g., first stratum 230, second stratum 232, etc.) (FIGS. 39-42).

Referring generally to FIGS. 1A and 1B and particularly to e.g., FIGS. 24, 25 and 31-33, powder-dispensing apparatus 132 comprises powder source 182, powder feed 184 in selective communication with powder source 182, and powder-distribution box 186 configured to receive metal powder 302 from powder feed 184. Powder-distribution box 186 is horizontally movable laterally inboard of powder-containment compartment 138. The preceding subject matter of the instant paragraph is in accordance with example 45 of the present disclosure, and example 45 includes the subject matter of example 44, above.

As one example, powder source 182 may include a container configured to store a volume of fresh or recycled metal powder 302 for use in the additive manufacturing process. Metal powder 302 may be transferred from powder source 182 to powder feed 184. As one example, powder feed 184 may include any transfer mechanism suitable to convey metal powder 302 (e.g., a hopper, an auger, etc.). Powder feed 184 may be in selective communication with powder-distribution box 186 to transfer metal powder 302 to powder-distribution box 186. As one example, powder-dispensing apparatus 132 may further include a powder slide 188 extending from powder feed 184 to powder-distribution box 186.

As one example, and as best illustrated in FIGS. 24, 25, 31 and 33, additive manufacturing apparatus 100 may further include powder-distribution-box drive 190. Powder-distribution-box drive 190 may be configured to horizontally move powder-distribution box 186 (e.g., linearly in the direction of arrow 316) (FIG. 33). Powder-distribution box 186 may deposit a fresh layer of metal powder 302 into powder-containment compartment 138 and onto build platform 106 during each horizontal movement over powder-containment compartment 138.

As one example, powder-distribution box 186 may be operatively coupled to powder-distribution-box drive 190. Powder-distribution-box drive 190 may be connected to base platform 234 on laterally opposed sides of powder-containment compartment 138.

As one example, powder-distribution-box drive 190 may include any suitable drive mechanism to drive horizontal motion of powder-distribution box 186 relative to powder-containment compartment 138.

As one example, and as best illustrated in FIG. 32, powder-distribution box 186 may include powder-coating arm 192 configured to evenly spread metal powder 302, deposited into powder-bed volume 108 over build platform 106. As one example, powder-distribution box 186 may further include roller 194 configured to compact metal powder 302 deposited into powder-bed volume 108 on build platform 106.

Referring generally to FIGS. 1A and 1B and particularly to e.g. FIGS. 34 and 35, apparatus 100 further comprises shielding-gas system 196 configured to dispense shielding gas 308 for protecting a portion of metal powder 302 being irradiated by electromagnetic energy source 110 in powder-bed volume 108. The preceding subject matter of the instant paragraph is in accordance with example 46 of the present disclosure, and example 46 includes the subject matter of any of examples 26-45, above.

Shielding gas 308 prevents oxidation and/or eliminates formation of plumes during irradiation of the portion of metal powder 302 by electromagnetic energy source 110.

As one example, shielding-gas system 196 may include shielding-gas source 198 in selective communication with electromagnetic energy source 110. Shielding gas 308 may be any suitable inert gas. Shielding-gas source 198 may include a container defining an internal volume suitable to store shielding gas 308. Shielding-gas source 198 may be fluidly connected to electromagnetic energy source 110 by shielding-gas line 228.

As one example, shielding gas 308 may be pressurized. As one example, shielding-gas source 198 may pressurize shielding gas 308. As one example, shielding-gas system 196 may include shielding-gas pump 202.

Referring generally to FIGS. 1A and 1B and particularly to e.g. FIGS. 36-38, apparatus 100 further comprises build plate 204 removably coupled to build platform 106. The preceding subject matter of the instant paragraph is in accordance with example 47 of the present disclosure, and example 47 includes the subject matter of any of examples 26-46, above.

Build plate 204 facilitates removal of object 300 from build platform 106 and powder-containment compartment 138 following completion of the additive manufacturing process and any surface-conditioning operations.

As one example, and as best illustrated in FIG. 36, build plate 204 may be removably coupled to build platform 106. Metal powder 302 may be deposited on build plate 204. When first stratum 230 of metal powder 302 (FIG. 39) is irradiated by electromagnetic energy 306 to form first layer 304 of object 300 (FIG. 40), first layer 304 may be bound (e.g., melted) to build plate 204 instead of build platform 106.

Following the additive manufacturing process, build plate 204 and object 300 coupled to build plate 204 may be removed from build platform 106 and powder-containment compartment 138. Build plate 204 may be removed from object 300 through any suitable cutting or grinding operation.

Referring to e.g., FIGS. 37 and 38, as one example, build platform 106 may include first alignment feature 208. Build plate 204 may include second alignment feature 210. First alignment feature 208 and second alignment feature 210 may be matably engaged to properly position and align build plate 204 relative to build platform 106.

Referring generally to FIGS. 1A and 1B and particularly to e.g., FIG. 37, build plate 204 is annular. The preceding subject matter of the instant paragraph is in accordance with example 48 of the present disclosure, and example 48 includes the subject matter of example 47, above.

Annular build plate 204 facilitates removal of metal powder 302 through powder-removal vent 174 disposed in build platform 106 (FIG. 38).

As one example, build plate 204 may be sized to cover proximate a periphery of build platform 106 as to not interfere with passage of metal powder 302 accumulated within the open space of object 300 through powder-removal vent 174.

Referring to e.g., FIGS. 37 and 38, as one example, build platform 106 may include first alignment feature 208. Build plate 204 may include second alignment feature 210. First alignment feature 208 and second alignment feature 210 may be matably engaged to properly position and align build plate 204 relative to build platform 106.

Referring generally to FIGS. 1A and 1B and particularly to e.g. FIGS. 36 and 37, build plate 204 comprises handling feature 206. The preceding subject matter of the instant paragraph is in accordance with example 49 of the present disclosure, and example 49 includes the subject matter of any of examples 47-48, above.

Handling feature 206 facilitates coupling build plate 204 to build platform 106 and/or removing build plate 204 from build platform 106, for example, by an object-handling machine (not shown).

As one example, handling feature 206 may include an opening disposed at least partially through build plate 204. Handling feature 206 may be configured to receive a build plate lift of the object-handling machine. As one example, handling features 206 may be suitably sized to receive forks of a forklift truck.

Referring to e.g., FIGS. 24, 29 and 30, as one example, powder-containment compartment 138 may further include access door 152. Access door 152 may open to allow for removal of object 300 from build platform 106 and powder-containment compartment 138 or removal of build plate 204 and object 300 from build platform 106 and powder-containment compartment 138. As one example, access door 152 may retract within sidewall 244 of powder-containment compartment 138. As one example, access door 152 may retract within base 102. FIGS. 24 and 30 depict powder-containment compartment 138 with access door 152 in an open configuration.

Referring e.g., to FIGS. 1A, 1B, 2, and 14-21, additive manufacturing apparatus 100 (referred to generally as apparatus 100) comprises linear rails 122, each having length L1. Linear rails 122 are one of rotatable or revolvable in a horizontal plane about vertical axis A. Apparatus 100 further comprises electromagnetic energy sources 110, movably coupled to linear rails 122 and movable in polar coordinate system 250 having radius R. The preceding subject matter of the instant paragraph is in accordance with example 50 of the present disclosure.

Linear rails 122 facilitate utilization of electromagnetic energy sources 110. Utilization of electromagnetic energy sources 110 increases cycle time for the additive manufacturing process.

Referring generally to FIGS. 1A and 1B and particularly to e.g., FIGS. 14-21, linear rails 122 are not movable relative to each other. The preceding subject matter of the instant paragraph is in accordance with example 51 of the present disclosure, and example 51 includes the subject matter of example 50, above.

Fixing linear rails 122 relative to each other maintains an angular orientation of electromagnetic energy sources 110 relative to each other.

As one example, and as best illustrated in FIGS. 15, 17, 19 and 21, first ends 212 of linear rails 122 may be fixedly connected to central drive 216 (FIGS. 15 and 19), passive hub 222 (FIG. 17), or to one another (FIG. 21).

Referring generally to FIGS. 1A and 1B and particularly to e.g. FIGS. 14, 16, 18, and 20, electromagnetic energy sources 110 are configured to translate along linear rails 122 in linear travel paths 254. Each of linear travel paths 254, along linear rails 122, has maximum length L2 equal to or less than radius R of polar coordinate system 250. The preceding subject matter of the instant paragraph is in accordance with example 52 of the present disclosure, and example 52 includes the subject matter of any of examples 50 and 51, above.

Maximum length L2 of linear travel path 254 being equal to or less than radius R of polar coordinate system 250 defines maximum reach of electromagnetic energy source 110 to travel linearly across approximately half of polar coordinate system 250.

As one example, linear translation (e.g., along linear travel paths 254) of electromagnetic energy sources 110 along linear rails 122 while linear rails 122 revolve in the horizontal plane about vertical axis A enables movement of electromagnetic energy sources 110 in polar coordinate system 250.

As one example, linear travel paths 254 may not pass through vertical axis A. Maximum length L2 of linear travel paths 254 being equal to or less than radius R of polar coordinate system 250 may enable electromagnetic energy sources 110 to translate along linear rails 122 a distance equal to or less than radius R. As best illustrated in e.g., FIGS. 14, 16, 18 and 20, maximum length L2 of linear travel paths 254 may be less than radius R of polar coordinate system 250.

Referring generally to FIGS. 1A and 1B and particularly to e.g. FIGS. 14, 16, 18, and 20, length L1 of each of linear rails 122 is equal to or less than radius R of polar coordinate system 250. The preceding subject matter of the instant paragraph is in accordance with example 53 of the present disclosure, and example 53 includes the subject matter of any of examples 50-52, above.

Length L1 of linear rails 122 being equal to or less than radius R of polar coordinate system 250 facilitates maximum length L2 of linear travel paths 254 to be equal to or less than radius R of polar coordinate system 250.

As one example, linear travel paths 254 may extend from proximate first ends 212 to proximate second ends 214 of linear rails 122. In the examples illustrated in FIGS. 14,16, 18 and 20, vertical axis A may be located proximate first end 212 of linear rail 122. As best illustrated in e.g., FIGS. 14,16,18 and 20, length L1 of linear rails 122 may be less than radius R of polar coordinate system 250.

Referring e.g., to FIGS. 1A, 1B, and 2-42, and particularly to e.g., FIGS. 43A and 43B, method 500 for additively manufacturing object 300 from metal powder 302 is disclosed. Method 500 comprises distributing first stratum 230 of metal powder 302 in powder-bed volume 108, at least partially delimited by build platform 106 (block 502). Method 500 further comprises melting a first selected portion of first stratum 230 of metal powder 302 in powder-bed volume 108 by exposing the first selected portion of first stratum 230 of metal powder 302 to electromagnetic energy 306 from electromagnetic energy source 110 while moving electromagnetic radiation source 110 along a first predetermined path in polar coordinate system 250 to form at least a portion of first layer 304 of object 300 (block 504). Electromagnetic radiation source 110 is movable in linear travel path 254 along linear rail 122. Linear rail 122 is one of rotatable or revolvable in a horizontal plane about vertical axis A. The preceding subject matter of the instant paragraph is in accordance with example 54 of the present disclosure.

Additively manufacturing object by moving electromagnetic energy source 110 along the first predetermined path (e.g., curvilinear travel path 252) (FIG. 2) in polar coordinate system 250 produces object 300 on a large scale.

Continuing to refer generally to FIGS. 1A, 1B, and 2-42, and particularly to e.g., FIG. 43A, method 500 further comprises vertically moving build platform 106 a predetermined distance away from electromagnetic energy source 110 after forming first layer 304 of object 300 (block 506). The method 500 further comprises distributing second stratum 232 of metal powder 302 in powder-bed volume 108 over first layer 304 of object 300 (block 508). The preceding subject matter of the instant paragraph is in accordance with example 55 of the present disclosure, and example 55 includes the subject matter of example 54, above.

Distributing second stratum 232 of metal powder 302 in powder-bed volume 108 over first layer 304 of object 300 facilitates formation of second layer 305 atop first layer 304.

Continuing to refer generally to FIGS. 1A, 1B, and 2-42, and particularly to e.g., FIG. 43A, method 500 further comprises melting a second selected portion of second stratum 232 of metal powder 302 in powder-bed volume 108 by exposing the second selected portion of second stratum 232 of metal powder 302 to electromagnetic energy 306 from electromagnetic energy source 110 while moving electromagnetic energy source 110 along a second predetermined path in polar coordinate system 250 to form at least a portion of second layer 305 of object 300 (block 510). The preceding subject matter of the instant paragraph is in accordance with example 56 of the present disclosure, and example 56 includes the subject matter of example 55, above.

Melting the second selected portion of second stratum 232 of metal powder 302 to form at least a portion of second layer 305 atop first layer 304 forms object 300 made of a solid homogeneous metal material.

As one example, the second predetermined path in polar coordinate system 250 may be curvilinear travel path 252 (FIG. 2).

Continuing to refer generally to FIGS. 1A, 1B, and 2-42, and particularly to e.g., FIG. 43A, second predetermined path of electromagnetic energy source 110 in polar coordinate system 250 and first predetermined path of electromagnetic energy source 110 in polar coordinate system 250 are identical. The preceding subject matter of the instant paragraph is in accordance with example 57 of the present disclosure, and example 57 includes the subject matter of example 56, above.

Second predetermined path of electromagnetic energy source 110 in polar coordinate system 250 and first predetermined path of electromagnetic energy source 110 in polar coordinate system 250 being identical builds second layer 305 having a shape the same as first layer 304 and directly on top of first layer 304 to form a portion of object 300.

Continuing to refer generally to FIGS. 1A, 1B, and 2-42, and particularly to e.g., FIG. 43A, second predetermined path of electromagnetic energy source 110 in polar coordinate system 250 and first predetermined path of electromagnetic energy source 110 in polar coordinate system 250 are different. The preceding subject matter of the instant paragraph is in accordance with example 58 of the present disclosure, and example 58 includes the subject matter of example 56, above.

Second predetermined path of electromagnetic energy source 110 in polar coordinate system 250 and first predetermined path of electromagnetic energy source 110 in polar coordinate system 250 being different builds second layer 305 having a shape different than first layer 304 to form a different portion of object 300 (e.g., to form an object specific feature).

Continuing to refer generally to FIGS. 1A, 1B, and 2-42, and particularly to e.g., FIG. 43A, method 500 further comprises forming first layer 304 of object 300 on build plate 204, removably connected to build platform 106 (block 512). The preceding subject matter of the instant paragraph is in accordance with example 59 of the present disclosure, and example 59 includes the subject matter of any of examples 54-58, above.

Forming first layer 304 of object 300 on build plate 204 (e.g., instead of on build platform 106) facilitates removal of object 300 from build platform 106 and powder-containment compartment 138.

Continuing to refer generally to FIGS. 1A, 1B, and 2-42, and particularly to e.g., FIG. 43A, method 500 further comprises removing metal powder 302 from powder-bed volume 108 after forming first layer 304 and selected number of additional layers of object 300 (block 514). The preceding subject matter of the instant paragraph is in accordance with example 60 of the present disclosure, and example 60 includes the subject matter of any of examples 54-59, above.

Removal of metal powder 302 from powder-bed volume 108 facilitates the surface-conditioning operation and/or removal of object 300 from build platform 106 and powder-containment compartment 138.

Continuing to refer generally to FIGS. 1A, 1B, and 2-42, and particularly to e.g., FIG. 43A, method 500 further comprises surface conditioning first layer 304 and selected number of additional layers 310 of object 300 (block 516). The preceding subject matter of the instant paragraph is in accordance with example 61 of the present disclosure, and example 61 includes the subject matter of example 60, above.

Surface conditioning first layer 304 and selected number of additional layers 310 of object 300 facilitates one or more surface-conditioning operations (e.g., surface processing) on at least a portion of exterior surface 238 of object 300 following additive manufacturing and while object 300 is located on build platform 106.

Referring generally to FIGS. 1A, 1B, and 2-42, and particularly to e.g., FIG. 43B, surface conditioning first layer 304 and selected number of additional layers of object 300 comprises rotating build platform 106 relative to surface-conditioning apparatus 116 (block 518). The preceding subject matter of the instant paragraph is in accordance with example 62 of the present disclosure, and example 62 includes the subject matter of example 61, above.

Rotating build platform 106 relative to surface-conditioning apparatus 116 rotates object 300 relative to surface-conditioning apparatus 116 to facilitate positioning different portions of first layer 304 and selected number of additional layers 310 of object 300 (e.g., exterior surface 238) proximate surface-conditioning apparatus 116 during the surface-conditioning operation.

Continuing to refer generally to FIGS. 1A, 1B, and 2-42, and particularly to e.g., FIG. 43B, surface conditioning first layer 304 and selected number of additional layers 310 of object 300 comprises peening first layer 304 and selected number of additional layers 310 of object 300 (block 520*a*). The preceding subject matter of the instant paragraph is in accordance with example 63 of the present disclosure, and example 63 includes the subject matter of any of examples 61 and 62, above.

Peening first layer 304 and selected number of additional layers 310 of object 300 facilitates improving material properties of object 300.

Continuing to refer generally to FIGS. 1A, 1B, and 2-42, and particularly to e.g., FIG. 43B, surface conditioning first layer 304 and selected number of additional layers 310 of object 300 comprises shot peening first layer 304 and selected number of additional layers 310 of object 300 (block 520*b*). The preceding subject matter of the instant paragraph is in accordance with example 64 of the present disclosure, and example 64 includes the subject matter of any of examples 61-63, above.

Shot peening first layer 304 and selected number of additional layers 310 of object 300 facilitates introducing a compressive residual stress layer to object 300 and/or modifying mechanical properties of object 300.

Continuing to refer generally to FIGS. 1A, 1B, and 2-42, and particularly to e.g., FIG. 43B, surface conditioning first layer 304 and selected number of additional layers 310 of object 300 comprises grinding first layer 304 and selected number of additional layers 310 of object 300 (block 520*c*). The preceding subject matter of the instant paragraph is in accordance with example 65 of the present disclosure, and example 65 includes the subject matter of any of examples 61-64, above.

Grinding first layer 304 and selected number of additional layers 310 of object 300 facilitates flattening and/or shaping object 300.

Continuing to refer generally to FIGS. 1A, 1B, and 2-42, and particularly to e.g., FIG. 43B, surface conditioning first layer 304 and selected number of additional layers 310 of object 300 comprises sanding first layer 304 and selected number of additional layers 310 of object 300 (block 520*d*). The preceding subject matter of the instant paragraph is in accordance with example 66 of the present disclosure, and example 66 includes the subject matter of any of examples 61-65, above.

Sanding first layer 304 and selected number of additional layers 310 of object 300 facilitates smoothing and/or finishing object 300.

Continuing to refer generally to FIGS. 1A, 1B, and 2-42, and particularly to e.g., FIG. 43B, surface conditioning first layer 304 and selected number of additional layers 310 of object 300 comprises abrasively blasting first layer 304 and selected number of additional layers 310 of object 300 (block 520*e*). The preceding subject matter of the instant paragraph is in accordance with example 67 of the present disclosure, and example 67 includes the subject matter of any of examples 61-66, above.

Abrasively blasting first layer 304 and selected number of additional layers 310 of object 300 facilitates smoothing, roughening, shaping, and/or removing contaminants from object 300.

Continuing to refer generally to FIGS. 1A, 1B, and 2-42, and particularly to e.g., FIG. 43B, surface conditioning first layer 304 and selected number of additional layers 310 of object 300 comprises polishing first layer 304 and selected number of additional layers 310 of object 300 (block 520*f*). The preceding subject matter of the instant paragraph is in accordance with example 68 of the present disclosure, and example 68 includes the subject matter of any of examples 61-67, above.

Polishing first layer 304 and selected number of additional layers 310 of object 300 facilitates smoothing and/or shining object 300.

Continuing to refer generally to FIGS. 1A, 1B, and 2-42, and particularly to e.g., FIG. 43B, surface conditioning first layer 304 and selected number of additional layers 310 of object 300 comprises cutting first layer 304 and selected number of additional layers 310 of object 300 (block 520*g*). The preceding subject matter of the instant paragraph is in accordance with example 69 of the present disclosure, and example 69 includes the subject matter of any of examples 61-68, above.

Cutting first layer 304 and selected number of additional layers 310 of object 300 facilitates cutting away material from and/or shaping object 300.

Continuing to refer generally to FIGS. 1A, 1B, and 2-42, and particularly to e.g., FIG. 43B, surface conditioning first layer 304 and selected number of additional layers 310 of object 300 comprises coating first layer 304 and selected number of additional layers 310 of object 300 (block 520*h*). The preceding subject matter of the instant paragraph is in accordance with example 70 of the present disclosure, and example 70 includes the subject matter of any of examples 61-69, above.

Coating first layer 304 and selected number of additional layers 310 of object 300 facilitates applying a decorative coating, a functional coating, or both a decorative and functional coating to object 300.

Continuing to refer generally to FIGS. 1A, 1B, and 2-42, and particularly to e.g., FIG. 43A, method 500 further comprises dispensing shielding gas 308 to protect a portion of metal powder 302 being irradiated by electromagnetic energy source 110 in powder-bed volume 108 (block 522). The preceding subject matter of the instant paragraph is in accordance with example 71 of the present disclosure, and example 71 includes the subject matter of any of examples 54-70, above.

Dispensing shielding gas 308 to a portion of metal powder 302 being irradiated by electromagnetic energy source 110 in powder-bed volume 108 facilitates preventing oxidation and/or eliminating formation of plumes during irradiation of the portion of metal powder 302 by electromagnetic energy source 110.

Examples of the present disclosure may be described in the context of aircraft manufacturing and service method 1100 as shown in FIG. 44 and aircraft 1102 as shown in FIG. 45. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 46, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while aircraft 1102 is in service. Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A method for additively manufacturing an object from a metal powder, the method comprising:
   distributing a first stratum of the metal powder in a powder-containment compartment, having a powder-bed volume at least partially delimited by a build platform;
   melting a first selected portion of the first stratum of the metal powder in the powder-bed volume by exposing the first selected portion of the first stratum of the metal powder to electromagnetic energy from an electromagnetic energy source while moving the electromagnetic energy source along a first predetermined path in a polar coordinate system to form at least a portion of a first layer of the object; and
   removing the metal powder from the powder-bed volume after forming the first layer and a selected number of additional layers of the object through powder-removal vents, located in the build platform and defining a passage through the build platform,
   wherein the electromagnetic energy source is movable in a linear travel path along a linear rail and the linear rail is one of rotatable or revolvable in a horizontal plane about a vertical axis A.

2. The method of claim 1, further comprising vertically moving the build platform a predetermined distance away from the electromagnetic energy source after forming the first layer of the object.

3. The method of claim 2, further comprising distributing a second stratum of the metal powder in the powder-bed volume over the first layer of the object.

4. The method of claim 3, further comprising melting a second selected portion of the second stratum of the metal powder in the powder-bed volume by exposing the second selected portion of the second stratum of the metal powder to the electromagnetic energy from the electromagnetic energy source while moving the electromagnetic energy source along a second predetermined path in the polar coordinate system to form at least a portion of a second layer of the object.

5. The method of claim 4, wherein the second predetermined path of the electromagnetic energy source in the polar coordinate system and the first predetermined path of the electromagnetic energy source in the polar coordinate system are identical.

6. The method of claim 4, wherein the second predetermined path of the electromagnetic energy source in the polar coordinate system and the first predetermined path of the electromagnetic energy source in the polar coordinate system are different.

7. The method of claim 1, further comprising forming the first layer of the object on a build plate, removably connected to the build platform.

8. The method of claim 1, further comprising surface conditioning the first layer and the selected number of additional layers of the object.

9. The method of claim 8, wherein surface conditioning the first layer and the selected number of additional layers of the object comprises rotating the build platform relative to a surface-conditioning apparatus.

10. The method of claim 8, wherein surface conditioning the first layer and the selected number of additional layers of the object comprises peening the first layer and the selected number of additional layers of the object.

11. The method of claim 8, wherein surface conditioning the first layer and the selected number of additional layers of the object comprises shot peening the first layer and the selected number of additional layers of the object.

12. The method of claim 8, wherein surface conditioning the first layer and the selected number of additional layers of the object comprises grinding the first layer and the selected number of additional layers of the object.

13. The method of claim 8, wherein surface conditioning the first layer and the selected number of additional layers of the object comprises sanding the first layer and the selected number of additional layers of the object.

14. The method of claim 8, wherein surface conditioning the first layer and the selected number of additional layers of the object comprises abrasively blasting the first layer and the selected number of additional layers of the object.

15. The method of claim 8, wherein surface conditioning the first layer and the selected number of additional layers of the object comprises polishing the first layer and the selected number of additional layers of the object.

16. The method of claim 8, wherein surface conditioning the first layer and the selected number of additional layers of the object comprises cutting the first layer and the selected number of additional layers of the object.

17. The method of claim 8, wherein surface conditioning the first layer and the selected number of additional layers of the object comprises coating the first layer and the selected number of additional layers of the object.

18. The method of claim 1, further comprising dispensing a shielding gas to protect a portion of the metal powder being irradiated by the electromagnetic energy source in the powder-bed volume.

19. A component of an aircraft manufactured using the method of claim 1.

20. A method for additively manufacturing an object from a metal powder, the method comprising:
 distributing a first stratum of the metal powder in a powder-containment compartment, having a powder-bed volume at least partially delimited by a build platform;
 melting a first selected portion of the first stratum of the metal powder in the powder-bed volume by exposing the first selected portion of the first stratum of the metal powder to electromagnetic energy from an electromagnetic energy source while moving the electromagnetic energy source along a first predetermined path in a polar coordinate system to form at least a portion of a first layer of the object on an annular build plate, removably coupled to the build platform and having a central opening; and
 removing the metal powder from the powder-bed volume and from the central opening of the annular build plate after forming the first layer and a selected number of additional layers of the object,
 wherein the electromagnetic energy source is movable in a linear travel path along a linear rail and the linear rail is one of rotatable or revolvable in a horizontal plane about a vertical axis A.

* * * * *